US011800519B2

(12) United States Patent
Abotabl et al.

(10) Patent No.: US 11,800,519 B2
(45) Date of Patent: Oct. 24, 2023

(54) TIME-INTERLEAVING OF CODE BLOCK GROUPS IN FULL-DUPLEX MODE

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Gabi Sarkis, San Diego, CA (US); Wanshi Chen, San Diego, CA (US); Shimman Arvind Patel, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/244,780

(22) Filed: Apr. 29, 2021

(65) Prior Publication Data

US 2021/0345375 A1 Nov. 4, 2021

Related U.S. Application Data

(60) Provisional application No. 63/019,239, filed on May 1, 2020.

(51) Int. Cl.
*H04W 72/12* (2023.01)
*H04L 1/00* (2006.01)
(Continued)

(52) U.S. Cl.
CPC ....... *H04W 72/1273* (2013.01); *H04L 1/0004* (2013.01); *H04L 1/0071* (2013.01);
(Continued)

(58) Field of Classification Search
CPC .............. H04L 5/0098; H04L 27/2636; H04L 27/2601; H04L 1/0027; H04L 1/0058;
(Continued)

(56) References Cited

U.S. PATENT DOCUMENTS 10,727,996 B2 7/2020 Nam et al.
2010/0311452 A1 12/2010 Li et al.
(Continued)

FOREIGN PATENT DOCUMENTS

CN 109586866 A 4/2019
CN 109863809 A 6/2019
(Continued)

OTHER PUBLICATIONS

International Search Report and Written Opinion—PCT/US2021/030215—ISA/EPO—dated Jul. 28, 2021.

*Primary Examiner* — Romani Ohri
(74) *Attorney, Agent, or Firm* — Arun Swain

(57) ABSTRACT

Aspects relate to time-interleaving of code block groups (CBGs) of a transport block. Some deployments can include configuring a downlink transmission to a scheduled entity that overlaps in time with an uplink transmission from the scheduled entity when the scheduled entity is operating in a full-duplex mode. CBGs may be time-interleaved to accommodate and/or mitigate interference between downlink and uplink transmissions. The modulation and coding scheme (MCS) of the transport block can further be adjusted to accommodate and/or mitigate interference between the downlink and uplink transmissions. Techniques discussed herein can be used at various nodes, components, and/or devices in a wireless network (e.g., UEs, BSs, CUs, RUs, DUs, etc.). Other aspects, features, and embodiments are also claimed and described.

26 Claims, 23 Drawing Sheets

(51) Int. Cl.
  *H04W 72/1273* (2023.01)
  *H04W 72/0446* (2023.01)
  *H04L 5/14* (2006.01)
  *H04W 72/50* (2023.01)

(52) U.S. Cl.
  CPC .......... *H04L 5/14* (2013.01); *H04W 72/0446* (2013.01); *H04W 72/535* (2023.01)

(58) Field of Classification Search
  CPC ... H04L 1/0047; H04L 1/0075; H04L 1/0042; H04L 27/2627; H04L 5/16
  See application file for complete search history.

(56) References Cited

U.S. PATENT DOCUMENTS

| | | | |
|---|---|---|---|
| 2012/0113942 A1 | 5/2012 | Kim | |
| 2013/0258968 A1* | 10/2013 | Hong | H04W 52/262 370/329 |
| 2017/0079060 A1 | 3/2017 | Keating et al. | |
| 2017/0280460 A1 | 9/2017 | Emmanuel et al. | |
| 2018/0160401 A1 | 6/2018 | Goto et al. | |
| 2018/0323920 A1* | 11/2018 | Zhu | H04L 5/0026 |
| 2019/0199470 A1 | 6/2019 | Xia | |
| 2020/0127773 A1* | 4/2020 | Papasakellariou | H04L 1/1822 |
| 2020/0228287 A1* | 7/2020 | Lou | H04L 5/0005 |
| 2021/0058219 A1* | 2/2021 | Kimura | H04L 5/14 |
| 2021/0235482 A1* | 7/2021 | Yoshioka | H04L 5/0055 |
| 2021/0345374 A1 | 11/2021 | Abotabl | |
| 2022/0116171 A1* | 4/2022 | Zhang | H04L 1/0003 |
| 2022/0174696 A1 | 6/2022 | Kim et al. | |
| 2022/0217736 A1* | 7/2022 | Taherzadeh Boroujeni | H04L 5/0094 |
| 2022/0345268 A1* | 10/2022 | Matsumura | H04L 5/0023 |

FOREIGN PATENT DOCUMENTS

| | | |
|---|---|---|
| CN | 110754058 A | 2/2020 |
| EP | 3451560 A1 | 3/2019 |
| EP | 3566359 A2 | 11/2019 |
| EP | 3639449 A1 | 4/2020 |
| WO | 2018231555 | 12/2018 |
| WO | 2019062837 A1 | 4/2019 |
| WO | 2019142524 A1 | 7/2019 |
| WO | 2020071985 A1 | 4/2020 |

\* cited by examiner

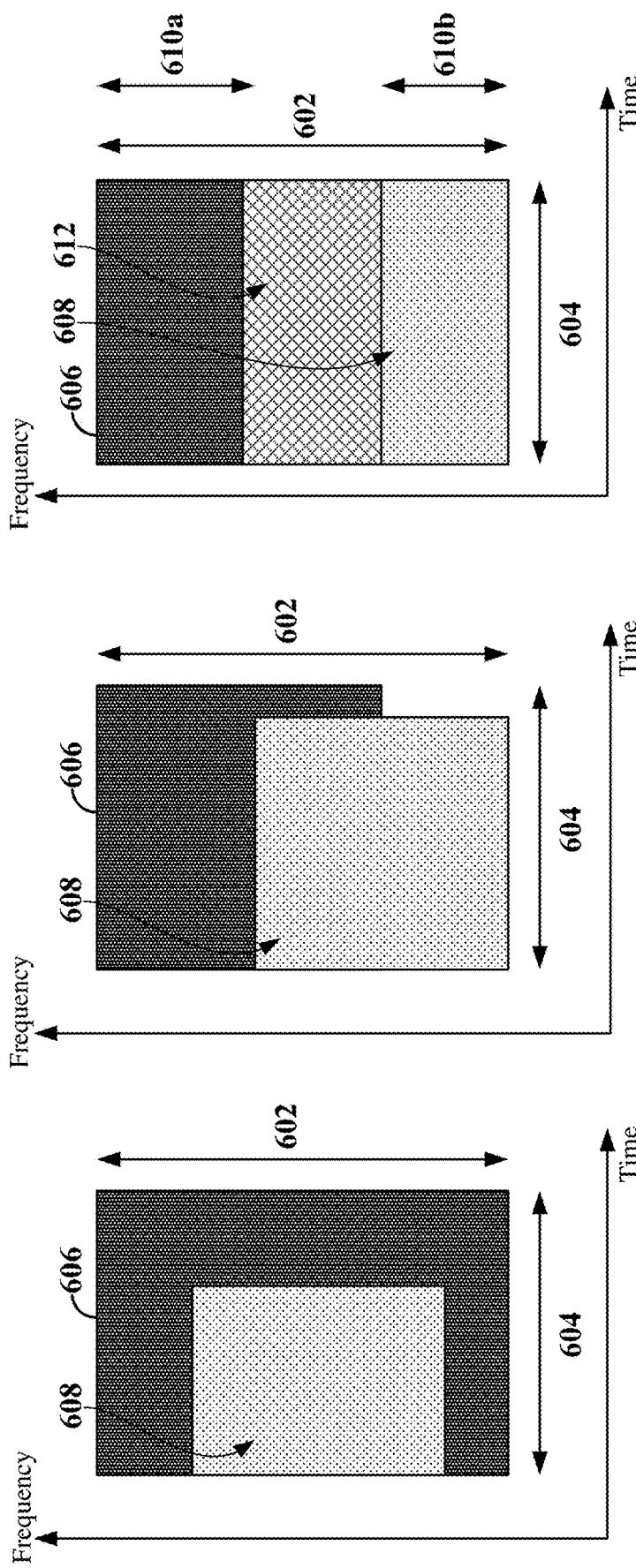

TIME-INTERLEAVING OF CODE BLOCK GROUPS IN FULL-DUPLEX MODE

CROSS-REFERENCE TO RELATED APPLICATIONS

The present Application for Patent claims priority to and the benefit of U.S. Provisional Application No. 63/019,239, filed May 1, 2020, and assigned to the assignee hereof and hereby expressly incorporated by reference herein as if fully set forth below in its entirety and for all applicable purposes.

The present application is related to U.S. application Ser. No. 17/244,773 filed on Apr. 29, 2021, which claims priority to U.S. Provisional Patent Application No. 63/019,236.

TECHNICAL FIELD

The technology discussed below relates generally to wireless communication networks, and more particularly, to full-duplex wireless communication. Some embodiments and techniques enable and provide communication devices, methods, and systems for time-interleaving of code block groups (CBGs) in full-duplex communication scenarios to accommodate and/or mitigate interference (e.g., downlink transmissions overlapping with uplink transmissions in full-duplex mode and vice versa).

INTRODUCTION

In wireless communication systems, such as those specified under standards for 5G New Radio (NR), an access point (e.g., a base station) may communicate with a user equipment (UE) (e.g., a smartphone). Wireless signals are often modulated and coded prior to transmission over the air to aid in robust communications. In some deployments, wireless communications can utilize a modulation and coding scheme (MCS), rank, and precoding matrix selected based on an estimate of the channel between the base station and the UE.

To assist a UE in estimating air channel conditions, a base station may transmit one or more reference signals, such as channel state information—reference signals (CSI-RS), to the UE. After channel estimation, the UE may return a channel state information (CSI) report indicating the quality of the channel to the base station. The CSI may include, for example, a channel quality indicator (CQI) that indicates to the base station an MCS to use for downlink transmissions to the UE, a rank indicator (RI) that indicates to the base station the rank to use for transmissions to the UE, a precoding matrix indicator (PMI) that indicates to the base station the precoding matrix to use for transmissions to the UE, and other suitable parameters.

Wireless transmission may occur at varying times in various modes. In some scenarios, base stations (e.g., gNodeB (gNB)) and UEs can operate in a half-duplex mode or a full-duplex mode. In full-duplex mode, downlink and uplink transmissions may occur simultaneously. In some examples, full-duplex communication may utilize frequency division duplex (FDD), in which transmissions in different directions occur at different carrier frequencies. In other examples, full-duplex communication may utilize sub-band FDD in unpaired spectrum, in which the transmissions in different directions are carried in different sub-bands or bandwidth parts (BWPs) of a carrier bandwidth.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate generally to time-interleaving of code block groups (CBGs) of a transport block of a transmission (e.g., to a scheduled entity such as a UE). CBG time-interleaving may be applied, for example, when a downlink transmission to a scheduled entity overlaps in time with an uplink transmission from a scheduled entity. Time-overlapping transmissions in different directions may occur when devices (e.g., the scheduled or scheduling entity) operate in a full-duplex mode. In some examples, when at least a portion of the CBGs overlap in time with the uplink transmission, the CBGs may be time-interleaved over a plurality of symbols allocated for the downlink transmission to accommodate interference between the downlink and uplink transmissions. In some examples, the MCS of the transport block can further be adjusted to accommodate interference between the downlink and uplink transmissions. For example, the MCS of the transport block can be adjusted based on an amount of overlapping time resources between the downlink transmission and the uplink transmission.

Devices applying and employing techniques discussed herein provide improved communication abilities, including one or more of reduced interference in full-duplex scenarios, improved system throughput, reduced latency, and reduced signal disruption. The signaling, transmission, and scheduling techniques and solutions discussed herein can also aid in reducing challenges associated with self-interference scenarios that may arise during full-duplex communications.

In one example, a method of wireless communication between a scheduling entity and a scheduled entity in a wireless communication network is disclosed. The method includes scheduling a downlink transmission of a transport block including a plurality of code block groups (CBGs) to a scheduled entity. The method can further include time-interleaving the plurality of CBGs of the transport block generated using a modulation and coding scheme (MCS) over a plurality of symbols allocated for the downlink transmission based on at least a first set of CBGs of the plurality of CBGs at least partially overlapping in time with an uplink transmission from the scheduled entity during full-duplex mode operations. The method can further include transmitting the downlink transmission including the plurality of CBGs of the transport block to the scheduled entity.

Another example provides a scheduling entity in a wireless communication network including a transceiver, a memory, and a processor coupled to the transceiver and the memory. The scheduling entity can be configured to schedule a downlink transmission of a transport block including a plurality of code block groups (CBGs) to the scheduled entity. The scheduled entity can further be configured to time-interleave the plurality of CBGs of the transport block generated using a modulation and coding scheme (MCS) over a plurality of symbols allocated for the downlink transmission based on at least a first set of CBGs of the plurality of CBGs at least partially overlapping in time with an uplink transmission from the scheduled entity during full-duplex mode operations. The scheduling entity can further be configured to transmit the downlink transmission including the plurality of CBGs of the transport block to the scheduled entity.

Another example provides a scheduling entity in a wireless communication network. The scheduling entity includes means for scheduling a downlink transmission of a transport block including a plurality of code block groups (CBGs) to a scheduled entity. The scheduling entity can further include means for time-interleaving the plurality of CBGs of the transport block generated using a modulation and coding scheme (MCS) over a plurality of symbols allocated for the downlink transmission based on at least a first set of CBGs of the plurality of CBGs at least partially overlapping in time with an uplink transmission from the scheduled entity during full-duplex mode operations. The scheduling entity can further include means for transmitting the downlink transmission including the plurality of CBGs of the transport block to the scheduled entity.

Another example provides a non-transitory computer-readable medium having stored therein instructions executable by one or more processors of a scheduling entity to schedule a downlink transmission of a transport block including a plurality of code block groups (CBGs) to a scheduled entity. The non-transitory computer-readable medium can further include instructions executable by the one or more processors of the scheduling entity to time-interleave the plurality of CBGs of the transport block generated using a modulation and coding scheme (MCS) over a plurality of symbols allocated for the downlink transmission based on at least a first set of CBGs of the plurality of CBGs at least partially overlapping in time with an uplink transmission from the scheduled entity during full-duplex mode operations. The non-transitory computer-readable medium can further include instructions executable by the one or more processors of the scheduling entity to transmit the downlink transmission including the plurality of CBGs of the transport block to the scheduled entity.

Another example provides a method of wireless communication between a scheduled entity and a scheduling entity in a wireless communication network. The method includes receiving scheduling information for a downlink transmission of a transport block including a plurality of code block groups (CBGs) from the scheduling entity. The scheduling information can indicate a modulation and coding scheme (MCS) associated with the transport block. The method further includes receiving the downlink transmission including the plurality of CBGs of the transport block from the scheduling entity. The plurality of CBGs can be time-interleaved over a plurality of symbols allocated for the downlink transmission based on at least a first set of CBGs of the plurality of CBGs at least partially overlapping in time with an uplink transmission from the scheduled entity during full-duplex mode operations.

Another example provides a scheduled entity in a wireless communication network including a transceiver, a memory, and a processor coupled to the transceiver and the memory. The scheduled entity can be configured to receive scheduling information for a downlink transmission of a transport block including a plurality of code block groups (CBGs) from the scheduling entity. The scheduling information can indicate a modulation and coding scheme (MCS) associated with the transport block. The scheduled entity can further be configured to receive the downlink transmission including the plurality of CBGs of the transport block from the scheduling entity. The plurality of CBGs can be time-interleaved over a plurality of symbols allocated for the downlink transmission based on at least a first set of CBGs of the plurality of CBGs at least partially overlapping in time with an uplink transmission from the scheduled entity during full-duplex mode operations.

Another example provides a scheduled entity in a wireless communication network. The scheduled entity includes means for receiving scheduling information for a downlink transmission of a transport block including a plurality of code block groups (CBGs) from the scheduling entity. The scheduling information can indicate a modulation and coding scheme (MCS) associated with the transport block. The scheduled entity can further include means for receiving the downlink transmission including the plurality of CBGs of the transport block from the scheduling entity. The plurality of CBGs can be time-interleaved over a plurality of symbols allocated for the downlink transmission based on at least a first set of CBGs of the plurality of CBGs at least partially overlapping in time with an uplink transmission from the scheduled entity during full-duplex mode operations.

Another example provides a non-transitory computer-readable medium having stored therein instructions executable by one or more processors of a scheduled entity to receive scheduling information for a downlink transmission of a transport block including a plurality of code block groups (CBGs) from the scheduling entity. The scheduling information can indicate a modulation and coding scheme (MCS) associated with the transport block. The non-transitory computer-readable medium can further include instructions executable by the one or more processors of the scheduled entity to receive the downlink transmission including the plurality of CBGs of the transport block from the scheduling entity. The plurality of CBGs can be time-interleaved over a plurality of symbols allocated for the downlink transmission based on at least a first set of CBGs of the plurality of CBGs at least partially overlapping in time with an uplink transmission from the scheduled entity during full-duplex mode operations.

Various method, system, device, and apparatus embodiments may also include additional features. For example, the scheduling entity may further be configured to transmit the first set of overlapping CBGs to the scheduled entity via one or more symbols of the plurality of symbols allocated for the downlink transmission. The scheduling entity may further be configured to receive the uplink transmission from the scheduled entity via the one or more symbols over which the first set of overlapping CBGs is transmitted.

In some examples, the scheduling entity may further be configured to select the MCS for the transport block and generate the plurality of CBGs of the transport block using the MCS. In some examples, the scheduled entity may be further configured to time de-interleave the plurality of CBGs of the transport block.

In some examples, the scheduling entity may further be configured to select one of a minimum MCS or a maximum MCS as the MCS for the transport block. The minimum MCS can be based on the first set of CBGs including all of the plurality of CBGs and the maximum MCS can be based on the first set of CBGs including an empty set. The scheduling entity may further be configured to select one of the minimum MCS or the maximum MCS as the MCS for the transport block based on an amount of overlapping time resources between the downlink transmission and the uplink transmission. In some examples, the scheduling entity may further be configured to select the minimum MCS as the MCS for the transport block when the amount of overlapping time resources is greater than a threshold and to select the maximum MCS as the MCS for the transport block when the amount of overlapping time resources is less than or equal to the threshold.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIGS. 6A-6C illustrate examples of full-duplex communication in unpaired spectrum according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated deployments, end-user devices, etc. of varying sizes, shapes, and constitution.

Figure 1:
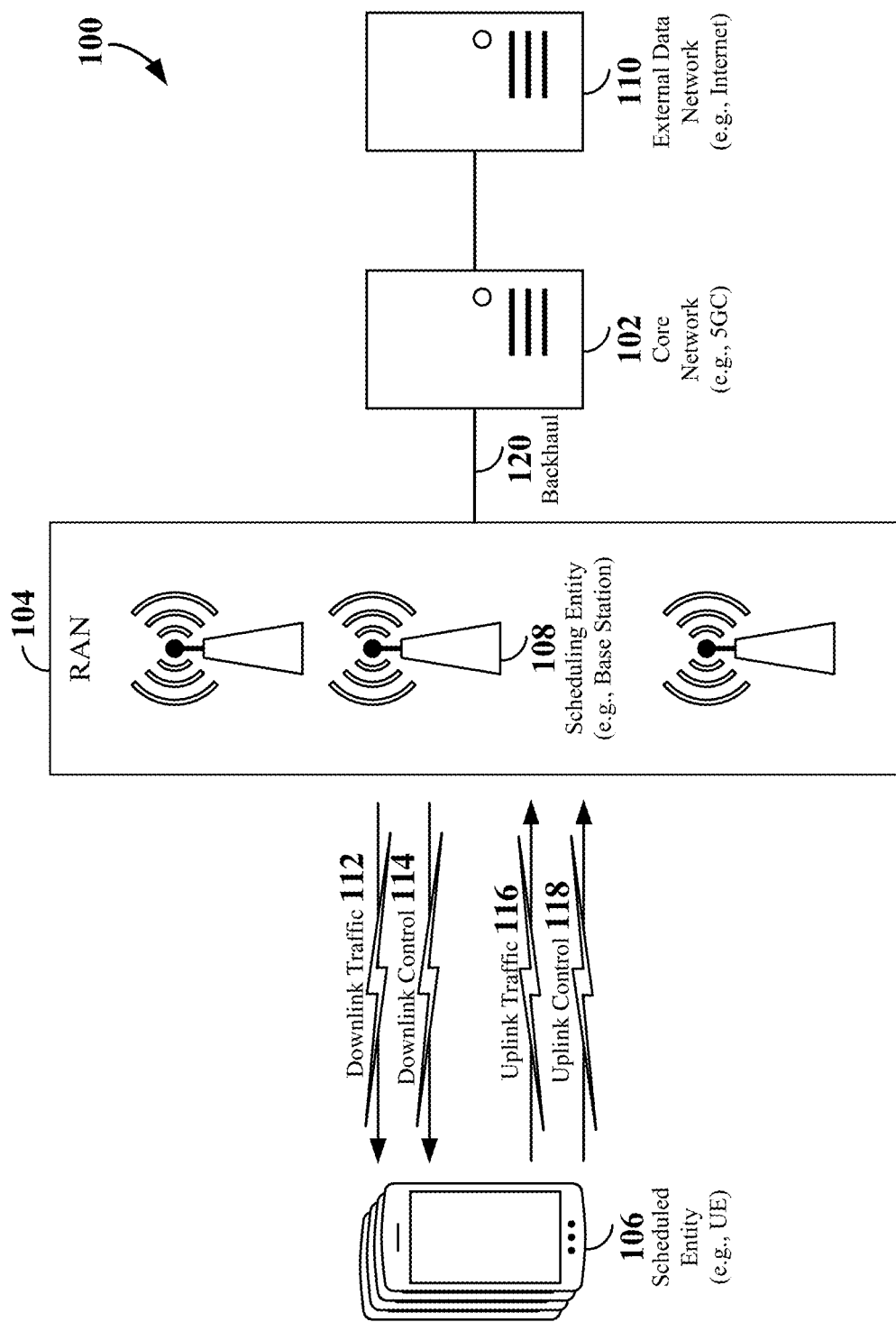
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies.

UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
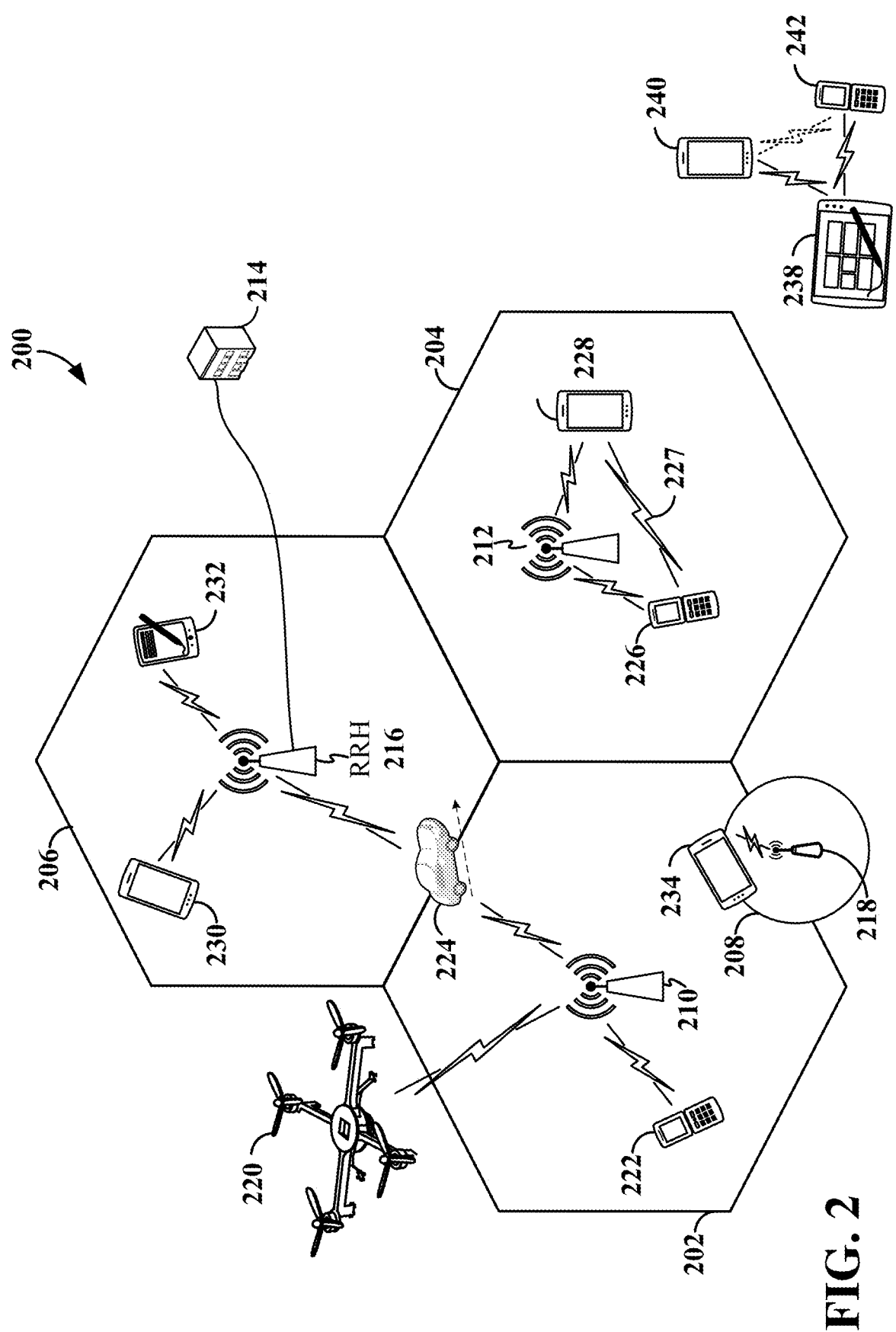
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
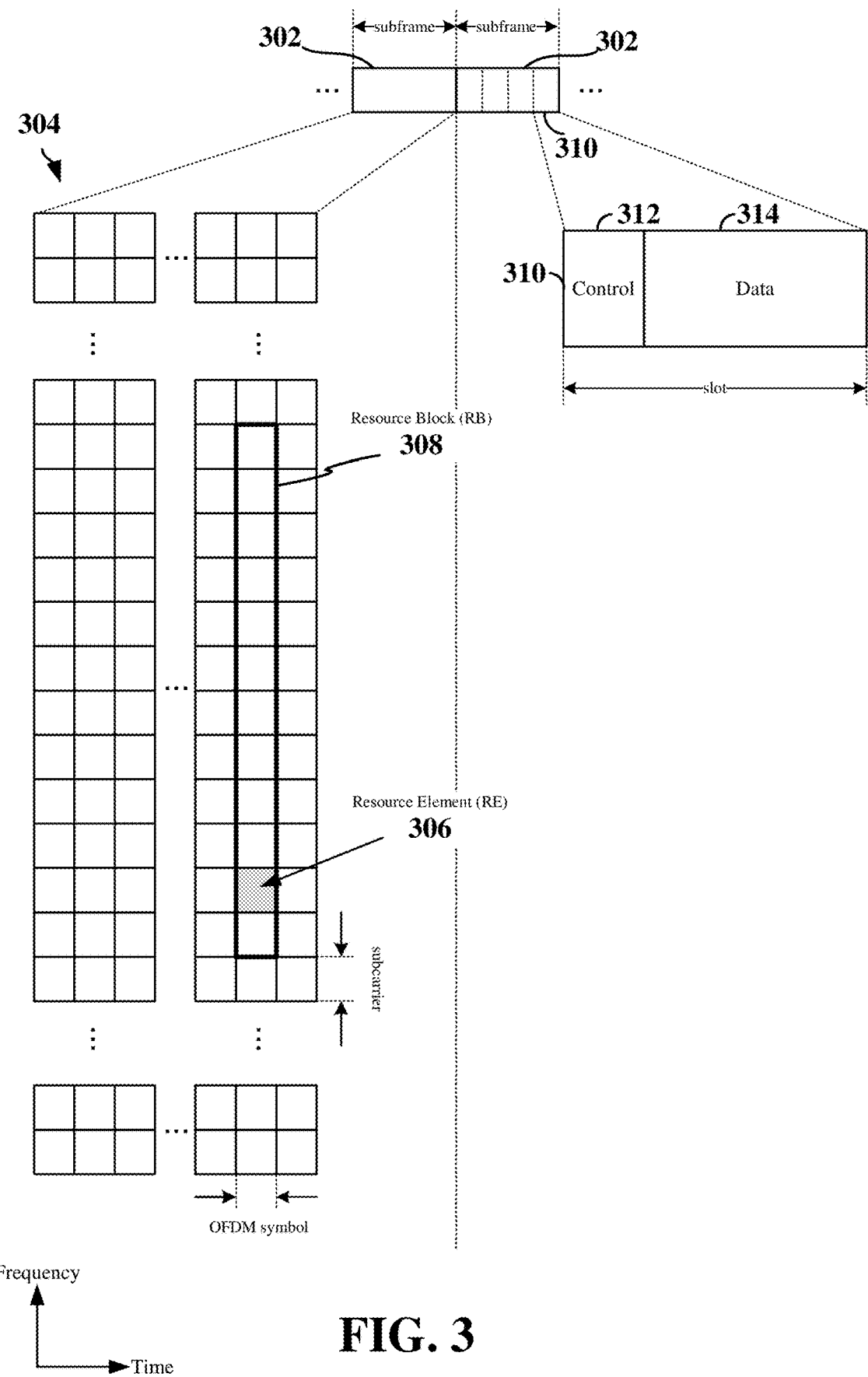
FIG. 3 is a diagram illustrating an example of a frame structure for use in a wireless communication network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
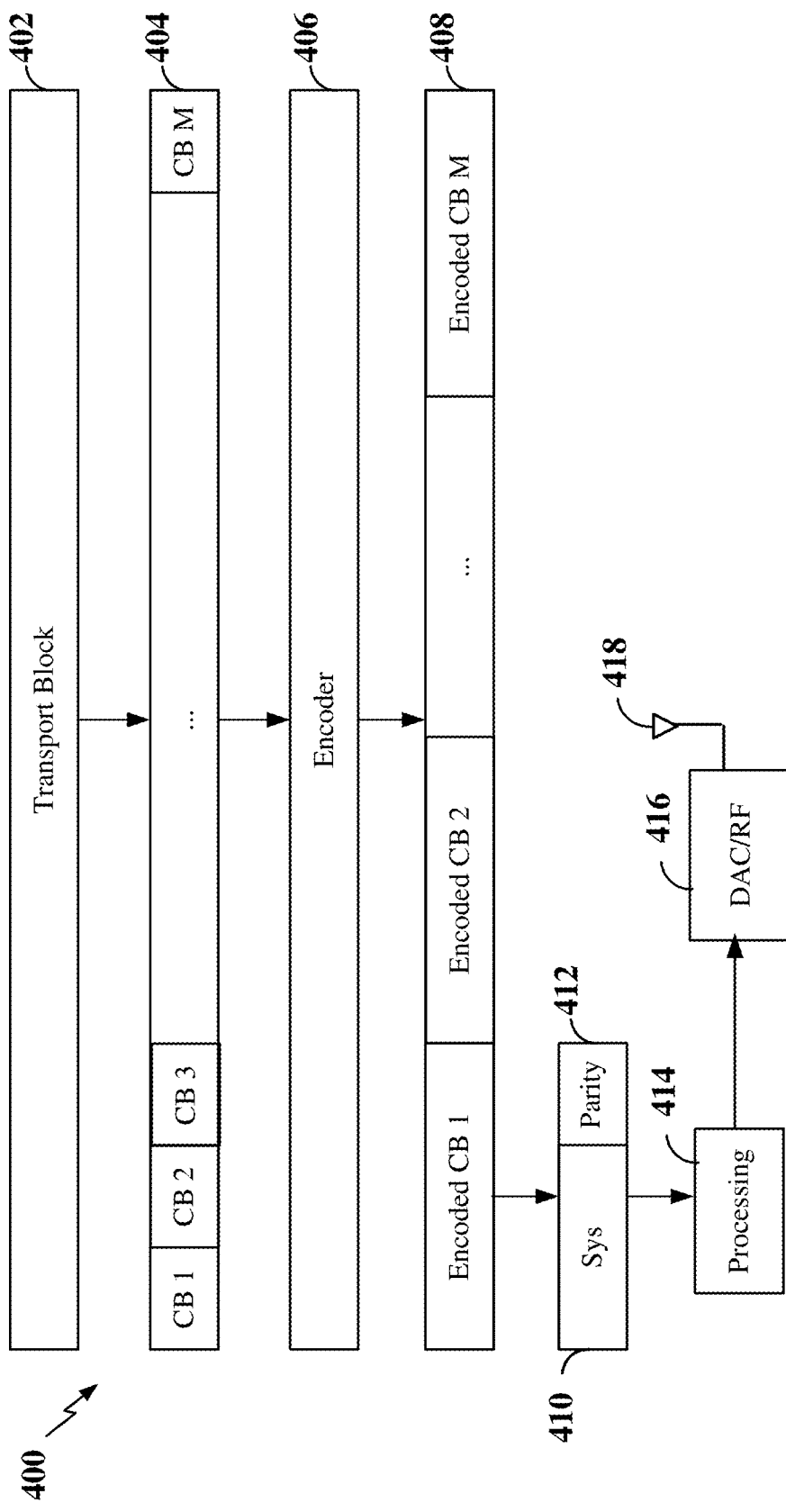
FIG. 4 is a conceptual diagram illustrating an example of a transmitting device configured to transmit a transport block according to some aspects.

FIG. 4 is a conceptual diagram illustrating a transmitting device 400 configured to transmit a transport block 402 according to some aspects. The transmitting device 400 may correspond to, for example, any of the base stations or scheduling entities shown in FIGS. 1 and/or 2 or any of the UEs or scheduled entities shown in FIGS. 1 and/or 2.

The transport block 402 may include a packet, such as an Internet Protocol (IP) packet, a radio link control (RLC) protocol data unit (PDU), or a medium access control (MAC) PDU. The transmitting wireless communication device 400 may be configured to segment the transport block 402 into M code blocks 404, each including a plurality of information bits (systematic bits), corresponding to a portion of the packet.

Each of the code blocks 404 may then be encoded by a block encoder 406 based on a selected modulation and coding scheme (MCS) for the transport block 402 to produce M encoded code blocks 408, each corresponding to a respective one of the code blocks 404. Each encoded code block 408 includes systematic (information) bits 410 and parity (redundancy) bits 412. For example, each of the code blocks 404 may have a length of K information bits 410. The block encoder 406 may then mathematically add redundancy (e.g., parity bits 412) to each code block 404, resulting in codewords or encoded code blocks 408, each having a length of N, where N>K. Here, the code rate R is the ratio between the code block length and the encoded code block length: i.e., R=K/N. Thus, with block codes, the information bits are transmitted together with the parity bits. The block encoder 406 may, in some examples, be an LDPC encoder or a polar encoder.

Further processing (e.g., modulation, tone mapping, etc.) may then be performed on the encoded code blocks 408 by processing block 414 before being input to a digital-to-analog converter (DAC)/radio frequency (RF) block 416 for analog conversion and up-conversion of the analog signal to RF. For example, the processing block 414 may modulate the encoded code blocks 408 using a modulation scheme of the selected MCS for the transport block 402. The RF signal may then be transmitted via an antenna 418 (or antenna array) to a receiving device.

When one or more CBs 404 are not successfully received by the receiving device, the receiving device may report a NACK for the entire transport block 402. The transmitting device 400 may then retransmit the entire transport block 402 using a HARQ process. For higher HARQ efficiency, when a transport block 402 contains multiple CBs 404, the CBs 404 may be grouped into code block groups (CBGs).

Figure 5:
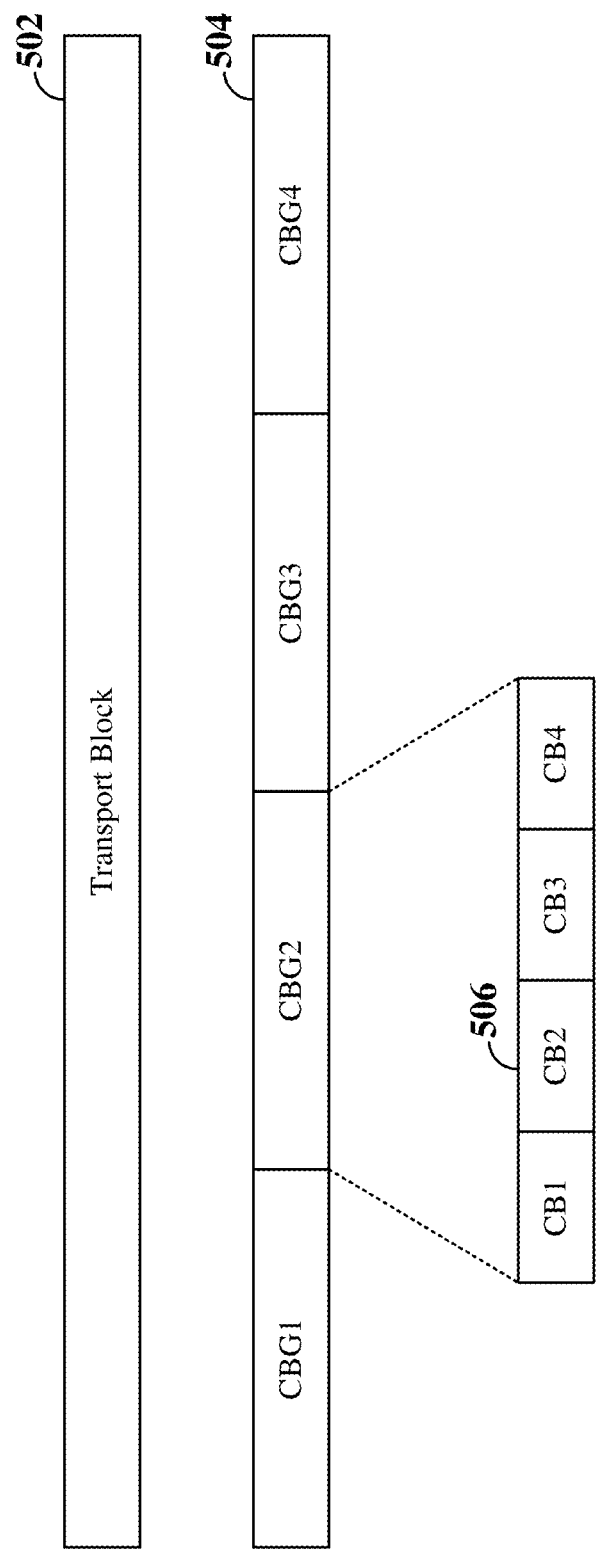
FIG. 5 is a diagram illustrating an example of a transport block including code block groups (CBGs) according to some aspects.

FIG. 5 is a diagram illustrating an example of a transport block 502 including code block groups (CBGs) 504 according to some aspects. Each CBG 504 includes two or more CBs 506. In the example shown in FIG. 5, the transport block 502 is divided into four CBGs 504 (e.g., CBG1, CBG2, CBG3, and CBG4). In addition, each CBG 504 includes four CBs 506 (e.g., CB1, CB2, CB3, and CB4). A receiving device can transmit an ACK or NACK for each CBG 504. For example, when a particular CB 506 (e.g., CB2) is not successfully received by a receiving device, the receiving device can transmit a NACK for the CBG 504 (e.g., CBG2) including that particular CB 506. The transmitting device can then retransmit the CBGs 504 for which a NACK is received instead of retransmitting the entire transport block 502.

A transport block (e.g., transport block 502) may be communicated between a scheduling entity (e.g., base station, such as a gNB) and a scheduled entity (e.g., a UE) over downlink resources or uplink resources allocated in a slot for the transport block. When operating in a full-duplex mode, both downlink and uplink resources may be allocated within symbols of the same slot for the transmission of both a downlink transport block and an uplink transport block, respectively. In some examples, the downlink and uplink resources may overlap in time (e.g., one or more symbols of the slot may carry both the downlink transport block and the uplink transport block). For example, simultaneous transmissions in different directions (uplink and downlink) may utilize frequency division duplex (FDD) in paired spectrum (e.g., the transmissions in different directions are carried on different carrier frequencies) or in unpaired spectrum (e.g., the transmissions in different directions are carried on a single carrier bandwidth).

FIGS. 6A-6C illustrate examples of full-duplex communication in unpaired spectrum. In the examples shown in FIGS. 6A-6C, time is in the horizontal direction and frequency is in the vertical direction. Here, a carrier bandwidth 602 is illustrated along the frequency axis and a slot 604 is illustrated along the time axis.

FIGS. 6A and 6B illustrate in-band full-duplex (IBFD) communication, while FIG. 6C illustrates sub-band FDD communication. For IBFD communication, as shown in FIGS. 6A and 6B, downlink and uplink transmissions occur on the same time and frequency resources. For example, downlink resources 606 allocated for transmissions in the downlink direction overlap in both time and frequency with uplink resources 608 allocated for transmissions in the uplink direction. The overlap may be full (as shown in FIG. 6A) or partial (as shown in FIG. 6B).

For sub-band FDD communication, as shown in FIG. 6C, the carrier bandwidth 602 may be divided into sub-bands (or BWPs) 610a and 610b. Each BWP 610a and 610b may be allocated for communication in a single direction. For example, sub-band 610a may be allocated for downlink transmissions, while sub-band 610b may be allocated for uplink transmissions. Thus, downlink resources 606 allocated for transmissions in the downlink direction overlap in time, but not in frequency, with uplink resources 608 allocated for transmissions in the uplink direction. The downlink resources 606 may further be separated from the uplink resources 608 in the frequency domain by a guard band 612 to isolate the uplink and downlink transmissions in frequency.

Figure 7C:
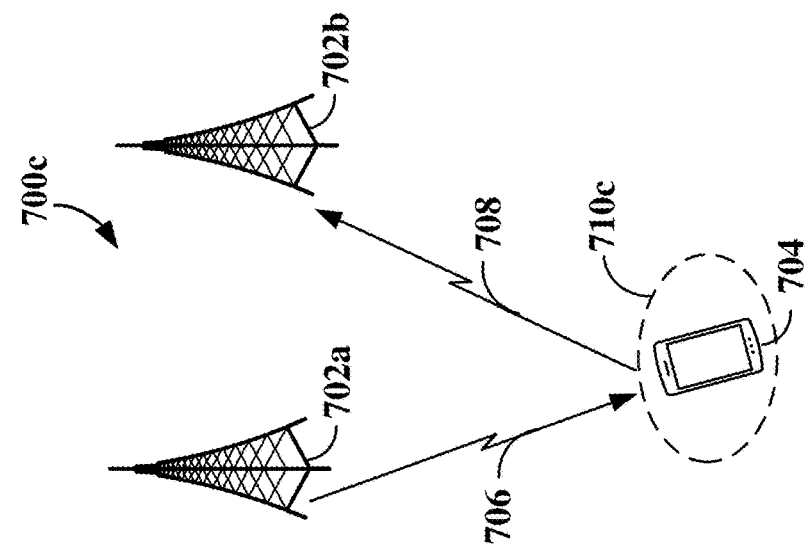
FIGS. 7A-7C are schematic illustrations of examples of full-duplex wireless communication networks according to some aspects.
Figure 7B:
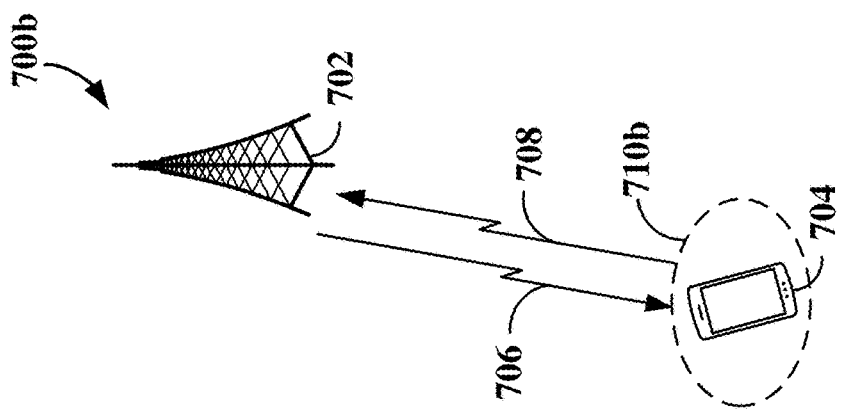
Figure 7A:
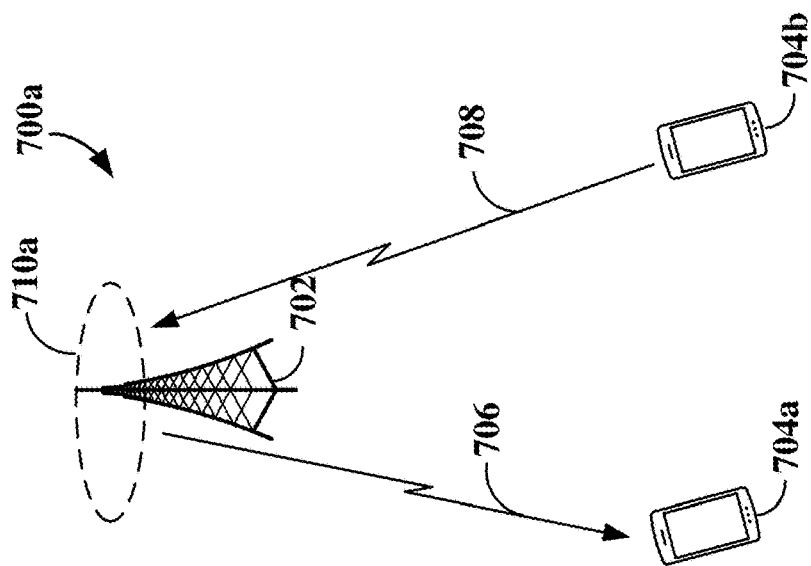

FIGS. 7A-7C are schematic illustrations of examples of full-duplex wireless communication networks 700a-700c according to some aspects. In full-duplex networks, downlink and uplink transmissions may occur simultaneously. In some examples, full-duplex networks may utilize IBFD or sub-band FDD in unpaired spectrum, as shown in FIGS. 6A-6C.

In the examples shown in FIGS. 7A-7C, the full-duplex wireless communication networks 700a-700c each include one or more scheduling entities 702 (e.g., base stations, such as a gNB) in wireless communication with one or more scheduled entities 704 (e.g., UEs). The scheduling entities 702 may correspond to any of the scheduling entities or base stations shown in FIGS. 1 and/or 2. The scheduled entities 704 may correspond to any of the scheduled entities or UEs shown in FIGS. 1 and/or 2. In FIGS. 7A-7C, the scheduling entities 702 and scheduled entities 704 may each operate in a full-duplex mode or a half-duplex mode.

In the example shown in FIG. 7A, the scheduling entity 702 is a full-duplex base station (e.g., gNB) in wireless communication with half-duplex scheduled entities (e.g., UEs) 704a and 704b. When operating in full-duplex mode, the scheduling entity 702 may simultaneously transmit a downlink signal 706 (e.g., downlink control information and/or data) to one of the scheduled entities (e.g., scheduled entity 704a) and receive an uplink signal 708 (e.g., uplink control information and/or data) from another scheduled entity (e.g., scheduled entity 704b). The scheduling entity 702 may experience self-interference 710a of the uplink signal 708 as a result of the simultaneous transmission of the downlink signal 706. That is, a portion of the downlink signal 706 may leak into the uplink signal 708, thus resulting in self-interference 710a between the downlink and uplink signals 706 and 708.

In some examples, the scheduling entity 702 may include a multi-panel antenna array configured to transmit the downlink signal 706 on one or more antenna ports associated with one of the antenna panels and receive the uplink signal 708 on one or more antenna ports associated with the other antenna panel. Using separate panels for downlink and uplink transmissions in full-duplex mode can facilitate mitigation of the self-interference 710a of the uplink signal 708 from the downlink signal 706. In one example, the panels may be physically separated from one another by a distance selected to provide improved isolation between the simultaneous transmission (Tx) and reception (Rx) operations, thereby mitigating at least a portion of the self-interference 710a. Further mitigation of the self-interference may be achieved by implementing sub-band FDD in unpaired spectrum. With sub-band FDD, the downlink and uplink transmissions are in different portions (e.g., different sub-bands or BWPs) of the carrier bandwidth. A guard band may further be provided between the uplink sub-band(s) and the downlink sub-band(s) to isolate the uplink and downlink transmissions in frequency. Other self-mitigation techniques may further be utilized, such as digital interference cancellation, Rx windowed overlap and add (WOLA) to reduce the adjacent channel leakage ratio (ACLR) leakage to the uplink signal 708, improving the Rx antenna gain control (AGC) state, and other suitable mitigation techniques.

In the example shown in FIG. 7B, the scheduling entity 702 is a full-duplex base station (e.g., gNB) in wireless communication with a full-duplex scheduled entity (e.g., UE) 704. When operating in full-duplex mode, the scheduling entity 702 may simultaneously transmit a downlink signal 706 (e.g., downlink control information and/or data) to the scheduled entity 704 and receive an uplink signal 708 (e.g., uplink control information and/or data) from the scheduled entity 704. Similarly, the scheduled entity 704 may simultaneously transmit the uplink signal 708 to the scheduling entity 702 and receive the downlink signal 706 from the scheduling entity 702. In this example, the scheduled entity 704 may experience self-interference 710b of the downlink signal 706 as a result of the simultaneous transmission of the uplink signal 708. That is, a portion of the uplink signal 708 may leak into the downlink signal 706, thus resulting in self-interference 710b between the downlink and uplink signals 706 and 708. In some examples, the scheduled entity 704 may include a multi-panel antenna array configured to receive the downlink signal 706 on one or more antenna ports associated with one of the antenna panels and transmit the uplink signal 708 on one or more antenna ports associated with the other antenna panel. The scheduled entity 704 may further utilize one or more interference mitigation techniques, similar to those described above used by the scheduling entity 702 in FIG. 7A.

In the example shown in FIG. 7C, the wireless communication network 700c may have a coordinated multi-point (CoMP) network configuration in which multiple scheduling entities 702a and 702b (e.g., multiple transmission and reception points (TRPs), each corresponding to a base station, such as a gNB), may simultaneously communicate with a scheduled entity 704. Each TRP 702a and 702b may utilize the same carrier frequency to communicate with the scheduled entity 704 to facilitate full-duplex communication with the scheduled entity 704. That is, each TRP 702a and 702b may operate in a half-duplex mode, while the scheduled entity 704 operates in a full-duplex mode. For example, each TRP 702a and 702b may implement TDD to perform one of transmission or reception at a time. In addition, the scheduled entity 704 may implement IBFD or sub-band FDD to perform simultaneous transmission and reception.

For example, the scheduling entity 702a may transmit the downlink signal 706 to the scheduled entity 704 simultaneous to the scheduled entity 704 transmitting the uplink signal 708 to the scheduling entity 702b. In this example, the scheduled entity 704 may also experience self-interference 710c of the downlink signal 706 as a result of the simultaneous transmission of the uplink signal 708. That is, a portion of the uplink signal 708 may leak into the downlink signal 706, thus resulting in self-interference 710c between the downlink and uplink signals 706 and 708.

Figure 8:
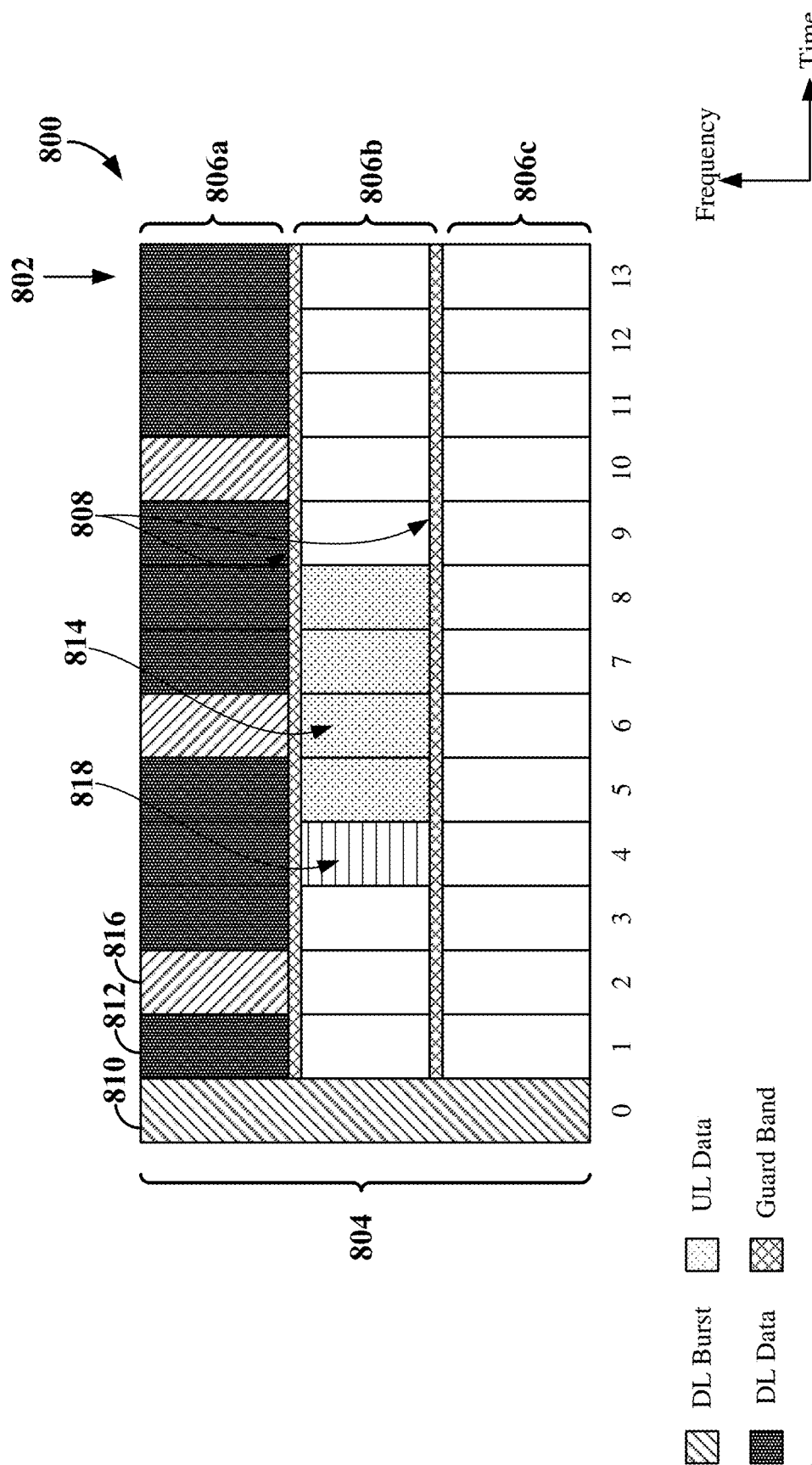
FIG. 8 is a diagram illustrating an example of a full-duplex slot including time-overlapping downlink and uplink transmissions that may result in self-interference at a scheduled entity according to some aspects.

FIG. 8 is a diagram illustrating an exemplary slot 800 including time-overlapping downlink and uplink transmissions that may result in self-interference at a scheduled entity according to some aspects. In the example shown in FIG. 8, time is in the horizontal direction with units of symbols 802 (e.g., OFDM symbols); and frequency is in the vertical direction. Here, a carrier bandwidth 804 is illustrated along the frequency axis. The carrier bandwidth 804 may be divided into a number of sub-bands (or BWPs) 806a-806c for sub-band FDD full-duplex operation.

The carrier bandwidth 804 may be partitioned between uplink transmissions and downlink transmissions. For example, sub-bands 806a and 806c can be allocated for downlink transmissions, while sub-band 806b can be allocated for uplink transmissions. Guard bands 808 are further provided between the uplink (UL) sub-band 806b and the downlink (DL) sub-bands 806a and 806c to mitigate self-interference between simultaneous DL transmissions in the DL sub-bands 806a/806c and UL transmissions in the UL sub-band 806b.

Subject to interference alignment with other scheduling entities and network operators, slot formats having other partitions of the carrier bandwidth 804 for sub-band FDD full-duplex slots 800 may be utilized. For example, the guard band(s) 808 may be extended or minimized, the UL sub-band 806b may occupy a larger portion or a smaller portion of the carrier bandwidth 804, the UL sub-band 806b and DL sub-bands 806a and 806c may be reversed such that the UL sub-bands occupy a larger percentage of the carrier bandwidth 804 than the DL sub-band, or the carrier bandwidth 804 may be divided between a single DL sub-band and a single UL sub-band, as shown in FIG. 6C. In an example, a single DL sub-band may include a lower frequency range of the carrier bandwidth 602, while a single UL sub-band may include an upper frequency range of the carrier bandwidth 602. Other slot formats, such as the IBFD slot formats shown in FIGS. 6A and 6B, may also be utilized.

In the example shown in FIG. 8, the slot 800 includes a DL burst 810 in a first symbol 802 (Symbol 0) of the slot 800. The DL burst 810 may be transmitted by a scheduling entity (e.g., a base station, such as a gNB) towards one or more scheduled entities (e.g., UEs). In an example, the DCI may include common DCI or UE-specific DCI. The common DCI may include, for example, common control information broadcast to a group of scheduled entities or all scheduled entities in the cell. For example, common control information may include information related to random access. The UE-specific DCI may include, for example, HARQ feedback information (e.g., ACK/NACK), scheduling information for scheduling a downlink data transmission and/or uplink transmission in the slot 800 or a subsequent slot, and other suitable information.

In an example, the DL burst 810 may include one or more physical downlink control channels (PDCCHs), each carrying DCI. For example, the DCI may include scheduling information for scheduling a downlink transmission or an uplink transmission in the slot 800. In an example, the scheduling information associated with first DCI (e.g., transmitted within a first PDCCH) may include a downlink resource allocation in time and frequency for the transmission of a downlink transport block 812 (DL data) in the slot 800. The DL data may be transmitted, for example, within a PDSCH. In the example shown in FIG. 8, the DL data 812 is scheduled for transmission within non-adjacent symbols 802 (e.g., Symbols 1, 3-5, 7-9, and 11-13) of the slot 800. In addition, the scheduling information associated with second DCI (e.g., transmitted within a second PDCCH) may include an uplink resource allocation in time and frequency for the transmission of an uplink transport block 814 (UL data) in the slot. For example, the UL data may be transmitted within a PUSCH. In the example shown in FIG. 8, the UL data 814 is scheduled for transmission within a portion of the symbols 802 (e.g., Symbols 5-8) of the slot 800. In some examples, the scheduling information scheduling one or more of the downlink transport block 812 and/or the uplink transport block 814 may be transmitted within a previous slot.

As shown in the example of FIG. 8, the scheduling information in the DL burst 810 may schedule the downlink transport block 812 along with one or more DL reference signals (e.g., DMRS 816) to assist the scheduled entity in demodulating and decoding the DL data (downlink transport block 812). The scheduling information in the DL burst 810 may schedule the downlink transport block 812 and corresponding DMRS 816 within a plurality of symbols 802 (e.g., Symbol 2-Symbol 13) and within sub-band 806a of the slot 800. In addition, the scheduling information in the DL burst 810 may schedule the uplink transport block 814, along with one or more UL reference signals (e.g., DMRS 818) to assist the scheduling entity in demodulating and decoding the UL data (uplink transport block 814). The scheduling information in the DL burst 810 may schedule the uplink transport block 814 and corresponding DMRS 818 within a plurality of symbols 802 (e.g., Symbol 4-Symbol 8) and within sub-band 806b of the slot 800.

As further shown in the example of FIG. 8, part of the downlink transport block (DL data 812) is scheduled for transmission within resources (e.g., Symbols 4-8) overlapping in time with the scheduled uplink transmission of the uplink transport block 814. In some examples, the overlapping part of the downlink transport block 812 (e.g., the one or more CBGs of the downlink transport block 812 transmitted within Symbols 4-8) may experience self-interference at the scheduled entity. However, the non-overlapping part of the downlink transport block 812 (e.g., the one or more CBGs of the downlink transport block transmitted within Symbols 1-3 and Symbols 9-13) may not experience self-interference at the scheduled entity. Therefore, the channel quality of the channel between the scheduling entity and the scheduled entity may vary between symbols having overlapping downlink and uplink transmissions (e.g., Symbols 4-8) and symbols within which there are no overlapping transmissions (e.g., Symbols 1-3 and Symbols 9-13).

Channel quality may be estimated and estimates can be used to adapt communication operations. As one example, a scheduled entity can estimate channel quality using channel state information—reference signals (CSI-RS) or other suitable downlink reference signals broadcast by the scheduling entity. A scheduled entity may also measure a signal-to-interference-plus-noise ratio (SINR) of each received CSI-RS and generate a CSI report based on the measured SINR. The CSI report may include, for example, a channel quality indicator (CQI), rank indicator (RI), precoding matrix indicator (PMI). The scheduling entity may use the CSI report to select a rank for the scheduled entity, along with a precoding matrix and a MCS to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The MCS defines the number of bits that can be carried in one symbol and is dependent upon the channel quality in the wireless link. In some scenarios, for channels experiencing good channel quality, a high MCS may be utilized to transmit more bits within a symbol. By contrast, for channels experiencing poor channel quality, a low MCS may be utilized to improve the ability of the receiver to decode the transmission.

To account for channel quality variance between overlapping and non-overlapping transmissions, a scheduled entity may generate and/or transmit channel information reports. In some deployments, this can include generating and/or transmitting two channel state information (CSI) reports. Each CSI report may include a different respective set of CSI report values for each of a plurality of CSI report parameters (e.g., CQI, RI, PMI, etc.). For example, one CSI report may include CSI report values corresponding to the channel quality when a downlink transport block is received within downlink resources that overlap in time with the transmission of an uplink transport block within uplink resources (e.g., an overlapping channel). Additionally, or alternatively, another CSI report may include CSI report values corresponding to the channel quality when a downlink transport block is received within downlink resources that do not overlap in time with an uplink transmission (e.g., a non-overlapping channel).

Depending on channel quality variance, CQI reported in CSI reports may be different. These scenarios can result in a different MCS selected for each channel type (e.g., overlapping channel or non-overlapping channel). However, according to 3GPP NR specification TS 38.214, v15.12.0, the scheduling entity selects the MCS for a downlink transmission on a transport block scale. Thus, all code blocks and CBGs within a downlink transport block encoded according to TS 38.214, v15.12.0 are encoded with the same MCS. This selected MCS for the scheduled downlink transmission (e.g., downlink transport block) is further included in the PDCCH scheduling the PDSCH transmission.

Techniques discussed herein enable and provide additional control, specificity, and/or granularity in MCS features. For example, in various aspects of the disclosure, a scheduling entity may be configured to adapt MCS for interference mitigation. Varying MCS can be based on one or more rules to provide an MCS that also accounts for self-interference experienced at a scheduled entity. In some scenarios, the scheduling entity may select a highest possible MCS based on the self-interference. Self-interference may result, for example, from a downlink transport block 812 being transmitted within symbols 802 (e.g., Symbols 4-8) that include an overlapping uplink transmission of an uplink transport block 814. In some examples, the scheduling entity may reduce the MCS of the entire transport block 812 to match the MCS corresponding to the overlapping channel, which may be referred to herein as a minimum MCS or an overlapping MCS. In this example, the scheduling entity may generate all of the CBGs of the downlink transport block 812 using the minimum MCS. As another example, the scheduling entity may select the MCS corresponding to the non-overlapping channel, which may be referred to herein as a maximum MCS or a non-overlapping MCS. In this example, the scheduling entity may generate all of the CBGs of the downlink transport block 812 using the maximum MCS.

In some examples, a scheduling entity may select between MCS values. In some scenarios, selection between minimum MCS and maximum MCS may be based on an amount of overlapping time resources (e.g., between downlink transmissions and uplink transmissions). In an example, a scheduling entity may select the minimum MCS when the amount of overlapping time resources is greater than a threshold. Additionally, or alternatively, a scheduling entity may select the maximum MCS when the amount of overlapping time resources is less than or equal to the threshold.

In some examples, the amount of overlapping time resources may be determined based on the number of symbols 802 of the downlink transport block 812 that include an overlapping uplink transmission. In addition, the threshold may be determined based on a total number of symbols 802 allocated for the downlink transmission. For example, the threshold may be variable based on the total number of symbols or a percentage of the total number of symbols. In an example, the scheduling entity may select the minimum MCS when the number of symbols including an overlapping uplink transmission is greater than a threshold number or threshold percentage of the total number of symbols allocated for the downlink transmission. In the example shown in FIG. 8, the downlink transport block 812 is transmitted over thirteen symbols and the number of symbols including an overlapping uplink transmission is five symbols. Therefore, when the threshold number of symbols is four or less, the scheduling entity may select the minimum MCS for the downlink transport block 812.

In some examples, the scheduling entity may select an intermediate MCS between the maximum MCS and the minimum MCS. Intermediate selections can be based on the amount of overlapping time resources between the downlink resource allocation for the downlink transmission (e.g., downlink transport block 812) and the uplink resource allocation for the uplink transmission (e.g., uplink transport block 814). In this example, the intermediate MCS may be selected from an existing MCS table or a new MCS table specific to full-duplex scheduled entities having time-overlapping downlink and uplink transmissions (partial or full). For example, the scheduling entity may select the intermediate MCS within a selected MCS table corresponding to the amount of overlapping time resources (e.g., within a range including the amount of overlapping time resources). In an example, the amount of overlapping time resources may be determined based on the number or percentage of symbols of the downlink transmission containing an overlapping uplink transmission.

In some examples, the scheduling entity may transmit the selected MCS (e.g., the maximum MCS, the minimum MCS, or the intermediate MCS) for the entire transport block in the PDCCH scheduling the downlink transport block 812. In other examples, the selected MCS may be implicitly indicated by the scheduling entity. For example, the scheduling entity may transmit the maximum MCS in the PDCCH scheduling the downlink transport block 812 and the scheduled entity may calculate the selected MCS (e.g., the maximum MCS, the minimum MCS, or the intermediate MCS) based on the overlapping time resources between the downlink resource allocation and the uplink resource allocation. As another example, the scheduling entity may transmit the minimum MCS in the PDCCH scheduling the downlink transport block 812 and the scheduled entity may calculate the selected MCS (e.g., the maximum MCS, the minimum MCS, or the intermediate MCS) based on the overlapping time resources between the downlink resource allocation and the uplink resource allocation.

In an example, the scheduling entity may transmit a radio resource control (RRC) message to the scheduled entity including a metric for use by the scheduled entity in calculating the selected MCS from the maximum MCS (or minimum MCS) and the overlapping time resources. In some examples, the metric may indicate a difference between the maximum MCS (or minimum MCS) and the selected MCS when the maximum MCS (or minimum MCS) is not the selected MCS for the transport block. In some examples, the metric may include a threshold number or threshold percentage of the total number of symbols allocated for the downlink transmission to use for selecting between the maximum MCS and the minimum MCS based on the amount of overlapping time resources when the maximum or minimum MCS can be the selected MCS. In some examples, the metric may include a mapping between the amount of overlapping time resources, the maximum MCS (or minimum MCS), and an entry in an MCS table when the maximum MCS, the minimum MCS, or an intermediate MCS can be the selected MCS. The metric may further include a new MCS table from which to discern the selected MCS.

In some examples, the scheduling entity may time-interleave the CBGs of the downlink transport block 812 over the symbols 802 allocated for the downlink transmission of the downlink transport block 812 to further accommodate the self-interference. For example, time-interleaving of the CBGs may distribute the interference over all of the transport block 812, thus improving the performance Time-interleaving may be performed by the scheduling entity when using either the maximum MCS or the minimum MCS for the transport block.

In some examples, the scheduling entity may selectively reduce the MCS of the CBGs that overlap with symbols experiencing self-interference. For example, the scheduling entity may identify a first set of overlapping CBGs of the transport block 812 that overlap in time with the uplink transmission (e.g., the uplink transport block 814) and a second set of non-overlapping CBGs of the transport block 812 that are non-overlapping in time with the uplink transmission. In some examples, the scheduling entity may then select the minimum MCS for the first set of overlapping CBGs and the maximum MCS for the second set of non-overlapping CBGs. In other examples, the scheduling entity may select the maximum MCS for the second set of non-overlapping CBGs and an intermediate MCS between the maximum and minimum MCS for the first set of overlapping CBGs. In still other examples, the scheduling entity may select the minimum MCS for the first set of overlapping CBGs and an intermediate MCS between the maximum and minimum MCS for the second set of non-overlapping CBGs.

In some examples, the scheduling entity may transmit both of the MCSs selected for the transport block in the PDCCH scheduling the downlink transport block 812. For example, the scheduling information for the transport block may include the minimum MCS (or other selected MCS) for the first set of overlapping CBGs and the maximum MCS (or other selected MCS) for the second set of non-overlapping CBGs. In other examples, the scheduling entity may explicitly signal the maximum MCS (or other selected MCS) for the second set of non-overlapping CBGs in the PDCCH for the downlink transport block 812. The minimum MCS (or other selected MCS) for the first set of overlapping CBGs may then be implicitly determined by the scheduled entity. In other examples, the scheduling entity may explicitly signal the minimum MCS (or other selected MCS) for the first set of overlapping CBGs in the PDCCH for the downlink transport block 812. The maximum MCS (or other selected MCS) for the second set of non-overlapping CBGs may then be implicitly determined by the scheduled entity.

In an example, the scheduled entity may calculate the MCS selected for the first set of overlapping CBGs based on the maximum MCS (or other selected MCS) and the overlapping time resources between the downlink resource allocation for the downlink transmission and the uplink resource allocation for the uplink transmission. In an example, the scheduling entity may transmit a radio resource control (RRC) message to the scheduled entity including a metric for use by the scheduled entity in calculating the MCS for the first set of overlapping CBGs from the selected MCS for the second set of non-overlapping CBGs and the overlapping time resources. In some examples, the metric may indicate a difference between the MCS selected for the second set of non-overlapping CBGs and the MCS selected for the first set of overlapping CBGs. In some examples, the metric may include a mapping between the amount of overlapping time resources, the selected non-overlapping MCS, and an entry in an MCS table (existing or new).

Figure 9:
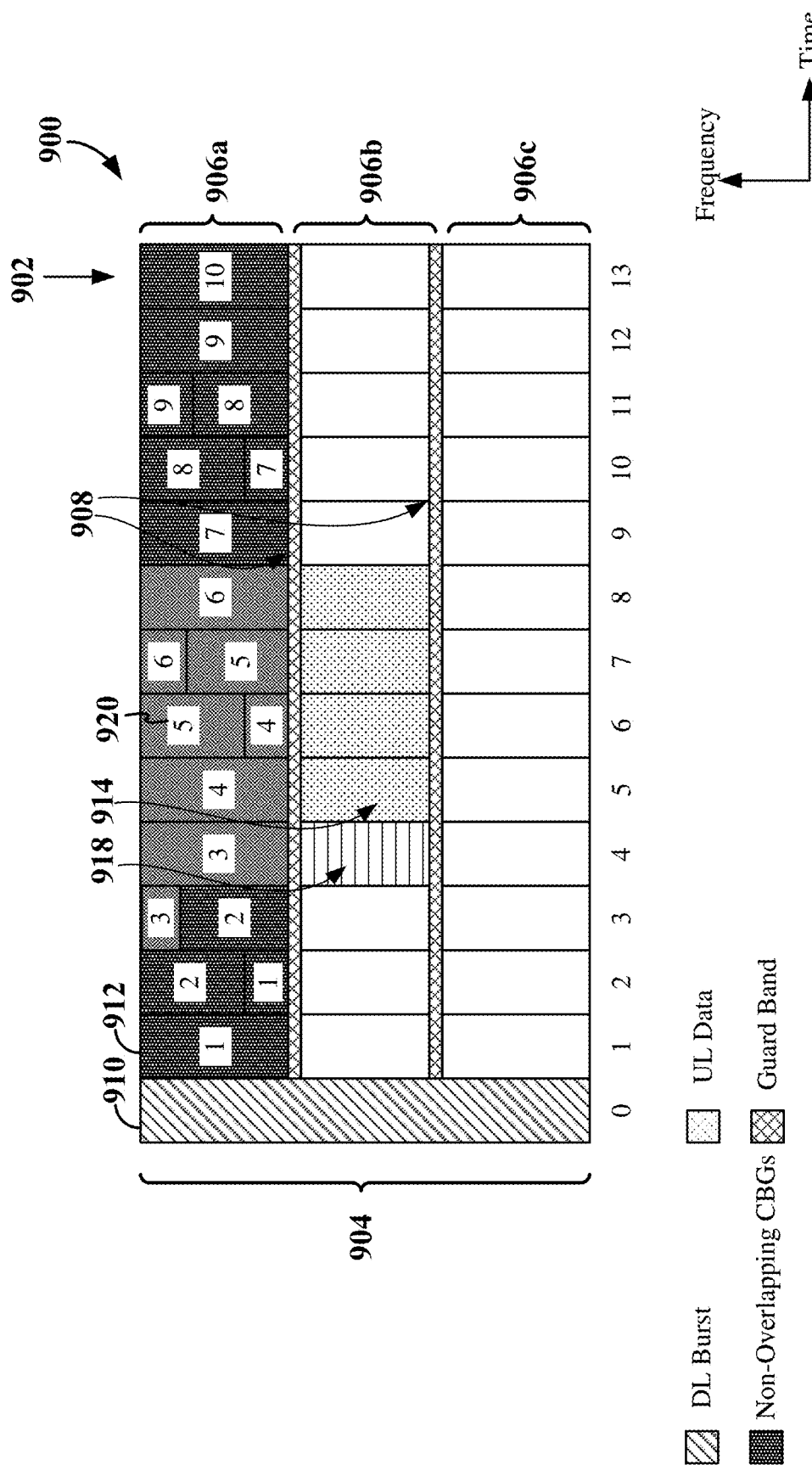
FIG. 9 is a diagram illustrating another example of a full-duplex slot including time-overlapping downlink and uplink transmissions that may result in self-interference at a scheduled entity according to some aspects.

FIG. 9 is a diagram illustrating an exemplary slot 900 including time-overlapping downlink and uplink transmissions that may result in self-interference at a scheduled entity according to some aspects. In the example shown in FIG. 9, time is in the horizontal direction with units of symbols 902 (e.g., OFDM symbols); and frequency is in the vertical direction. As in the example shown in FIG. 8, a carrier bandwidth 904 is illustrated along the frequency axis divided into a number of sub-bands (or BWPs) 906a-906c for sub-band FDD full-duplex operation. Sub-bands 906a and 906c can be allocated for downlink transmissions, while sub-band 906b can be allocated for uplink transmissions.

Guard bands 908 are further provided between the uplink (UL) sub-band 906b and the downlink (DL) sub-bands 906a and 906c.

Similar to the example shown in FIG. 8, in the example shown in FIG. 9, the slot 900 includes a DL burst 910 in a first symbol 902 (Symbol 0) of the slot 900. The DL burst 910 may include, for example, one or more PDCCHs, each including DCI for a scheduled entity. In an example, the DCI may include scheduling information for scheduling a downlink resource allocation in time and frequency for the transmission of a downlink transport block 912 (DL data), along with one or more DL reference signals (not specifically shown), in the slot 900. The DL data may be transmitted, for example, within a PDSCH. In addition, the scheduling information may include an uplink resource allocation in time and frequency for the transmission of an uplink transport block 914 (UL data), along with one or more UL reference signals (e.g., DMRS 918), in the slot 900.

In the example shown in FIG. 9, the downlink transport block 912 includes a plurality of CBGs 920 (CBG1-CBG10). Each CBG 920 includes a plurality of CBs. In addition, each CBG 920 may be transmitted within one or more symbols 902. For example, CBG3 may be transmitted across a portion of Symbol 3 and all of Symbol 4.

As further shown in FIG. 9, a part of the downlink transport block 912 is scheduled for transmission within resources (e.g., Symbols 4-8) overlapping in time with the scheduled uplink transmission of the uplink transport block 914. The time-overlapping part of the downlink transport block 912 includes a first set of overlapping CBGs 920. In the example shown in FIG. 9, since at least a portion of CBG3 is transmitted in Symbol 4, the first set of overlapping CBGs includes CBG3-CBG6. In addition, the downlink transport block 912 further includes a second set of non-overlapping CBGs 920 non-overlapping in time with the scheduled transmission of the uplink transport block 914. In the example shown in FIG. 9, the second set of non-overlapping CBGs includes CBG1, CBG2, and CBG7-CBG10.

In some examples, the scheduling entity can selectively reduce the MCS of the first set of overlapping CBGs 920 in comparison to the MCS of the second set of non-overlapping CBGs 920. For example, the scheduling entity may utilize the minimum MCS for the first set of overlapping CBGs and the maximum MCS for the second set of non-overlapping CBGs. In other examples, the scheduling entity may utilize the maximum MCS for the second set of non-overlapping CBGs and an intermediate MCS between the maximum and minimum MCS for the first set of overlapping CBGs. In still other examples, the scheduling entity may utilize the minimum MCS for the first set of overlapping CBGs and an intermediate MCS between the maximum and minimum MCS for the second set of non-overlapping CBGs. The scheduling entity may further explicitly indicate both MCS values (overlapping MCS and non-overlapping MCS) to the scheduled entity in the PDCCH scheduling the downlink transport block 912 or implicitly indicate the overlapping MCS based on the non-overlapping MCS (or overlapping MCS) and the amount of overlapping time resources between the uplink and downlink transmissions.

Figure 10:
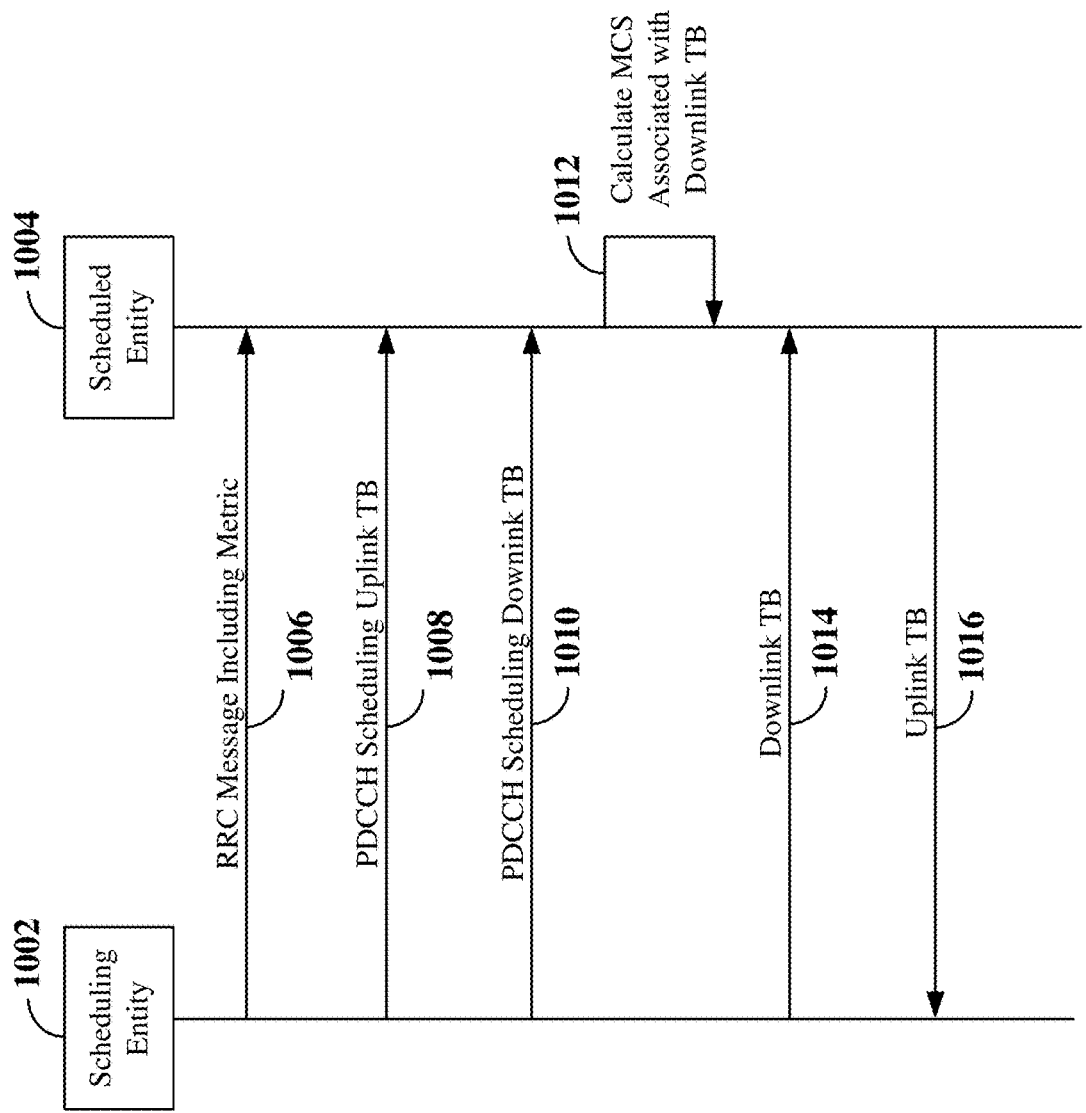
FIG. 10 is a signaling diagram illustrating an example of MCS adaptation in full-duplex mode according to some aspects.

FIG. 10 is a signaling diagram illustrating an example of MCS adaptation in full-duplex mode according to some aspects. In the example shown in FIG. 10, a scheduling entity 1002 is in wireless communication with a scheduled entity 1004. The scheduling entity 1002 may correspond to any of the scheduling entities or base stations shown in FIGS. 1, 2, and/or 7 that may be configured to operate in a half-duplex mode or a full-duplex mode. The scheduled entity 1004 may correspond to any of the scheduled entities or UEs shown in FIGS. 1, 2, and/or 7 that may be configured to operate in a full-duplex mode.

At 1006, the scheduling entity 1002 transmits an RRC message including a metric to the scheduled entity 1004. The metric may be used by the scheduled entity in identifying a selected MCS for a downlink transmission of a downlink transport block.

At 1008, the scheduling entity 1002 transmits a PDCCH scheduling an uplink transport block to the scheduled entity 1004. The PDDCH includes DCI that contains uplink scheduling information for an uplink transmission of the uplink transport block. The uplink scheduling information may include, for example, an uplink resource allocation for the uplink transmission. The uplink resource allocation may indicate time-frequency resource on which the uplink transport block may be transmitted by the scheduled entity 1004. For example, the uplink resource allocation may indicate a number of symbols within a slot allocated for the uplink transmission, along with an uplink sub-band of a carrier frequency allocated for the uplink transmission.

At 1010, the scheduling entity 1002 transmits a PDCCH scheduling a downlink transport block to the scheduled entity 1004. The PDCCH includes DCI that contains downlink scheduling information for a downlink transmission of the downlink transport block. The downlink scheduling information may include, for example, a downlink resource allocation for the downlink transmission. The downlink resource allocation may indicate time-frequency resources on which the downlink transport block may be transmitted. For example, the downlink resource allocation may indicate a number of symbols within a slot allocated for the downlink transmission, along with a downlink sub-band of a carrier frequency allocated for the downlink transmission. The downlink scheduling information may further include an initial selected MCS for the downlink transport block. The initial selected MCS may correspond to a highest MCS selected for the downlink transport block. In some examples, the highest MCS may be the maximum MCS or other intermediate MCS selected for non-overlapping CBGs of the downlink transport block. Here, the non-overlapping CBGs are non-overlapping in time with the uplink transmission. That is, the non-overlapping CBGs are transmitted within symbols that do not carry the uplink transmission.

At 1012, the scheduled entity 1004 calculates a subsequent selected MCS associated with the downlink transport block based on the metric. For example, the initial selected MCS included in the downlink scheduling information may be the maximum MCS (or other selected MCS) associated with a non-overlapping channel. The scheduled entity may calculate the subsequent selected MCS based on the maximum MCS (or other selected MCS) and the overlapping time resources between the downlink resource allocation and the uplink resource allocation using the metric.

In examples in which the subsequent selected MCS is used for the entire downlink transport block (e.g., all CBGs of the transport block are generated using the subsequent selected transport block), the metric may indicate a difference between the maximum MCS and the subsequent selected MCS when the maximum MCS is not the subsequent selected MCS. In some examples, the metric may include a threshold number or threshold percentage of the total number of symbols allocated for the downlink transmission to use in selecting between the maximum MCS and the minimum MCS as the subsequent selected MCS. In some examples, the metric may further include a mapping between the amount of overlapping time resources associated with the maximum MCS and an entry in an MCS table. The metric may further include a new MCS table from which to discern the selected MCS.

In examples in which the subsequent selected MCS is used for overlapping CBGs of the transport (e.g., a first set of overlapping CBGs are generated using the subsequent selected MCS and a second set of non-overlapping CBGs are generated using the initial selected MCS), the metric may indicate a difference between the initial selected MCS selected for the second set of non-overlapping CBGs and the subsequent selected MCS selected for the first set of overlapping CBGs. In some examples, the metric may include a mapping between the amount of overlapping time resources associated with the initial selected MCS and an entry in an MCS table (existing or new).

At 1014, the scheduling entity 1002 transmits the downlink transmission including the downlink transport block to the scheduled entity 1004. The downlink transport block includes a plurality of CBGs generated using at least the subsequent selected MCS. At 1016, the scheduled entity 1004 transmits the uplink transport block to the scheduling entity 1002. The uplink transmission of the uplink transport block at least partially overlaps in time with the downlink transmission of the downlink transport block.

Figure 11:
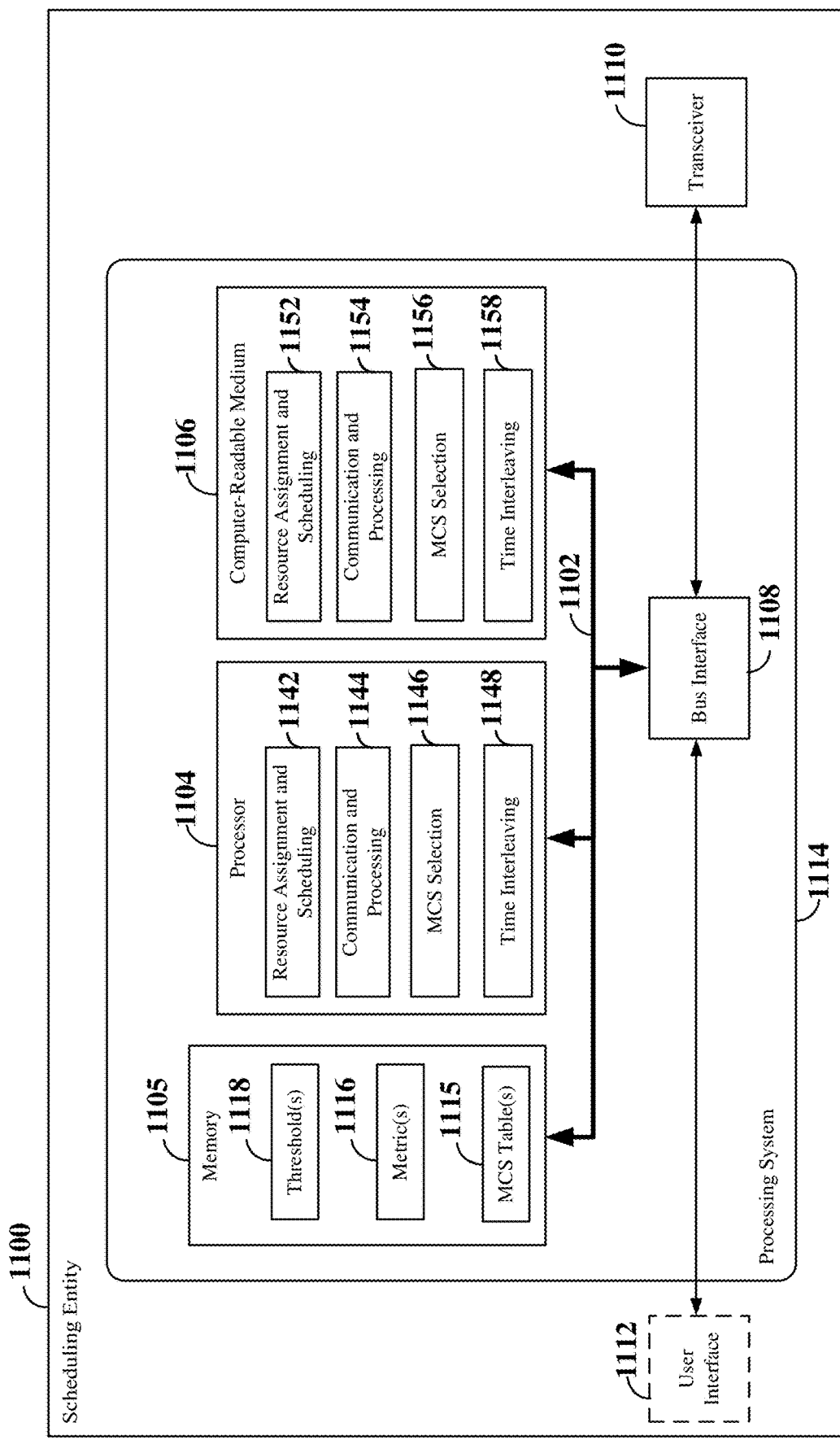
FIG. 11 is a block diagram illustrating an example of a hardware implementation for a scheduling entity employing a processing system according to some aspects.

FIG. 11 is a conceptual diagram illustrating an example of a hardware implementation for an exemplary scheduling entity 1100 employing a processing system 1114. For example, the scheduling entity 1100 may be a base station (e.g., gNB) or other scheduling entity as illustrated in any one or more of FIGS. 1, 2, 5, 11, 12 and/or 14.

The scheduling entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes described below.

The processor 1104 may in some instances be implemented via a baseband or modem chip and in other implementations, the processor 1104 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110. The transceiver 1110 provides a means for communicating with various other apparatus over a transmission medium (e.g., air interface). Depending on the nature of the apparatus, a user interface 1112 (e.g., keypad, display, touchscreen, speaker, microphone, control knobs, etc.) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store one or more modulation and coding scheme (MCS) table(s) 1115, one or more metric(s) 1116, and one or more threshold(s) 1118 used by the processor 1104 in selecting a MCS for a downlink transmission.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. In some examples, the computer-readable medium 1106 may be part of the memory 1105. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include resource assignment and scheduling circuitry 1142, configured to generate, schedule, and modify a resource assignment or grant of time-frequency resources. For example, the resource assignment and scheduling circuitry 1142 may schedule time-frequency resources within a plurality of sub-bands or BWPs of one or more TDD half-duplex and/or FDD full-duplex subframes or slots to carry user data traffic and/or control information to and/or from multiple scheduled entities.

In various aspects of the present disclosure, the resource assignment and scheduling circuitry 1142 may be configured to schedule an uplink transmission from a scheduled entity of an uplink transport block within a plurality of symbols of a slot and within one or more uplink sub-band or BWPs of the slot. In addition, the resource assignment and scheduling circuitry 1142 may be configured to schedule a downlink transmission to the scheduled entity of a downlink transport block within a plurality of symbols of the same slot as the uplink transmission and within one or more downlink sub-bands or BWPs of the slot. In some examples, the downlink transmission at least partially overlaps in time with the uplink transmission (e.g., at least a portion of the plurality of symbols scheduled for the downlink transmission and the uplink transmission are the same). For example, the downlink transport block may include a plurality of CBGs. At least a first set of overlapping CBGs of the plurality of CBGs may overlap in time with the uplink transmission when the scheduled entity is operating in full-duplex mode.

The resource assignment and scheduling circuitry 1142 may further be configured to schedule an RRC message including a metric 1116 to assist the scheduled entity in calculating a first MCS associated with at least the first set of overlapping CBGs. The metric 1116 may be stored, for example, in memory 1105. The resource assignment and scheduling circuitry 1142 may further be configured to execute resource assignment and scheduling software 1152 stored in the computer-readable medium 1106 to implement one or more of the functions described herein.

The processor 1104 may further include communication and processing circuitry 1144 configured to communicate with the multiple scheduled entities in a half-duplex mode or a full-duplex mode over a carrier frequency. In some examples, the communication and processing circuitry 1144 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1144 may include one or more transmit/receive chains.

In some implementations where the communication involves receiving information, the communication and processing circuitry 1144 may obtain information from a component of the wireless communication device 1100 (e.g., from the transceiver 1110 that receives the information via radio frequency signaling or some other type of signaling suitable for the applicable communication medium), process (e.g., decode) the information, and output the processed information. For example, the communication and processing circuitry 1144 may output the information to another component of the processor 1104, to the memory 1105, or to the bus interface 1108. In some examples, the communication and processing circuitry 1144 may receive one or more of signals, messages, other information, or any combination thereof. In some examples, the communication and processing circuitry 1144 may receive information via one or more channels. In some examples, the communication and processing circuitry 1144 may include functionality for a means for receiving. In some examples, the communication and processing circuitry 1144 may include functionality for a means for processing, including a means for demodulating, a means for decoding, etc.

In some implementations where the communication involves sending (e.g., transmitting) information, the communication and processing circuitry 1144 may obtain information (e.g., from another component of the processor 1104, the memory 1105, or the bus interface 1108), process (e.g., modulate, encode, etc.) the information, and output the processed information. For example, the communication and processing circuitry 1144 may output the information to the transceiver 1110 (e.g., that transmits the information via radio frequency signaling or some other type of signaling suitable for the applicable communication medium). In some examples, the communication and processing circuitry 1144 may send one or more of signals, messages, other information, or any combination thereof. In some examples, the communication and processing circuitry 1144 may send information via one or more channels. In some examples, the communication and processing circuitry 1144 may include functionality for a means for sending (e.g., a means for transmitting). In some examples, the communication and processing circuitry 1144 may include functionality for a means for generating, including a means for modulating, a means for encoding, etc.

In some examples, the communication and processing circuitry 1144 may be configured to generate a downlink transport block including a plurality of CBGs. For example, the communication and processing circuitry 1144 may be configured to generate the plurality of CBGs using an MCS selected for the transport block from an MCS table 1115. The MCS table(s) 1115 may be stored, for example, in memory 1105. The selected MCS may include, for example, a minimum MCS or a maximum MCS for the transport block. Here, the minimum MCS may be determined based on the first set of overlapping CBGs including all of the plurality of CBGs (e.g., the downlink transmission and the uplink transmission are scheduled on the same set of symbols), whereas the maximum MCS may be determined based on the first set of overlapping CBGs including an empty set (e.g., the downlink transmission and the uplink transmission are scheduled on different, non-overlapping sets of symbols).

In some examples, the communication and processing circuitry 1144 may be configured to generate the plurality of CBGs using at least a first MCS selected to accommodate interference when at least the first set of overlapping CBGs overlaps in time with the uplink transmission. For example, the communication and processing circuitry 1144 may be configured to generate all of the plurality of CBGs of the transport block using the first MCS. As another example, the communication and processing circuitry 1144 may be configured to generate the first set of overlapping CBGs using the first MCS and a second set of non-overlapping CBGs of the plurality of CBGs of the transport block non-overlapping in time with the uplink transmission using a second MCS. Here, the first MCS may be lower than the second MCS. In some examples, the first MCS may be the minimum MCS and the second MCS may be the maximum MCS. In other examples, the first MCS may be an intermediate MCS between the minimum MCS and the maximum MCS.

The communication and processing circuitry 1144 may further be configured to generate and transmit downlink scheduling information for the downlink transmission to the scheduled entity via the transceiver 1110. The downlink scheduling information may be included, for example, within DCI of a PDCCH. The downlink scheduling information includes a downlink resource allocation allocated by the resource assignment and scheduling circuitry 1142 for the downlink transmission. For example, the downlink resource allocation may indicate the time-frequency resources (e.g., plurality of symbols and one or more downlink BWPs) on which the downlink transmission of the downlink transport block is scheduled.

The downlink scheduling information may further include the selected MCS for the transport block. For example, the scheduling information may include the first MCS when the first MCS is used for all of the CBGs of the transport block. As another example, the scheduling information may include both the first MCS and the second MCS when the first MCS is used for the first set of overlapping CBGs and the second MCS is used for the second set of non-overlapping CBGs. As yet another example, the scheduling information may include the second MCS from which the first MCS may be implicitly determined by the scheduled entity when the first MCS is used for at least the first set of overlapping CBGs.

The communication and processing circuitry 1144 may further be configured to generate and transmit uplink scheduling information to the scheduled entity via the transceiver 1110. The uplink scheduling information may be included, for example, within DCI of a PDCCH. The uplink scheduling information includes an uplink resource allocation allocated by the resource assignment and scheduling circuitry 1142 for the uplink transmission. For example, the uplink resource allocation may indicate the time-frequency resources (e.g., plurality of symbols and one or more uplink BWPs) on which the uplink transmission of the uplink transport block is scheduled.

In addition, the communication and processing circuitry 1144 may be configured to transmit the downlink transmission including the plurality of CBGs of the transport block to the scheduled entity via the transceiver 1110. For example, the communication and processing circuitry 1144 may be configured to transmit the downlink transmission within a PDSCH carrying the plurality of CBGs of the downlink transport block, along with one or more reference signals (e.g., DMRS) to assist in demodulating and decoding the plurality of CBGs of the downlink transport block. In some examples, the communication and processing circuitry 1144 may be configured to transmit the first set of overlapping CBGs to the scheduled entity within one or more symbols of the plurality of symbols in the slot allocated for the downlink transmission.

The communication and processing circuitry 1144 may further be configured to receive the uplink transmission from the scheduled entity via the transceiver 1110. For example, the communication and processing circuitry 1144 may be configured to receive the uplink transmission within a PUSCH carrying the uplink transport block, along with one or more reference signals (e.g., DMRS) to assist in demodulating and decoding the uplink transport block. In some examples, the communication and processing circuitry 1144 may be configured to receive the uplink transmission within the same one or more symbols of the slot over which the first set of overlapping CBGs of the downlink transport block is transmitted. The communication and processing circuitry 1144 may further be configured to generate and transmit the RRC message including the metric 1116 to the scheduled entity.

In addition, the communication and processing circuitry 1144 may further be configured to receive and process the two CSI reports from the scheduled entity. Here, one of the CSI reports is associated with an overlapping channel (e.g., a channel in which downlink and uplink transmissions to and from the scheduled entity overlap in time). The other CSI report is associated with a non-overlapping channel (e.g., a channel in which downlink transmissions to the scheduled entity do not overlap in time with uplink transmissions from the scheduled entity). In some examples, the CSI reports received from the scheduled entity may include respective CSI report quantities for a plurality of CSI report parameters (e.g., CQI, PMI, RI, LI, and/or L1-RSRP). Each CQI may provide a respective MCS index identifying a respective MCS to use for each channel type (e.g., overlapping channel and non-overlapping channel). The communication and processing circuitry 1144 may further be configured to execute communication and processing software 1154 stored in the computer-readable medium 1106 to implement one or more of the functions described herein.

The processor 1104 may further include MCS selection circuitry 1146, configured to select at least one MCS from an MCS table 1115 for a downlink transport block to be transmitted to a scheduled entity. The MCS selection circuitry 1146 may further be configured to provide an indication of the selected MCS(s) to the communication and processing circuitry 1144 for generation of the plurality of CBGs using the selected MCS(s).

In some examples, the MCS selection circuitry 1146 may be configured to determine whether at least a first set of CBGs of the downlink transport block overlap in time with an uplink transmission from the scheduled entity. When at least the first set of CBGs of the downlink transport block overlap in time with an uplink transmission, the MCS selection circuitry 1146 may be configured to identify a minimum MCS for the downlink transport block and a maximum MCS for the downlink transport block. The minimum MCS may be determined based on the first set of overlapping CBGs including all of the plurality of CBGs of the transport block. Here, the minimum MCS corresponds to the worst case MCS that assumes that the entire downlink transmissions suffers from self-interference at the scheduled entity. For example, the minimum MCS may correspond to the MCS indicated in the CSI report associated with the overlapping channel. The maximum MCS may be determined based on the first set of overlapping CBGs including an empty set. Here, the maximum MCS corresponds to the best case MCS that assumes that the entire downlink transmission does not experience self-interference at the scheduled entity. For example, the maximum MCS may correspond to the MCS indicated in the CSI report associated with the non-overlapping channel.

In some examples, the MCS selection circuitry 1146 may be configured to select between the minimum MCS and the maximum MCS for the transport block based on an amount of overlapping time resources between the downlink transmission and the uplink transmission. For example, the MCS selection circuitry 1146 may be configured to select the minimum MCS as the MCS to use in generating each of the plurality of CBGs of the transport block when the amount of overlapping time resources is greater than a threshold 1118. In addition, the MCS selection circuitry 1146 may be configured to select the maximum MCS as the MCS to use in generating each of the plurality of CBGs of the transport block when the amount of overlapping time resources is less than or equal to the threshold 1118. The threshold 1118 may be stored, for example, in memory 1105. In some examples, the threshold may indicate a threshold number of symbols and may be represented as a percentage of a total number of symbols of the downlink transmission (e.g., the total number of symbols allocated to the PDSCH including the downlink transport block and any DMRS) or an actual number of symbols based on the total number of symbols. For the latter, the threshold 1118 may include a plurality of threshold(s), each associated with a respective total number of symbols.

For example, the MCS selection circuitry 1146 may be configured to identify the total number of symbols allocated for the downlink transmission. The MCS selection circuitry 1146 may then be configured to identify a number of overlapping symbols of the downlink transport block that include an overlapping uplink transmission. In one example, based on the number of overlapping symbols and the total number of symbols, the MCS selection circuitry 1146 may be configured to calculate the percentage of the total number of symbols containing the overlapping uplink transmission and compare the percentage to the threshold 1118 to determine whether to use the maximum MCS or the minimum MCS for the transport block. In another example, based on the total number of symbols, the MCS selection circuitry 1146 may be configured to identify a threshold number of symbols 1118 and compare the number of overlapping symbols to the threshold number of symbols 1118 to determine whether to use the maximum MCS or the minimum MCS for the transport block.

In some examples, the MCS selection circuitry 1146 may be configured to select an intermediate MCS between the maximum MCS and the minimum MCS based on the amount of overlapping time resources between the downlink transmission and the uplink transmission. In this example, the intermediate MCS may be selected from an existing MCS table 1115 or a new MCS table 1115 created for use when downlink and uplink transmissions to and from a full-duplex scheduled entity at least partially overlap in time. For example, the MCS selection circuitry 1146 may select an intermediate MCS within a selected MCS table 1115 (e.g., existing or new) based on the amount of overlapping time resources. In an example, for the selected MCS table 1115, the MCS selection circuitry 1146 may associate each MCS index between the maximum MCS and the minimum MCS with a respective range of overlapping resources (e.g., as a percentage or number of symbols) and select the MCS associated with the range including the amount of overlapping time resources for the downlink transmission.

In some examples, the MCS selection circuitry 1146 may select a first MCS for the first set of overlapping CBGs of the transport block and a second MCS for the second set of non-overlapping CBGs of the transport block. In an example, the first MCS may correspond to the minimum MCS and the second MCS may correspond to the maximum MCS for the transport block. In other examples, one or more of the first MCS or the second MCS may include an intermediate MCS that may be selected based on the amount of overlapping time resources and/or other suitable factors.

The MCS selection circuitry 1146 may further be configured to generate the metric 1116 that may be used by the scheduled entity to derive the selected MCS for at least the first set of overlapping CBGs based on a second MCS (e.g., a maximum MCS or other intermediate MCS). In some examples, the metric 1116 may indicate a difference between the second MCS and the selected MCS. In some examples, the metric 1116 may include a threshold number or threshold percentage of the total number of symbols allocated for the downlink transmission to use in selecting between the maximum MCS and the minimum MCS for the entire downlink transport block. In some examples, the metric 1116 may include a mapping between the amount of overlapping time resources, the second MCS, and an entry in an MCS table. The metric 1116 may further include a new MCS table from which to discern the selected MCS. The MCS selection circuitry 1146 may further be configured to execute MCS selection software 1156 stored in the computer-readable medium 1106 to implement one or more of the functions described herein.

The processor 1104 may further include time-interleaving circuitry 1148, configured to time-interleave the plurality of CBGs of a downlink transport block across each of the plurality of symbols allocated for the downlink transmission of the downlink transport block. Time-interleaving of the CBGs may distribute the interference over all of the downlink transport blocks, thus improving the performance. The time-interleaving circuitry 1148 may perform time-interleaving when using either the maximum MCS, the minimum MCS, or an intermediate MCS for the entire transport block. The time-interleaving circuitry 1148 may further be configured to execute time-interleaving software 1158 stored in the computer-readable medium 1106 to implement one or more of the functions described herein.

Figure 12:
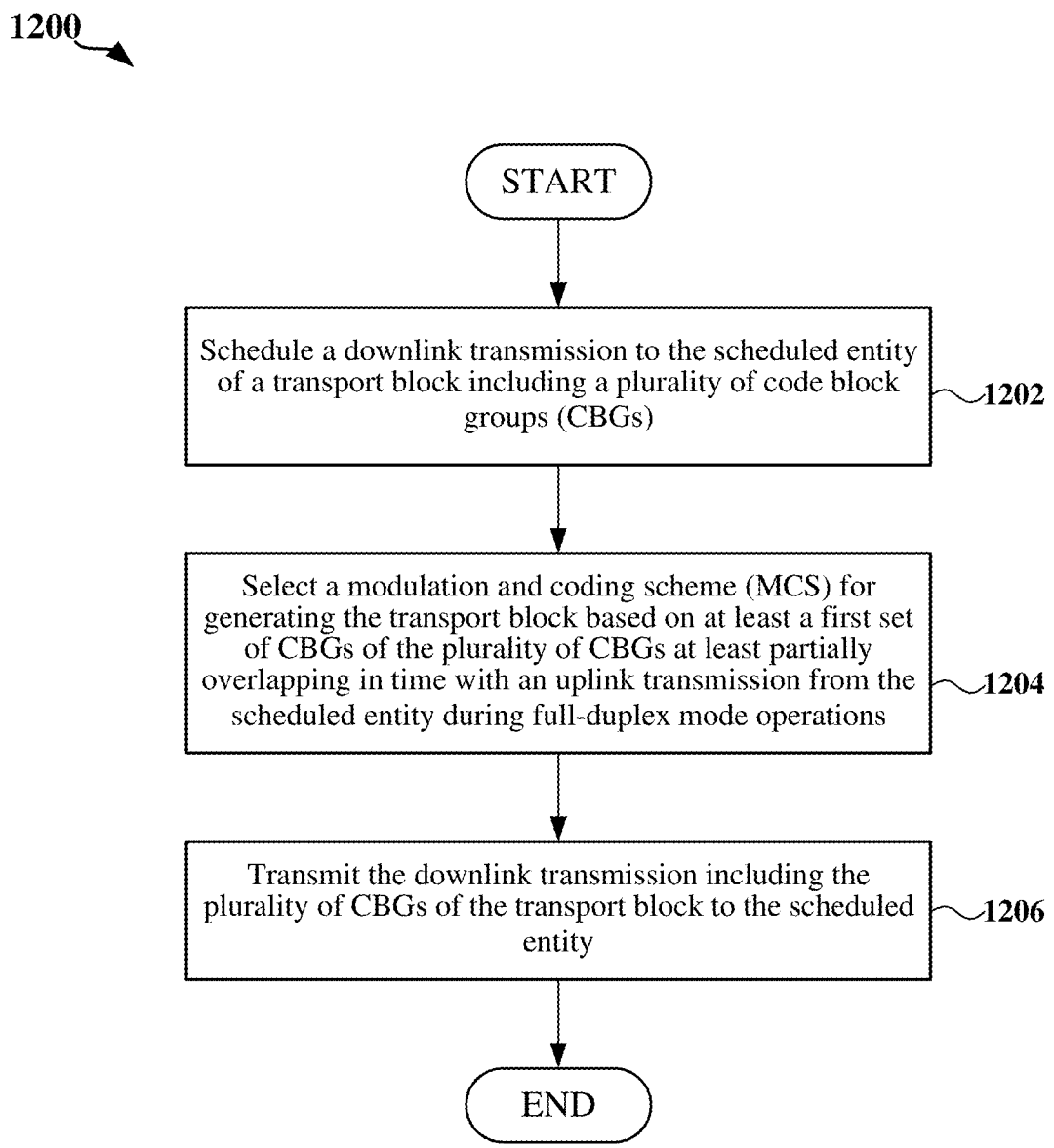
FIG. 12 is a flow chart of an exemplary method for MCS adaptation for full-duplex communications at a scheduling entity according to some aspects.

FIG. 12 is a flow chart 1200 of a method for MCS adaptation for full-duplex communications at a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1100, as described above and illustrated in FIG. 11, by a processor or processing system, or by any suitable means for carrying out the described functions.

At block 1202, the scheduling entity may schedule a downlink transmission to the scheduled entity. In some instances, the downlink transmission can include a transport block including a plurality of (e.g., two or more) code block groups (CBGs). In some examples, a scheduling entity may schedule a downlink resource allocation of time and/or frequency resources on which to transmit the downlink transmission (e.g., transport block including CBGs). Additionally, or alternatively, the downlink resource allocation may include a plurality of symbols of a slot and/or one or more downlink sub-bands or BWPs of a carrier frequency. In some deployments, the resource assignment and scheduling circuitry 1142 shown and described above in connection with FIG. 11 may provide a means to schedule the downlink transmission.

At block 1204, the scheduling entity may select a modulation and coding scheme (MCS) for generating the transport block (e.g., the plurality of CBGs of the transport block). The selected MCS may be an initial selection, subsequent selection, and/or selection to modify a previous MCS selection. In some examples, the selected MCS may include at least a first MCS. Selection of MCS can be done to accommodate and/or mitigate interference. In some deployments, MCS selection can be done based on conflicting UL and DL transmissions (e.g., UL/DL transmissions occurring at the same time). As one particular example, MCS selection can occur based on at least a first set of CBGs of the plurality of CBGs for the downlink transmission at least partially conflicting or overlapping in time with an uplink transmission (e.g., from a scheduled entity during full-duplex mode operations). Overlapping or conflicting transmissions can include scenarios where respective transmissions (UL and DL) may attempt to use the same time resource.

As mentioned above, method 1200 can also include additional MCS selection features. In some examples, the scheduling entity may select a single MCS. In other examples, the scheduling entity may select multiple MCS (e.g., a first MCS and a second MCS) associated with the transport block. The second MCS may be different than the first MCS. For example, the first MCS may have a lower rate than the second MCS. In some examples, the scheduling entity may further select the MCS based on at least one of a minimum MCS (e.g., based on the first set of overlapping CBGs including all of the plurality of CBGs) or a maximum MCS (e.g., based on the first set of overlapping CBGs including an empty set). In some examples, the first MCS may be the minimum MCS for the transport block, and the second MCS may be the maximum MCS for the transport block. In some examples, the first MCS may be an intermediate MCS between the maximum MCS and the minimum MCS for the transport block. The intermediate MCS may be selected based on an amount of overlapping time resources between the downlink transmission and the uplink transmission. In some deployments, the MCS selection circuitry 1146 shown and described above in connection with FIG. 11 may provide a means to select at least the first MCS.

The method 1200 can also include additional CBG generation features using a predetermined or selected MCS (e.g., the first MCS). In some examples, the scheduling entity may generate all of the plurality of CBGs of the transport block using the first MCS. For example, the scheduling entity may generate all of the plurality of CBGs of the transport block using the first MCS when the first set of overlapping CBGs includes one or more symbols of a slot and the one or symbols is greater than a threshold number of a plurality of symbols allocated for the downlink transmission. Additionally, or alternatively, the first MCS may be the minimum MCS and the scheduling entity may apply the minimum MCS to each of the CBGs in the transport block. In some examples, the scheduling entity may generate the first set of overlapping CBGs using the first MCS and/or a second set of CBGs of the transport block non-overlapping in time with the uplink transmission using the second MCS. Additionally, or alternatively, the first MCS may be the minimum MCS or an intermediate MCS and the second MCS may be the maximum MCS or the intermediate MCS. In some examples, the scheduling entity may further time-interleave the plurality of CBGs of the transport block over the plurality of symbols allocated for the downlink transmission. In some deployments, the communication and processing circuitry 1144 shown and described above in connection with FIG. 11 may provide a means to generate the plurality of CBGs using the selected MCS.

At block 1208, the scheduling entity may transmit the downlink transmission including the plurality of CBGs of the transport block to the scheduled entity. In some examples, the first set of overlapping CBGs may be transmitted to the scheduled entity via one or more symbols of a slot. In addition, the uplink transmission from the scheduled entity may also be received via the one or more symbols of the slot over which the first set of overlapping CBGs are transmitted. In some deployments, the communication and processing circuitry 1144, together with the transceiver 1110, shown and described above in connection with FIG. 11 may provide a means to transmit the downlink transmission.

Figure 13:
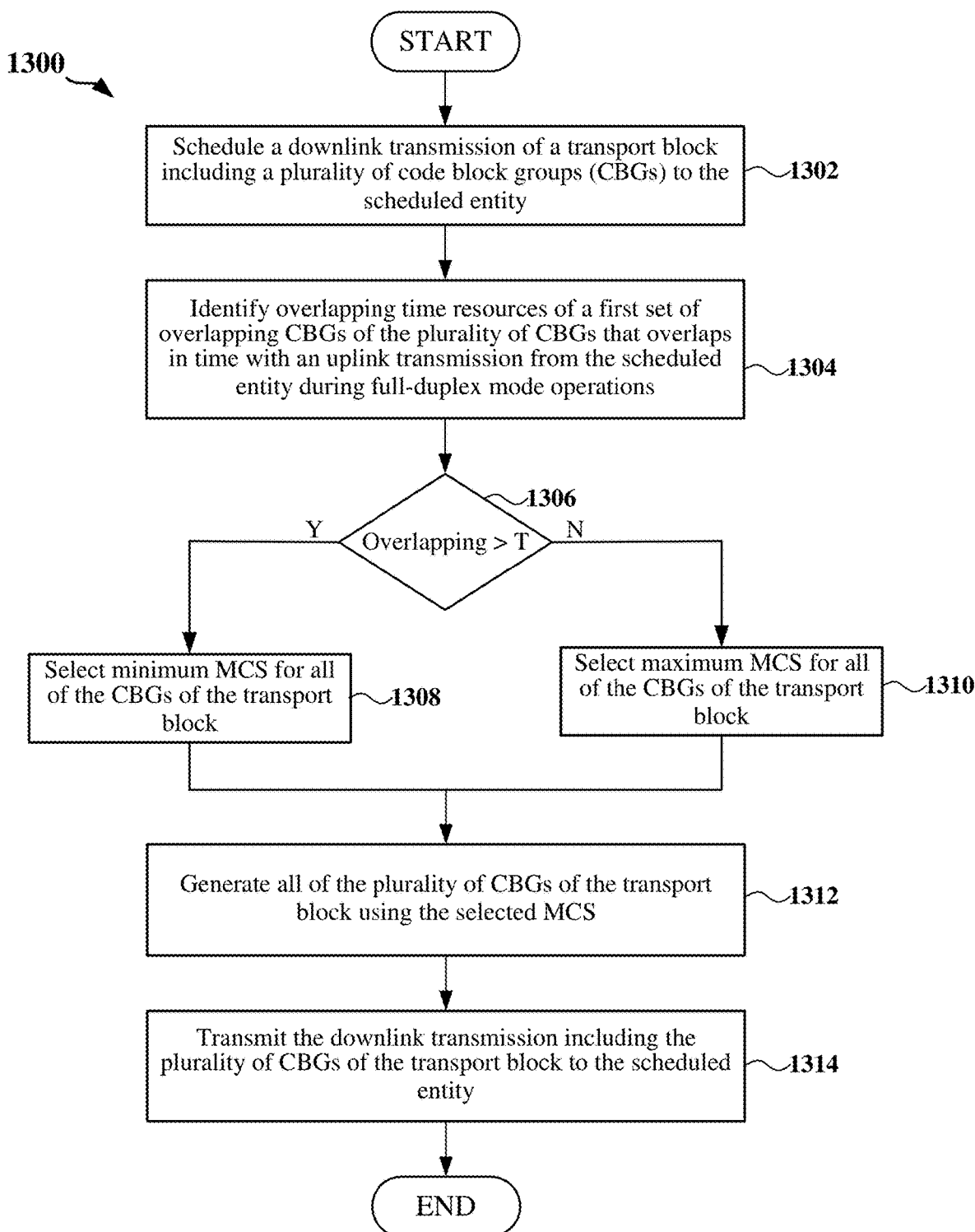
FIG. 13 is a flow chart of another exemplary method for MCS adaptation for full-duplex communications at a scheduling entity according to some aspects.

FIG. 13 is a flow chart 1300 of another method for MCS adaptation for full-duplex communications at a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1100, as described above and illustrated in FIG. 11, by a processor or processing system, or by any suitable means for carrying out the described functions.

At block 1302, the scheduling entity may schedule a downlink transmission to the scheduled entity. In some instances, the downlink transmission can include a transport block including a plurality of (e.g., two or more) code block groups (CBGs). In some examples, a scheduling entity may schedule a downlink resource allocation of time and/or frequency resources on which to transmit the downlink transmission (e.g., transport block including CBGs). Additionally, or alternatively, the downlink resource allocation may include a plurality of symbols of a slot and/or one or more downlink sub-bands or BWPs of a carrier frequency. In some deployments, the resource assignment and scheduling circuitry 1142 shown and described above in connection with FIG. 11 may provide a means to schedule the downlink transmission.

At block 1304, the scheduling entity may identify overlapping time resources of a first set of overlapping CBGs of the plurality of CBGs that overlaps in time with an uplink transmission from the scheduled entity during full-duplex mode operations (e.g., when the scheduled entity is operating in a full-duplex mode). In some examples, the amount of overlapping time resources may be determined based on a number of symbols of the downlink transport block that include the overlapping uplink transmission. In some deployments, the MCS selection circuitry 1146 shown and described above in connection with FIG. 11 may provide a means to identify the overlapping time resources.

At block 1306, the scheduling entity may determine whether the amount of overlapping time resources is greater than a threshold (T). In some examples, the threshold may be determined based on a total number of symbols allocated for the downlink transmission. For example, the threshold may be variable based on the total number of symbols or a percentage of the total number of symbols. In some examples, the scheduling entity may determine whether the number of symbols of the first set of overlapping CBGs is greater than the total number of symbols allocated for the downlink transmission. In some deployments, the MCS selection circuitry 1146 shown and described above in connection with FIG. 11 may provide a means to determine whether the amount of overlapping time resources is greater than the threshold.

If the amount of overlapping time resources is greater than the threshold (Y branch of block 1306), at block 1308, the scheduling entity may select a minimum modulation and coding scheme (MCS) for all of the CBGs of the transport block. In some examples, the minimum MCS may be identified based on the first set of overlapping CBGs including all of the plurality of CBGs. However, if the amount of overlapping time resources is not greater than the threshold (N branch of block 1308), at block 1310, the scheduling entity may select a maximum MCS for all of the CBGs of the transport block. In some examples, the maximum MCS may be identified based on the first set of overlapping CBGs including an empty set. In some deployments, the MCS selection circuitry 1146 shown and described above in connection with FIG. 11 may provide a means to select between the minimum and maximum MCS based on the amount of overlapping time resources between the downlink transmission and the uplink transmission.

At block 1312, the scheduling entity may generate all of the plurality of CBGs of the transport block using the selected MCS. In some examples, the scheduling entity may further time-interleave the plurality of CBGs of the transport block over the plurality of symbols allocated for the downlink transmission. In some deployments, the communication and processing circuitry 1144 shown and described above in connection with FIG. 11 may provide a means to generate the plurality of CBGs using the selected MCS.

At block 1314, the scheduling entity may transmit the downlink transmission including the plurality of CBGs of the transport block to the scheduled entity. In some examples, the first set of overlapping CBGs may be transmitted to the scheduled entity within one or more symbols of a slot. In addition, the uplink transmission from the scheduled entity may also be received within the one or more symbols of the slot over which the first set of overlapping CBGs are transmitted. In some deployments, the communication and processing circuitry 1144, together with the transceiver 1110, shown and described above in connection with FIG. 11 may provide a means to transmit the downlink transmission.

Figure 14:
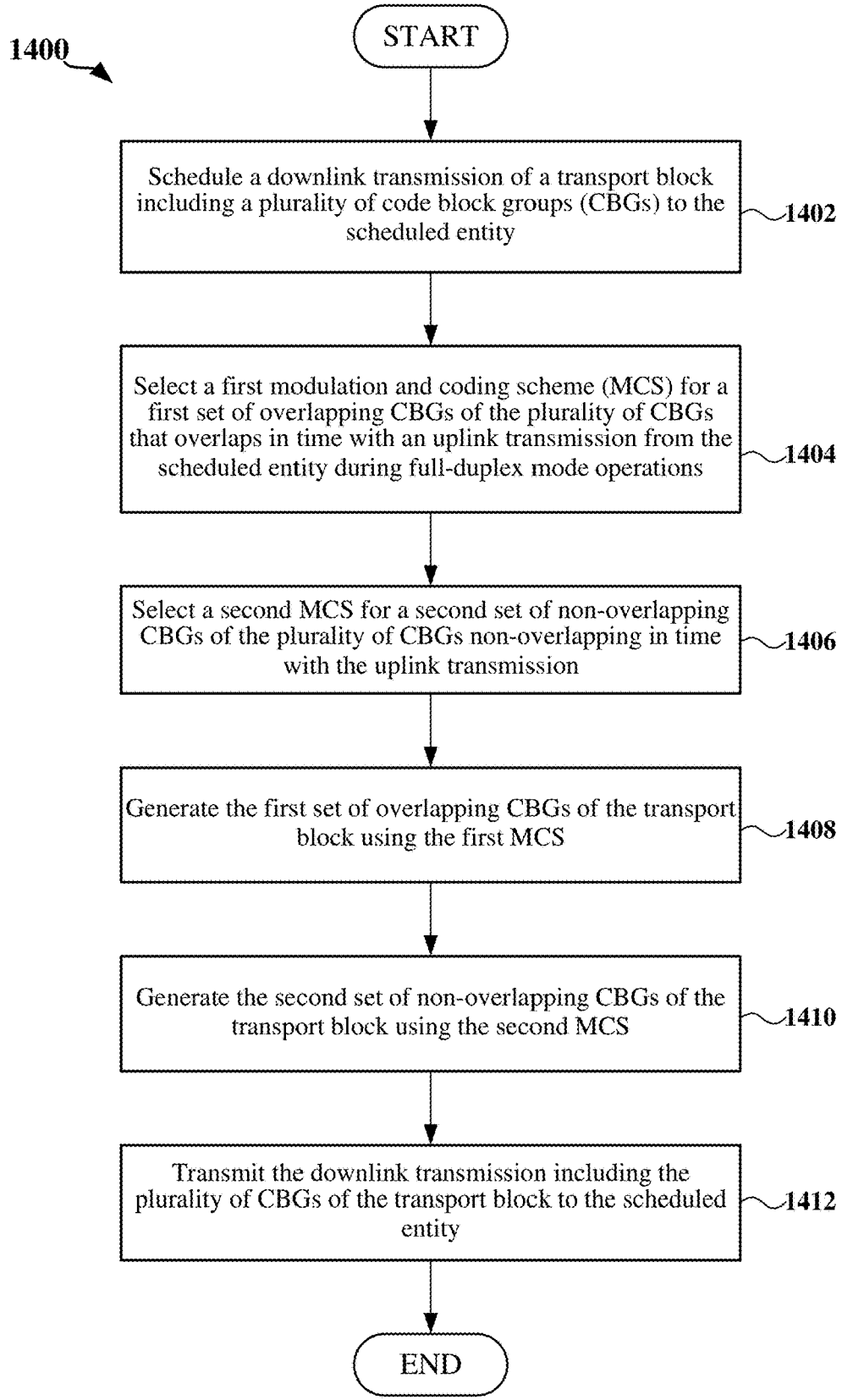
FIG. 14 is a flow chart of another exemplary method for MCS adaptation for full-duplex communications at a scheduling entity according to some aspects.

FIG. 14 is a flow chart 1400 of another method for MCS adaptation for full-duplex communications at a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1100, as described above and illustrated in FIG. 11, by a processor or processing system, or by any suitable means for carrying out the described functions.

At block 1402, the scheduling entity may schedule a downlink transmission to the scheduled entity. In some instances, the downlink transmission can include a transport block including a plurality of (e.g., two or more) code block groups (CBGs). In some examples, a scheduling entity may schedule a downlink resource allocation of time and/or frequency resources on which to transmit the downlink transmission (e.g., transport block including CBGs). Additionally, or alternatively, the downlink resource allocation may include a plurality of symbols of a slot and/or one or more downlink sub-bands or BWPs of a carrier frequency. In some deployments, the resource assignment and scheduling circuitry 1142 shown and described above in connection with FIG. 11 may provide a means to schedule the downlink transmission.

At block 1404, the scheduling entity may select a first modulation and coding scheme (MCS) for a first set of overlapping CBGs of the plurality of CBGs that overlaps in time with an uplink transmission from the scheduled entity during full-duplex mode operations (e.g., when the scheduled entity is operating in a full-duplex mode). In some examples, the scheduling entity may further identify a minimum MCS based on the first set of overlapping CBGs including all of the plurality of CBGs, and a maximum MCS based on the first set of overlapping CBGs including an empty set. In some examples, the first MCS may be the minimum MCS for the transport block. In some examples, the first MCS may be an intermediate MCS between the maximum MCS and the minimum MCS for the transport block. The intermediate MCS may be selected based on an amount of overlapping time resources between the downlink transmission and the uplink transmission. In some deployments, the MCS selection circuitry 1146 shown and described above in connection with FIG. 11 may provide a means to select the first MCS.

At block 1406, the scheduling entity may select a second MCS for a second set of non-overlapping CBGs of the plurality of CBGs non-overlapping in time with the uplink transmission. In some examples, the first MCS may be lower than the second MCS. In some examples, the second MCS may be the maximum MCS for the transport block or the intermediate MCS (e.g., when the first MCS is the minimum MCS or another intermediate MCS lower than the second MCS). In some deployments, the MCS selection circuitry 1146 shown and described above in connection with FIG. 11 may provide a means to select the first MCS.

At block 1408, the scheduling entity may generate the first set of overlapping CBGs of the transport block using the first MCS. In addition, at block 1410, the scheduling entity may generate the second set of non-overlapping CBGs of the transport block using the second MCS. In some examples, the scheduling entity may further time-interleave the plurality of CBGs of the transport block over the plurality of symbols allocated for the downlink transmission. In some deployments, the communication and processing circuitry 1144 shown and described above in connection with FIG. 11 may provide a means to generate the plurality of CBGs using at least the first MCS.

At block 1412, the scheduling entity may transmit the downlink transmission including the plurality of CBGs of the transport block to the scheduled entity. In some examples, the first set of overlapping CBGs may be transmitted to the scheduled entity via one or more symbols of a slot. In addition, the uplink transmission from the scheduled entity may also be received via the one or more symbols of the slot over which the first set of overlapping CBGs are transmitted. In some deployments, the communication and processing circuitry 1144, together with the transceiver 1110, shown and described above in connection with FIG. 11 may provide a means to transmit the downlink transmission.

Figure 15:
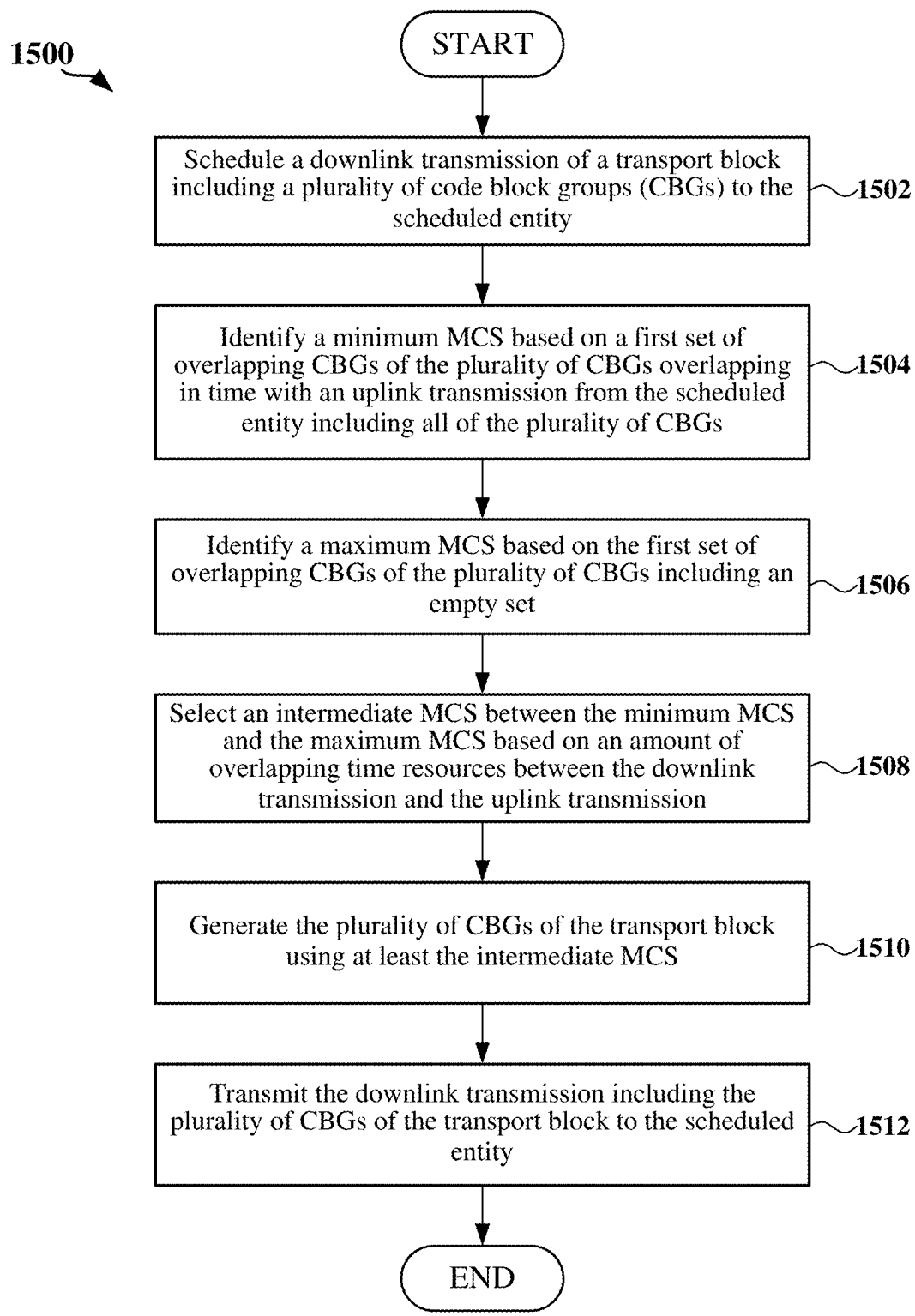
FIG. 15 is a flow chart of another exemplary method for MCS adaptation for full-duplex communications at a scheduling entity according to some aspects.

FIG. 15 is a flow chart 1500 of another method for MCS adaptation for full-duplex communications at a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1100, as described above and illustrated in FIG. 11, by a processor or processing system, or by any suitable means for carrying out the described functions.

At block 1502, the scheduling entity may schedule a downlink transmission to the scheduled entity. In some instances, the downlink transmission can include a transport block including a plurality of (e.g., two or more) code block groups (CBGs). In some examples, a scheduling entity may schedule a downlink resource allocation of time and/or frequency resources on which to transmit the downlink transmission (e.g., transport block including CBGs). Additionally, or alternatively, the downlink resource allocation may include a plurality of symbols of a slot and/or one or more downlink sub-bands or BWPs of a carrier frequency. In some deployments, the resource assignment and scheduling circuitry 1142 shown and described above in connection with FIG. 11 may provide a means to schedule the downlink transmission.

At block 1504, the scheduling entity may identify a minimum modulation and coding scheme (MCS) based on a first set of overlapping CBGs of the plurality of CBGs overlapping in time with an uplink transmission from the scheduled entity including all of the plurality of CBGs. In some examples, the first set of overlapping CBGs may overlap in time with the uplink transmission during full-duplex mode operations (e.g., when the scheduled entity is operating in a full-duplex mode). In addition, at block 1506, the scheduling entity may identify a maximum MCS based on the first set of overlapping CBGs of the plurality of CBGs including an empty set. In some deployments, the MCS selection circuitry 1146 shown and described above in connection with FIG. 11 may provide a means to identify the minimum MCS and the maximum MCS.

At block 1508, the scheduling entity may select an intermediate MCS between the minimum MCS and the maximum MCS based on an amount of overlapping time resources between the downlink transmission and the uplink transmission. In some examples, the amount of overlapping time resources may be determined based on a number of symbols or a percentage of symbols of the downlink transport block that include the overlapping uplink transmission. In some deployments, the MCS selection circuitry 1146 shown and described above in connection with FIG. 11 may provide a means to select the intermediate MCS.

At block 1510, the scheduling entity may generate the plurality of CBGs of the transport block using at least the intermediate MCS. In some examples, the scheduling entity may select the intermediate MCS for all of the plurality of CBGs. In other examples, the scheduling entity may select the intermediate MCS as a first MCS for the first set of overlapping CBGs and a second MCS for a second set of non-overlapping CBGs of the plurality of CBGs non-overlapping in time with the uplink transmission. In some examples, the second MCS may include the maximum MCS. In some examples, the scheduling entity may further time-interleave the plurality of CBGs of the transport block over the plurality of symbols allocated for the downlink transmission. In some deployments, the communication and processing circuitry 1144 shown and described above in connection with FIG. 11 may provide a means to generate the plurality of CBGs using the selected MCS.

At block 1512, the scheduling entity may transmit the downlink transmission including the plurality of CBGs of the transport block to the scheduled entity. In some examples, the first set of overlapping CBGs may be transmitted to the scheduled entity via one or more symbols of a slot. In addition, the uplink transmission from the scheduled entity may also be received via the one or more symbols of the slot over which the first set of overlapping CBGs are transmitted. In some deployments, the communication and processing circuitry 1144, together with the transceiver 1110, shown and described above in connection with FIG. 11 may provide a means to transmit the downlink transmission.

Figure 16:
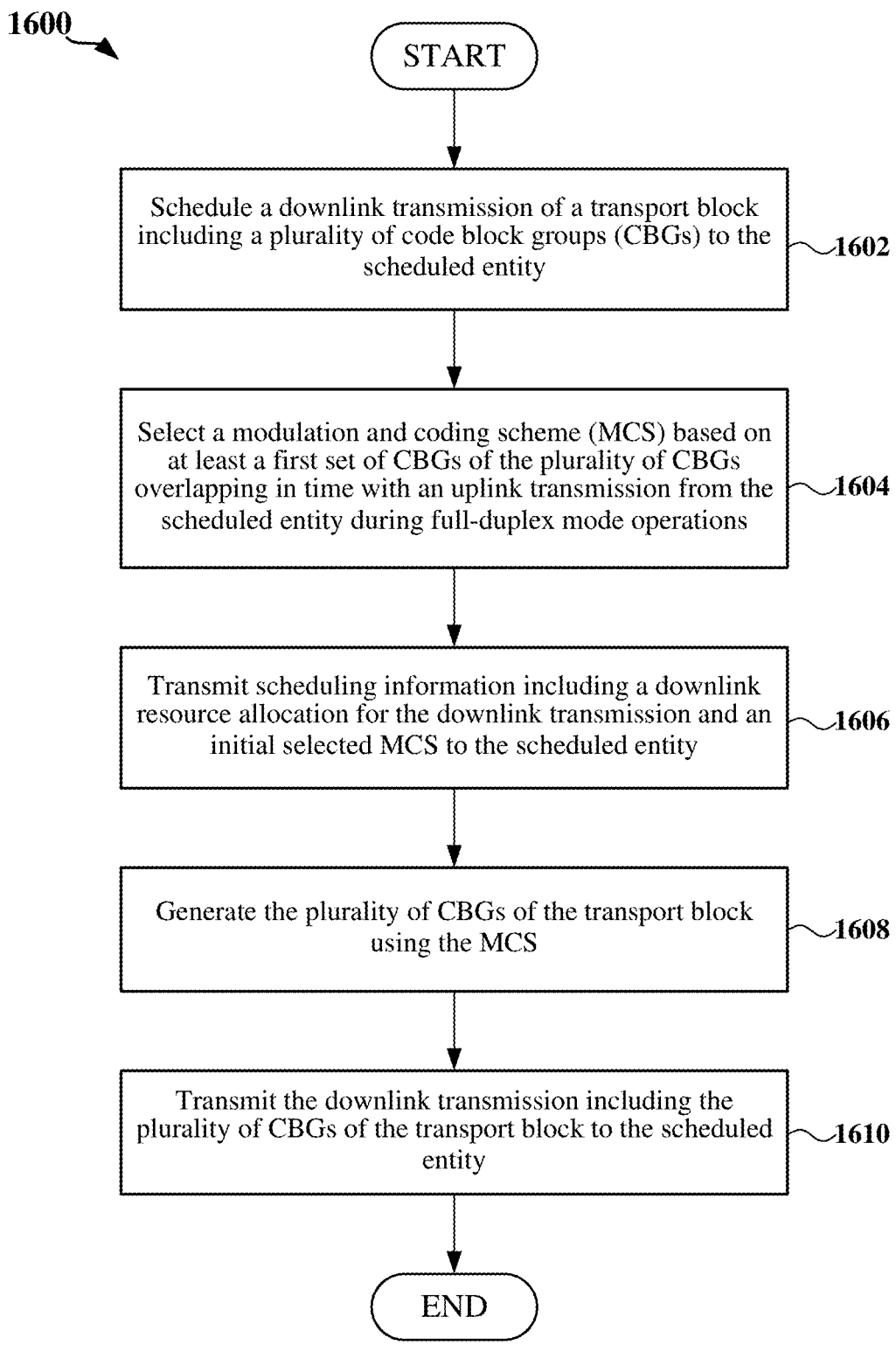
FIG. 16 is a flow chart of another exemplary method for MCS adaptation for full-duplex communications at a scheduling entity according to some aspects.

FIG. 16 is a flow chart 1600 of another method for MCS adaptation for full-duplex communications at a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1100, as described above and illustrated in FIG. 11, by a processor or processing system, or by any suitable means for carrying out the described functions.

At block 1602, the scheduling entity may schedule a downlink transmission to the scheduled entity. In some instances, the downlink transmission can include a transport block including a plurality of (e.g., two or more) code block groups (CBGs). In some examples, a scheduling entity may schedule a downlink resource allocation of time and/or frequency resources on which to transmit the downlink transmission (e.g., transport block including CBGs). Additionally, or alternatively, the downlink resource allocation may include a plurality of symbols of a slot and/or one or more downlink sub-bands or BWPs of a carrier frequency. In some deployments, the resource assignment and scheduling circuitry 1142 shown and described above in connection with FIG. 11 may provide a means to schedule the downlink transmission.

At block 1604, the scheduling entity may select a modulation and coding scheme (MCS). The selected MCS may be an initial selection, subsequent selection, and/or selection to modify a previous MCS selection. In some examples, the selected MCS may include at least a first MCS. Selection of MCS can be done to accommodate and/or mitigate interference. In some deployments, MCS selection can be done based on conflicting UL and DL transmissions (e.g., UL/DL transmissions occurring at the same time). As one particular example, MCS selection can occur based on at least a first set of CBGs of the plurality of CBGs for downlink transmissions at least partially conflicting or overlapping in time with an uplink transmission (e.g., from a scheduled entity when the scheduled entity is operating in a full-duplex mode). Overlapping or conflicting transmissions can include scenarios where respective transmissions (UL and DL) may attempt to use the same time resource.

As mentioned above, method 1600 can also include additional MCS selection features. In some examples, the scheduling entity may select a single MCS. In other examples, the scheduling entity may select multiple MCS (e.g., a first MCS and a second MCS) associated with the transport block. The second MCS may be different than the first MCS. For example, the first MCS may have a lower rate than the second MCS. In some examples, the scheduling entity may further identify a minimum MCS (e.g., based on the first set of overlapping CBGs including all of the plurality of CBGs), and/or a maximum MCS (e.g., based on the first set of overlapping CBGs including an empty set). In some examples, the first MCS may be the minimum MCS for the transport block, and the second MCS may be the maximum MCS for the transport block. In some examples, the first MCS may be an intermediate MCS between the maximum MCS and the minimum MCS for the transport block. The intermediate MCS may be selected based on an amount of overlapping time resources between the downlink transmission and the uplink transmission. In some deployments, the MCS selection circuitry 1146 shown and described above in connection with FIG. 11 may provide a means to select the first MCS.

At block 1606, the scheduling entity may transmit scheduling information to the scheduled entity. Scheduling information can be in a control message and indicate resources or resource grants for later transmissions. In some instances, scheduling information can include a downlink resource allocation for the downlink transmission. In addition, the scheduling information may include an initial selected MCS. In some examples, the initial selected MCS may include the first MCS. In other examples, the initial selected MCS may include one of the first MCS or the second MCS. Additionally, or alternatively, the scheduling information may include first scheduling information including the downlink resource allocation for the downlink transmission and one of the first MCS or the second MCS. Further, in addition to or alternatively, the scheduling information may further include second scheduling information including an uplink resource allocation for the uplink transmission. In some deployments, the first scheduling information and the second scheduling information can collectively indicate either the first MCS (e.g., based on the second MCS) and overlapping time resources between the downlink resource allocation and the uplink resource allocation or the second MCS (e.g., based on the first MCS and the overlapping time resource).

Method 1600 can also include additional signaling features related to scheduling. In some examples, the scheduling entity may further transmit a radio resource control (RRC) message. The RRC message may include an indicator or metric configured to aid in assessing or calculating an MCS for communication. For example, the metric may be associated with calculation of the first MCS from the second MCS and the overlapping time resources or the second MCS from the first MCS and the overlapping time resources. In some instances, the metric enables a wireless to device to calculate, determine, and/or select the first MCS from the second MCS and/or overlapping time resources. Additionally, or alternatively, the metric enables a wireless device to calculate, determine, and/or select the second MCS from the first MCS and the overlapping time resources. In some examples, the scheduling information may include the first MCS for the first set of overlapping CBGs and the second MCS for a second set of non-overlapping CBGs non-overlapping in time with the uplink transmission. In some deployments, the communication and processing circuitry 1144, together with the transceiver 1110, shown and described above in connection with FIG. 11 may provide a means to transmit the scheduling information to the scheduled entity.

At block 1608, the scheduling entity may generate the plurality of CBGs of the transport block using at least the first MCS. In some examples, the scheduling entity may generate all of the plurality of CBGs of a transport block using a previously determined or selected MCS (e.g., the first MCS). In a particular example, a scheduling entity may generate all of the plurality of CBGs of a transport block using the first MCS when the first set of overlapping CBGs includes one or more symbols of a slot and the one or more symbols is greater than a threshold number of a plurality of symbols allocated for the downlink transmission. Additionally, or alternatively, the first MCS may be the minimum MCS and the scheduling entity may apply the minimum MCS to each of the CBGs in the transport block. In some examples, the scheduling entity may generate the first set of overlapping CBGs using the first MCS and/or the second set of non-overlapping CBGs of the transport block using the second MCS. Additionally, or alternatively, the first MCS may be the minimum MCS or an intermediate MCS and the second MCS may be the maximum MCS or the intermediate MCS. In some examples, the scheduling entity may further time-interleave the plurality of CBGs of the transport block over the plurality of symbols allocated for the downlink transmission. In some deployments, the communication and processing circuitry 1144 shown and described above in connection with FIG. 11 may provide a means to generate the plurality of CBGs using at least the first MCS.

At block 1610, the scheduling entity may transmit the downlink transmission including the plurality of CBGs of the transport block to the scheduled entity. In some examples, the first set of overlapping CBGs may be transmitted to the scheduled entity via one or more symbols of a slot. In addition, the uplink transmission from the scheduled entity may also be received via the one or more symbols of the slot over which the first set of overlapping CBGs are transmitted. In some deployments, the communication and processing circuitry 1144, together with the transceiver

1110, shown and described above in connection with FIG. 11 may provide a means to transmit the downlink transmission.

In one configuration, a scheduling entity (e.g., a base station, such as a gNB) 1100 includes means for scheduling a downlink transmission of a transport block including a plurality of code block groups (CBGs) to a scheduled entity. The scheduling entity can further include means for selecting at least a first MCS for generating the transport block based on at least a first set of overlapping CBGs of the plurality of CBGs at least partially overlapping in time with an uplink transmission from the scheduled entity during full-duplex mode operations. The scheduling entity can further include means for transmitting the downlink transmission including the plurality of CBGs of the transport block to the scheduled entity.

In one aspect, the aforementioned means for scheduling the downlink transmission, means for selecting at least the first MCS, and means for transmitting the downlink transmission may include the processor(s) 1104 shown in FIG. 11 configured to perform the functions recited by the aforementioned means. For example, the aforementioned means for scheduling the downlink transmission may include the resource assignment and scheduling circuitry 1142 shown in FIG. 11. As another example, the aforementioned means for selecting at least the first MCS may include the MCS selection circuitry 1146 shown in FIG. 11. As yet another example, the aforementioned means for transmitting the downlink transmission may include the communication and processing circuitry 1144 and the transceiver 1110 shown in FIG. 11. In another aspect, the aforementioned means may be a circuit or any apparatus configured to perform the functions recited by the aforementioned means.

Figure 17:
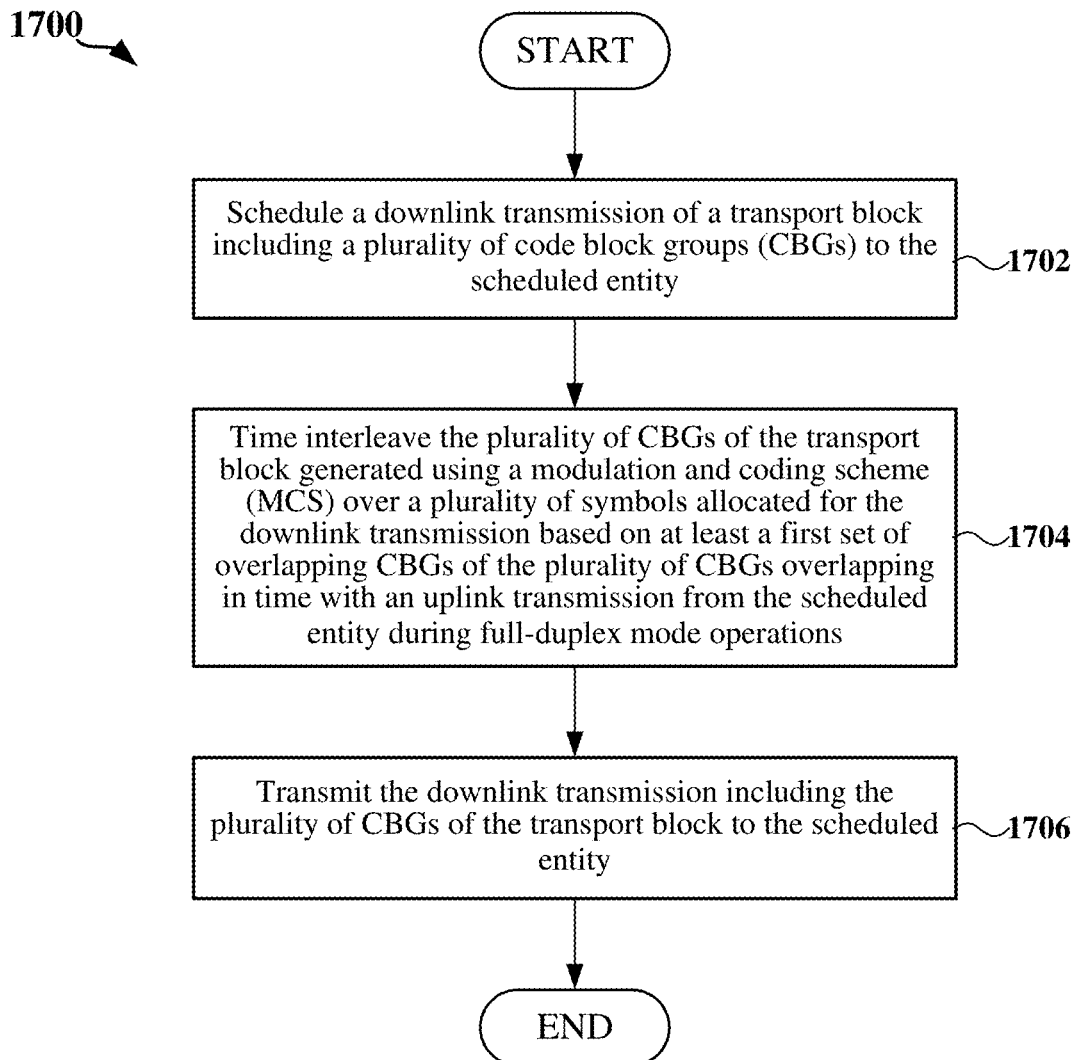
FIG. 17 is a flow chart of an exemplary method for time-interleaving code block groups for full-duplex communications at a scheduling entity according to some aspects.

FIG. 17 is a flow chart 1700 of a method for time-interleaving code block groups (CBGs) for full-duplex communications at a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1100, as described above and illustrated in FIG. 11, by a processor or processing system, or by any suitable means for carrying out the described functions.

At block 1702, the scheduling entity may schedule a downlink transmission to the scheduled entity. In some instances, the downlink transmission can include a transport block including a plurality of (e.g., two or more) code block groups (CBGs). In some examples, a scheduling entity may schedule a downlink resource allocation of time and/or frequency resources on which to transmit the downlink transmission (e.g., transport block including CBGs). Additionally, or alternatively, the downlink resource allocation may include a plurality of symbols of a slot and/or one or more downlink sub-bands or BWPs of a carrier frequency. In some deployments, the resource assignment and scheduling circuitry 1142 shown and described above in connection with FIG. 11 may provide a means to schedule the downlink transmission.

At block 1704, the scheduling entity may time-interleave the plurality of CBGs of the transport block generated using a modulation and coding scheme (MCS) over a plurality of symbols allocated for the downlink transmission. Time-interleaving may occur to accommodate and/or mitigate interference. In some deployments, time-interleaving can be done based on at least a first set of CBGs of the plurality of CBGs at least partially overlapping in time with an uplink transmission from the scheduled entity during full-duplex operations (e.g., when the scheduled entity is operating in a full-duplex mode). In some deployments, the time-interleaving circuitry 1148 shown and described above in connection with FIG. 11 may time-interleave the plurality of CBGs.

As mentioned above, method 1700 can also include MCS selection features. In some examples, the scheduling entity may select one of a minimum MCS or a maximum MCS as the selected MCS for the transport block. The minimum MCS may be based on the first set of overlapping CBGs including all of the plurality of CBGs. The maximum MCS may be based on the first set of overlapping CBGs including an empty set. In some examples, the scheduling entity may select one of the minimum MCS or the maximum MCS as the MCS for the transport block based on an amount of overlapping time resources between the downlink transmission and the uplink transmission. For example, the scheduling entity may select the minimum MCS as the MCS for the transport block when the amount of overlapping time resources is greater than a threshold. The scheduling entity may further select the maximum MCS as the MCS for the transport block when the amount of overlapping resources is less than or equal to the threshold. In some examples, the MCS may be an intermediate MCS between the maximum MCS and the minimum MCS for the transport block. The intermediate MCS may be selected based on an amount of overlapping time resources between the downlink transmission and the uplink transmission. In some deployments, the MCS selection circuitry 1146 shown and described above in connection with FIG. 11 may select the first MCS.

The method 1700 can also include CBG generation features. In some examples, the scheduling entity may generate the plurality of CBGs of the transport block using the MCS. In some deployments, the communication and processing circuitry 1144 shown and described above in connection with FIG. 11 may provide a means to generate the plurality of CBGs using the MCS.

At block 1706, the scheduling entity may transmit the downlink transmission including the plurality of CBGs of the transport block to the scheduled entity. In some examples, the first set of overlapping CBGs may be transmitted to the scheduled entity via one or more symbols of a slot. In addition, the uplink transmission from the scheduled entity may also be received via the one or more symbols of the slot over which the first set of overlapping CBGs are transmitted. For example, the communication and processing circuitry 1144, together with the transceiver 1110, shown and described above in connection with FIG. 11 may transmit the downlink transmission.

In one configuration, a scheduling entity (e.g., a base station, such as a gNB) 1100 includes means for scheduling a downlink transmission of a transport block including a plurality of code block groups (CBGs) to a scheduled entity and means for time-interleaving the plurality of CBGs of the transport block generated using a modulation and coding scheme (MCS) over a plurality of symbols allocated for the downlink transmission based on at least a first set of overlapping CBGs of the plurality of CBGs at least partially overlapping in time with an uplink transmission from the scheduled entity during full-duplex mode operations. The scheduling entity can further include means for transmitting the downlink transmission including the plurality of CBGs of the transport block to the scheduled entity.

In one aspect, the aforementioned means for scheduling the downlink transmission of the transport block, means for time-interleaving the plurality of CBGs of the transport block over the plurality of symbols allocated for the downlink transmission, and the means for transmitting the downlink transmission may be the processor(s) 1104 shown in FIG. 11 configured to perform the functions recited by the aforementioned means. For example, the aforementioned means for scheduling the downlink transmission of the transport block may include the resource assignment and scheduling circuitry 1142 shown in FIG. 11. As another example, the aforementioned means for time-interleaving the plurality of CBGs of the transport block over the plurality of symbols allocated for the downlink transmission may include the time-interleaving circuitry 1148 shown in FIG. 11. As yet another example, the aforementioned means for transmitting the downlink transmission may include the communication and processing circuitry 1144 and the transceiver 1110 shown in FIG. 11. In another aspect, the aforementioned means may be a circuit or any apparatus configured to perform the functions recited by the aforementioned means.

Figure 18:
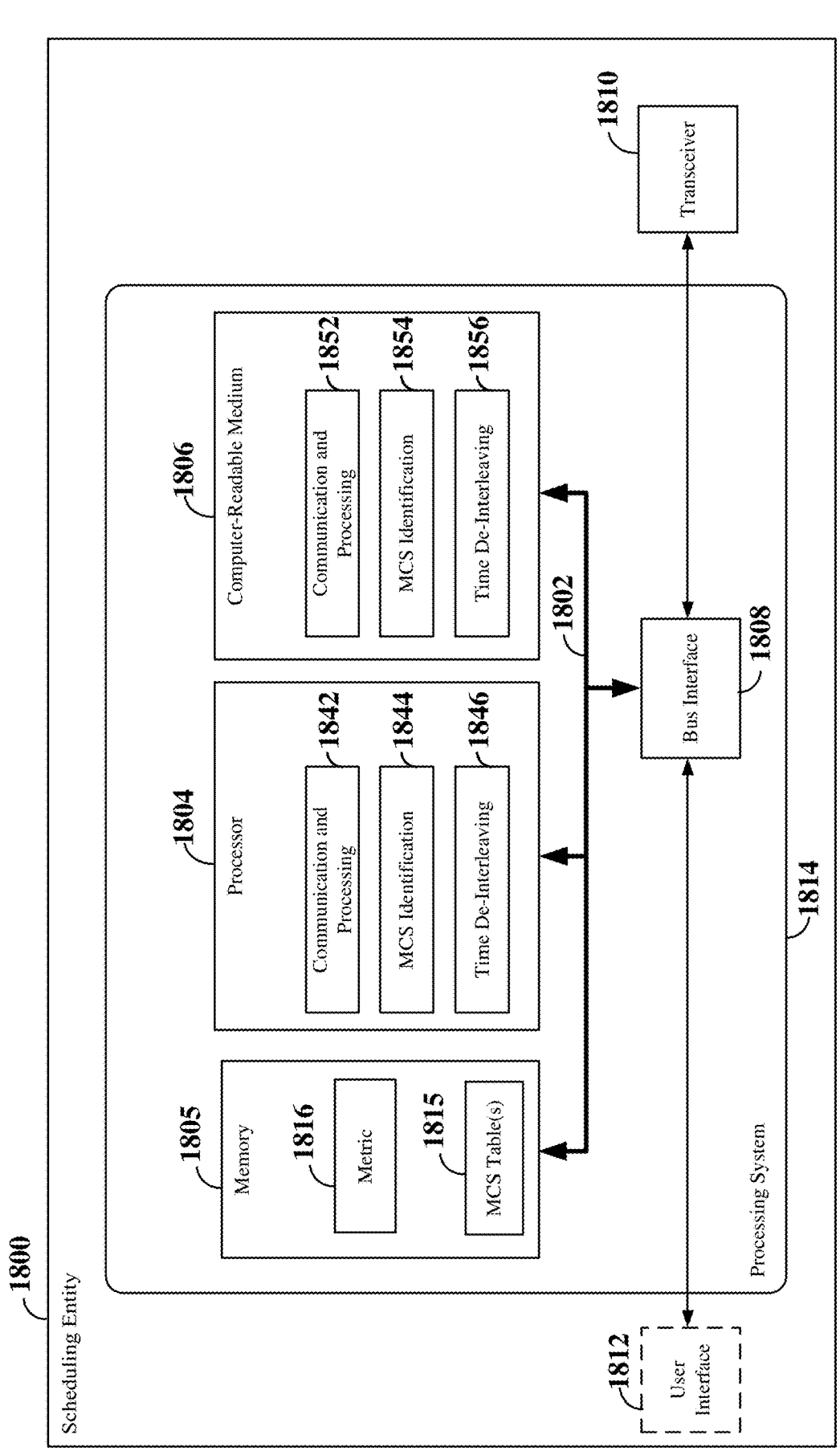
FIG. 18 is a block diagram illustrating an example of a hardware implementation for a scheduled entity employing a processing system according to some aspects.

FIG. 18 is a block diagram illustrating an example of a hardware implementation for a scheduled entity 1800 employing a processing system 1814. For example, the scheduled entity 1800 may correspond to any of the UEs or scheduled entities shown and described above in reference to FIGS. 1, 2, 5, 11, 12 and/or 18.

In accordance with various aspects of the disclosure, an element, or any portion of an element, or any combination of elements may be implemented with a processing system 1814 that includes one or more processors 1804. The processing system 1814 may be substantially the same as the processing system 1114 illustrated in FIG. 11, including a bus interface 1808, a bus 1802, memory 1805, a processor 1804, and a computer-readable medium 1806. Furthermore, the scheduled entity 1800 may include a user interface 1812 and a transceiver 1810 substantially similar to those described above in FIG. 11. That is, the processor 1804, as utilized in a scheduled entity 1800, may be used to implement any one or more of the processes described below.

In some aspects of the disclosure, the processor 1804 may include circuitry configured for various functions. For example, the processor 1804 may include communication and processing circuitry 1842 configured to communicate with a scheduling entity (e.g., a base station, such as a gNB) in a half-duplex mode or a full-duplex mode via the transceiver 1810. The communication and processing circuitry 1842 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1842 may be configured to exchange control information and data with the scheduling entity via one or more subframes, slots, and/or mini-slots.

In some examples, the communication and processing circuitry 1842 may be configured to receive uplink scheduling information for an uplink transmission of an uplink transport block from the scheduling entity via the transceiver 1810. The uplink scheduling information may be included, for example, within DCI of a PDCCH. The uplink scheduling information includes an uplink resource allocation allocated by the scheduling entity for the uplink transmission. For example, the uplink resource allocation may indicate the time-frequency resources (e.g., plurality of symbols and one or more uplink BWPs of a carrier frequency) on which the uplink transmission of the uplink transport block is scheduled.

The communication and processing circuitry 1842 may further be configured to receive downlink scheduling information for a downlink transmission of a downlink transport block including a plurality of CBGs from the scheduling entity via the transceiver 1810. The downlink scheduling information may be included, for example, within DCI of a PDCCH. The downlink scheduling information includes a downlink resource allocation allocated by the scheduling entity for the downlink transmission. For example, the downlink resource allocation may indicate the time-frequency resources (e.g., plurality of symbols and one or more downlink BWPs of the carrier frequency) on which the downlink transmission of the downlink transport block is scheduled.

The downlink scheduling information may further include a selected MCS for the downlink transport block. For example, the scheduling information may include a first MCS when the first MCS is used for all of the CBGs of the transport block. As another example, the scheduling information may include both the first MCS and a second MCS. In this example, the first MCS is used for a first set of overlapping CBGs of the plurality of CBGs of the transport block that overlap in time with the uplink transmission and the second MCS is used for a second set of non-overlapping CBGs of the plurality of CBGs of the transport block that do not overlap in time with the uplink transmission. As yet another example, the scheduling information may include the second MCS from which the first MCS may be implicitly determined by the scheduled entity when the first MCS is used for at least the first set of overlapping CBGs. The selected MCS may be indicated by an MCS index into an MCS table 1815 that may be maintained, for example, within the memory 1805.

In addition, the communication and processing circuitry 1842 may be configured to receive the downlink transmission including the plurality of CBGs of the transport block from the scheduling entity via the transceiver 1810. For example, the communication and processing circuitry 1842 may be configured to receive the downlink transmission within a PDSCH carrying the plurality of CBGs of the downlink transport block, along with one or more reference signals (e.g., DMRS) to assist in demodulating and decoding the plurality of CBGs of the downlink transport block. In some examples, the communication and processing circuitry 1842 may be configured to receive the first set of overlapping CBGs to the scheduled entity within one or more symbols of the plurality of symbols in the slot allocated for the downlink transmission.

The communication and processing circuitry 1842 may further be configured to transmit the uplink transmission to the scheduling entity via the transceiver 1810. For example, the communication and processing circuitry 1842 may be configured to transmit the uplink transmission within a PUSCH carrying the uplink transport block, along with one or more reference signals (e.g., DMRS) to assist in demodulating and decoding the uplink transport block. In some examples, the communication and processing circuitry 1842 may be configured to transmit the uplink transmission within the same one or more symbols of the slot over which the first set of overlapping CBGs of the downlink transport block is received.

The communication and processing circuitry 1842 may further be configured to receive an RRC message including a metric 1816 from the scheduling entity. The metric 1816 may be stored, for example, in memory 1805. In some examples, the metric 1816 may be used by the scheduled entity 1800 to derive the selected MCS for at least the first set of overlapping CBGs based on a second MCS (e.g., a maximum MCS or other intermediate MCS). In some examples, the metric 1816 may indicate a difference between the second MCS and the selected MCS. In some examples, the metric 1816 may include a threshold number or threshold percentage of the total number of symbols allocated for the downlink transmission to use in selecting between the maximum MCS and a minimum MCS for the entire downlink transport block. In some examples, the metric 1816 may include a mapping between the amount of overlapping time resources, the second MCS, and an entry in an MCS table 1815. The metric 1816 may further include a new MCS table 1815 from which to discern the selected MCS.

In addition, the communication and processing circuitry 1842 may further be configured to generate and transmit two CSI reports to the scheduling entity. One of the CSI reports may be associated with an overlapping channel (e.g., a channel in which downlink and uplink transmissions to and from the scheduled entity 1800 overlap in time). The other CSI report may be associated with a non-overlapping channel (e.g., a channel in which downlink transmissions to the scheduled entity 1800 do not overlap in time with uplink transmissions from the scheduled entity 1800). In some examples, the CSI reports received from the scheduled entity may include respective CSI report quantities for a plurality of CSI report parameters (e.g., CQI, PMI, RI, LI, and/or L1-RSRP). Each CQI may provide a respective MCS index identifying a respective MCS to use for each channel type (e.g., overlapping channel and non-overlapping channel). The communication and processing circuitry 1842 may further be configured to execute communication and processing software 1852 stored in the computer-readable medium 1806 to implement one or more of the functions described herein.

The processor 1804 may further include MCS identification circuitry 1844, configured to identify at least one MCS selected for the downlink transport block. In some examples, the at least one selected MCS may include at least one of a minimum MCS for the downlink transport block, a maximum MCS for the downlink transport block, or an intermediate MCS between the maximum MCS and the minimum MCS. The minimum MCS may be based on the first set of overlapping CBGs including all of the plurality of CBGs of the transport block. For example, the minimum MCS may correspond to the MCS indicated in the CSI report associated with the overlapping channel. The maximum MCS may be based on the first set of overlapping CBGs including an empty set. For example, the maximum MCS may correspond to the MCS indicated in the CSI report associated with the non-overlapping channel. In some examples, the at least one selected MCS may include the minimum MCS or intermediate MCS to accommodate interference when the first set of overlapping CBGs overlaps in time with the uplink transmission when the scheduled entity 1800 is operating a full-duplex mode.

The MCS identification circuitry 1844 may be configured to identify the at least one selected MCS based on the downlink scheduling information received by the communication and processing circuitry 1842. In some examples, the downlink scheduling information may include the at least one selected MCS. For example, the downlink scheduling information may include the minimum MCS, the maximum MCS, or an intermediate MCS selected for the entire transport block. As another example, the downlink scheduling information may include a first MCS selected for the first set of overlapping CBGs and a second MCS selected for the second set of non-overlapping CBGs. Here, the first MCS is lower than the second MCS.

In some examples, the MCS identification circuitry 1844 may further be configured to identify the at least one selected MCS based on the downlink scheduling information and an amount of overlapping time resources between the downlink transmission and the uplink transmission. For example, the downlink scheduling information may include the second MCS (e.g., maximum MCS or other intermediate MCS) and the MCS identification circuitry 1844 may be configured to calculate the first MCS (e.g., minimum MCS or other intermediate MCS that is lower than the second MCS) based on the second MCS and the amount of overlapping resources. Here, the first MCS is associated with at least the first set of overlapping CBGs. In this example, the MCS identification circuitry 1844 may be configured to utilize the metric 1816 to calculate the first MCS.

For example, the MCS identification circuitry 1844 may be configured to identify the first MCS using the metric 1816 when the metric 1816 indicates a difference between the second MCS and the first MCS. As another example, the MCS identification circuitry 1844 may be configured to identify the first MCS using the metric 1816 and the amount of overlapping time resources when the metric 1816 includes a threshold. The threshold may indicate, for example, a threshold number of symbols and may be represented as a percentage of a total number of symbols of the downlink transmission (e.g., the total number of symbols allocated to the PDSCH including the downlink transport block and any DMRS) or an actual number of symbols based on the total number of symbols. For the latter, the threshold may include a plurality of threshold(s), each associated with a respective total number of symbols.

In this example, the MCS identification circuitry 1844 may be configured to identify the total number of symbols allocated for the downlink transmission. The MCS identification circuitry 1844 may then be configured to identify a number of overlapping symbols of the downlink transport block that include an overlapping uplink transmission. In one example, based on the number of overlapping symbols and the total number of symbols, the MCS identification circuitry 1844 may be configured to calculate the percentage of the total number of symbols containing the overlapping uplink transmission and compare the percentage to the threshold to determine whether to use the maximum MCS or the minimum MCS for the transport block. In another example, based on the total number of symbols, the MCS identification circuitry 1844 may be configured to identify a threshold number of symbols and compare the number of overlapping symbols to the threshold number of symbols to determine whether to use the maximum MCS or the minimum MCS for the transport block.

For example, the MCS identification circuitry 1844 may be configured to identify the minimum MCS as the first MCS utilized for each of the plurality of CBGs of the transport block when the amount of overlapping time resources is greater than the threshold. In addition, the MCS identification circuitry 1844 may be configured to identify the maximum MCS as the selected MCS utilized for each of the plurality of CBGs of the transport block when the amount of overlapping time resources is less than or equal to the threshold. In this example, the downlink scheduling information includes the maximum MCS and the MCS identification circuitry 1844 may verify that the maximum MCS is the selected MCS for the downlink transport block.

In some examples, the MCS identification circuitry 1844 may be configured to identify an intermediate MCS as the first MCS when the metric 1816 includes a mapping between the amount of overlapping time resources, the second MCS, and an entry in an MCS table 1815 (existing or new). In this example, the MCS identification circuitry 1844 may identify the intermediate MCS within a selected MCS table 1815 (e.g., existing or new) based on the amount of overlapping time resources. In an example, for the selected MCS table 1815, the MCS identification circuitry 1844 may associate one or more of the MCS indexes. Association may be between the maximum MCS and the minimum MCS with a respective range of overlapping resources (e.g., as a percentage or number of symbols). Additionally, or alternatively, the MCS identification circuitry 1844 can identify a MCS associated with the range including the amount of overlapping time resources for the downlink transmission. The MCS identification circuitry 1844 may further be configured to execute MCS identification software 1854 stored in the computer-readable medium 1806 to implement one or more of the functions described herein.

The processor 1804 may further include time de-interleaving circuitry 1846, configured to time de-interleave the plurality of CBGs of a downlink transport block from the plurality of symbols allocated for the downlink transmission of the downlink transport block. The time de-interleaving circuitry 1846 may perform time de-interleaving when using either the maximum MCS, the minimum MCS, or an intermediate MCS for the entire transport block. The time de-interleaving circuitry 1846 may further be configured to execute time de-interleaving software 1856 stored in the computer-readable medium 1806 to implement one or more of the functions described herein.

Figure 19:
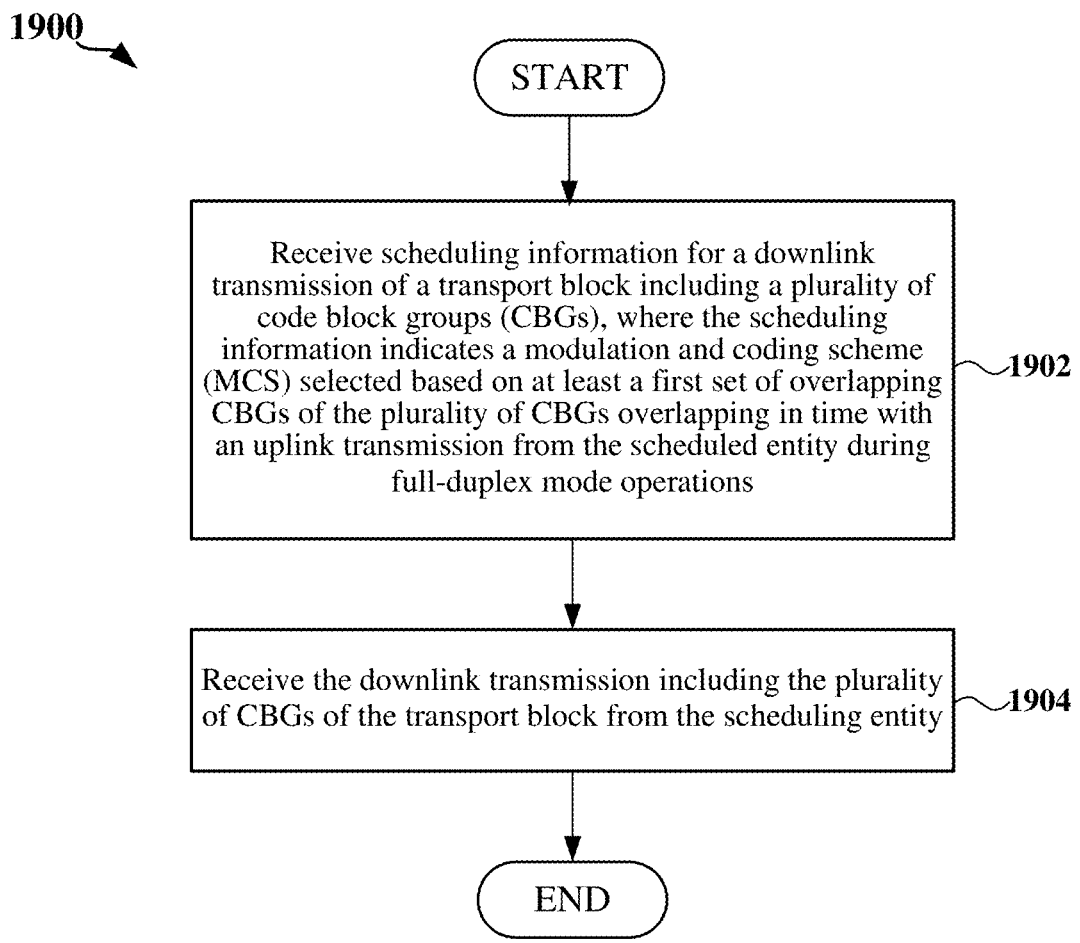
FIG. 19 is a flow chart of an exemplary method for MCS adaptation for full-duplex communication at a scheduled entity according to some aspects.

FIG. 19 is a flow chart 1900 of a method for MCS adaptation for full-duplex communication at a scheduled entity according to some aspects. As described below, some or all illustrated features may be omitted in a particular implementation within the scope of the present disclosure, and some illustrated features may not be required for implementation of all embodiments. In some examples, the method may be performed by the scheduled entity 1800, as described above and illustrated in FIG. 18, by a processor or processing system, or by any suitable means for carrying out the described functions.

At block 1902, the scheduled entity may receive scheduling information for a downlink transmission of a transport block including a plurality of code block groups (CBGs) (e.g., two or more CBGs). The scheduling information can indicate a modulation and coding scheme (MCS) selected based on at least a first set of CBGs of the plurality of CBGs overlapping in time with an uplink transmission from the scheduled entity during full-duplex mode operations (e.g., when the scheduled entity is operating in a full-duplex mode). In some examples, the MCS includes at least a first MCS. Selection of MCS can be done to accommodate and/or mitigate interference. In some examples, the scheduling information may further include a downlink resource allocation of a plurality of symbols of a slot and one or more downlink sub-bands or BWPs of a carrier frequency.

In some examples, the scheduling information may include a single MCS associated with the transport block. In other examples, the scheduling information may include multiple MCS (e.g., a first MCS and a second MCS) associated with the transport block. The first MCS may be different than the second MCS. For example, the first MCS may have a lower rate than the second MCS. In some examples, the scheduled entity may receive first scheduling information including a downlink resource allocation for the downlink transmission. The first scheduling information can further include at least one of the first MCS or the second MCS. Additionally, or alternatively, the scheduled entity may further receive second scheduling information including an uplink resource allocation for the uplink transmission. The scheduled entity may further calculate, determine, and/or select the first MCS based on the second MCS and overlapping time resources between the downlink resource allocation and the uplink resource allocation. Additionally, or alternatively, the scheduled entity may further calculate, determine, and/or select the second MCS based on the first MCS and the overlapping time resources. In some examples, the scheduled entity may utilize a metric received via an RRC message in calculating, determining, and/or selecting the second MCS from the first MCS or the first MCS from the second MCS based on the overlapping time resources. In some examples, the first MCS may be an intermediate MCS between a minimum MCS and a maximum MCS. The maximum MCS may be based on the first set of overlapping CBGs including an empty set and the minimum MCS may be based on the first set of overlapping CBGs including all of the CBGs. In this example, the first scheduling information may include the second MCS, and the scheduled entity may calculate the intermediate MCS based on second MCS and the amount of overlapping time resources. For example, the second MCS may be the maximum MCS or another intermediate MCS. In some deployments, the communication and processing circuitry 1842, together with the MCS identification circuitry 1844 and transceiver 1810, shown and described above in connection with FIG. 18 may provide a means to receive the first scheduling information.

At block 1904, the scheduled entity may receive the downlink transmission including the plurality of CBGs of the transport block from the scheduling entity. The plurality of CBGs can include the MCS (e.g., at least the first MCS). In some examples, the first set of overlapping CBGs may be received via one or more symbols of a slot. In addition, the uplink transmission may be transmitted via the same one or more symbols of the slot over which the first set of overlapping CBGs is received. In some examples, the plurality of CBGs each include the first MCS. In other examples, the first set of overlapping CBGs includes the first MCS and a second set of CBGs of the transport block non-overlapping in time with the uplink transmission includes the second MCS. In some examples, the plurality of CBGs of the transport block are time-interleaved over a plurality of symbols of the downlink transmission. In some deployments, the communication and processing circuitry 1842, together with the transceiver 1810, shown and described above in connection with FIG. 18 may provide a means to receive the downlink transmission.

Figure 20:
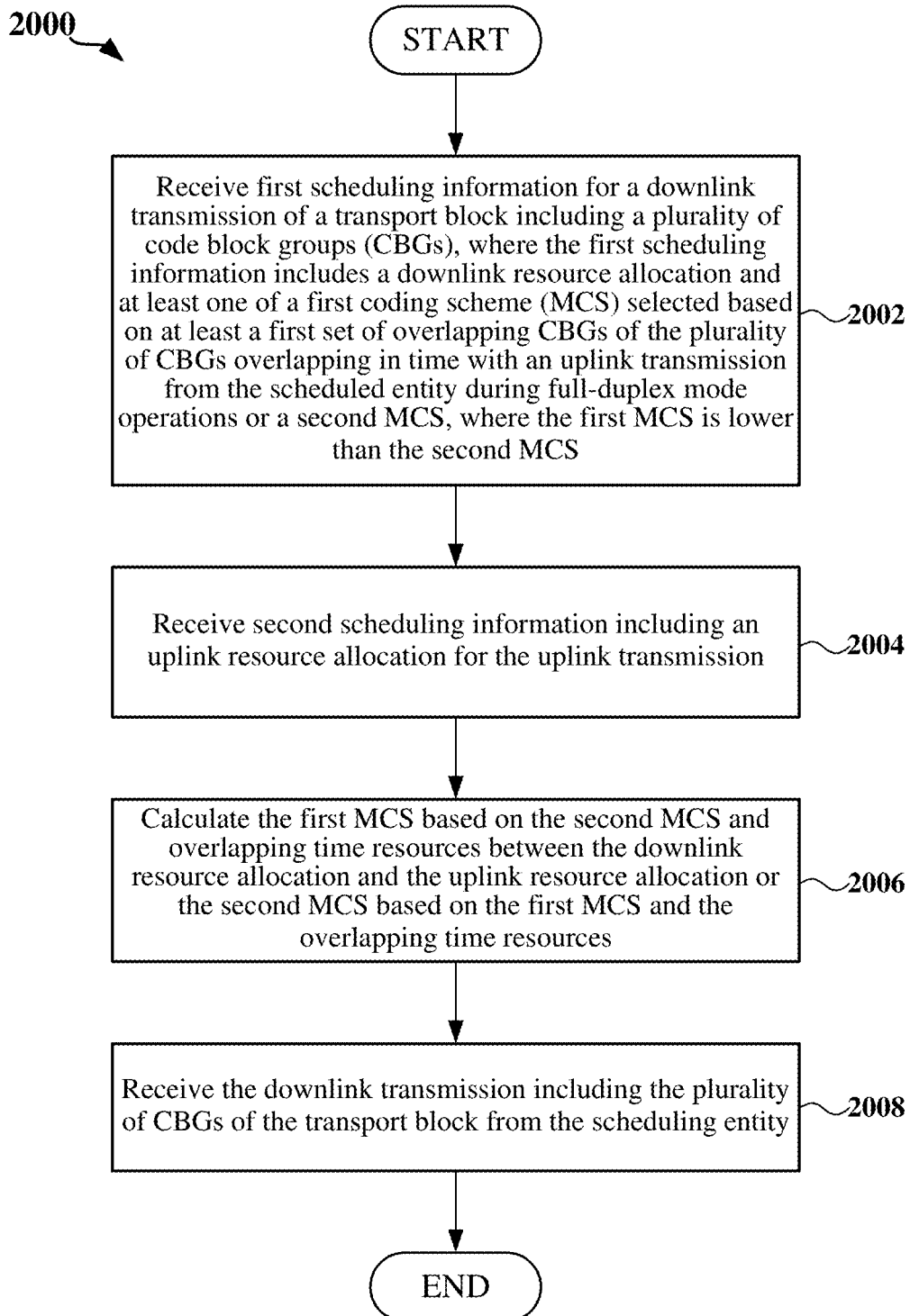
FIG. 20 is a flow chart of another exemplary method for MCS adaptation for full-duplex communication at a scheduled entity according to some aspects.

FIG. 20 is a flow chart 2000 of another method for MCS adaptation for full-duplex communication at a scheduled entity according to some aspects. As described below, some or all illustrated features may be omitted in a particular implementation within the scope of the present disclosure, and some illustrated features may not be required for implementation of all embodiments. In some examples, the method may be performed by the scheduled entity 1800, as described above and illustrated in FIG. 18, by a processor or processing system, or by any suitable means for carrying out the described functions.

At block 2002, the scheduled entity may receive first scheduling information for a downlink transmission of a transport block including a plurality of code block groups (CBGs). The first scheduling information can include a downlink resource allocation and at least one of a first modulation and coding scheme (MCS) selected based on at least a first set of overlapping CBGs of the plurality of CBGs overlapping in time with an uplink transmission from the scheduled entity during full-duplex mode operations or a second MCS. The first MCS may be lower than the second MCS. In some examples, the first scheduling information may further include a downlink resource allocation of a plurality of symbols of a slot and one or more downlink sub-bands or BWPs of a carrier frequency. In some deployments, the communication and processing circuitry 1842, together with the MCS identification circuitry 1844 and transceiver 1810, shown and described above in connection with FIG. 18 may provide a means to receive the first scheduling information.

At block 2004, the scheduled entity may receive second scheduling information including an uplink resource allocation for the uplink transmission. In some deployments, the communication and processing circuitry 1842, together with the MCS identification circuitry 1844 and transceiver 1810, shown and described above in connection with FIG. 18 may provide a means to receive the second scheduling information.

At block 2006, the scheduled entity may calculate the first MCS based on the second MCS and overlapping time resources between the downlink resource allocation and the uplink resource allocation or the second MCS based on the first MCS and the overlapping time resources. In some examples, the scheduled entity may receive a radio resource control (RRC) message including a metric for use in calculating the second MCS from the first MCS and the overlapping time resources or the first MCS from the second MCS and the overlapping time resources. In some examples, the first scheduling information may include the second MCS, and the scheduling entity may further calculate the first MCS as an intermediate MCS based on the second MCS and the amount of overlapping time resources between the downlink resource allocation and the uplink resource allocation. Here, the intermediate MCS may be between a minimum MCS and a maximum MCS associated with the first set of overlapping CBGs. The maximum MCS may be based on the first set of overlapping CBGs including an empty set and the minimum MCS may be based on the first set of overlapping CBGs including all of the CBGs. For example, the second MCS may be the maximum MCS. In some deployments, the communication and processing circuitry 1842, together with the MCS identification circuitry 1844 and transceiver 1810, shown and described above in connection with FIG. 18 may provide a means to receive the first scheduling information.

At block 2008, the scheduled entity may receive the downlink transmission including the plurality of CBGs of the transport block from the scheduling entity. The plurality of CBGs can include at least the first MCS. In some examples, the first set of overlapping CBGs may be received via one or more symbols of a slot. In addition, the uplink transmission may be transmitted via the same one or more symbols of the slot over which the first set of overlapping CBGs is received. In some examples, the plurality of CBGs each include the first MCS. In other examples, the first set of overlapping CBGs includes the first MCS and a second set of non-overlapping CBGs of the transport block non-overlapping in time with the uplink transmission includes the second MCS. In some examples, the plurality of CBGs of the transport block are time-interleaved over a plurality of symbols of the downlink transmission. In some deployments, the communication and processing circuitry 1842, together with the transceiver 1810, shown and described above in connection with FIG. 18 may provide a means to receive the downlink transmission.

Figure 21:
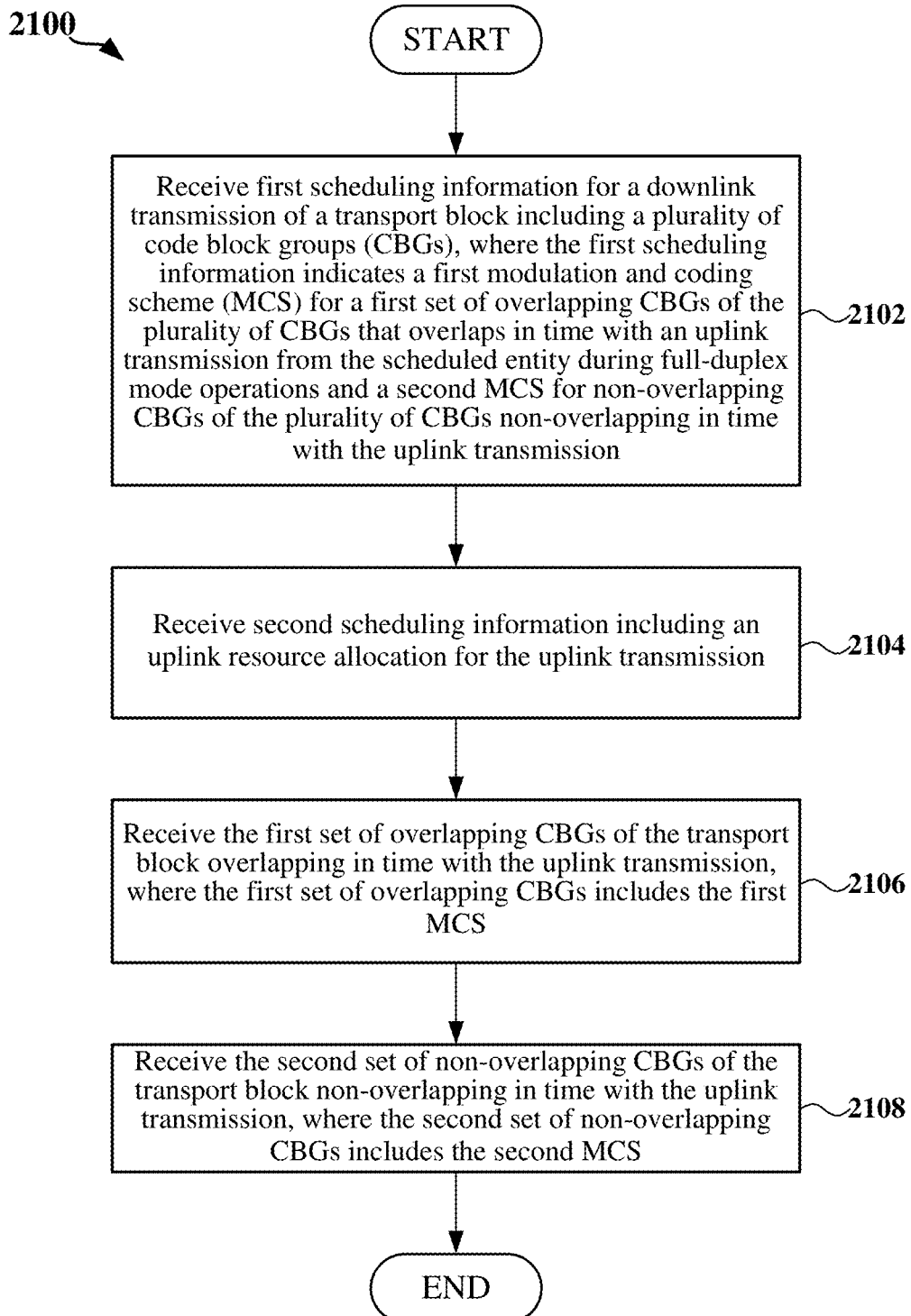
FIG. 21 is a flow chart of another exemplary method for MCS adaptation for full-duplex communication at a scheduled entity according to some aspects.

FIG. 21 is a flow chart 2100 of another method for MCS adaptation for full-duplex communication at a scheduled entity according to some aspects. As described below, some or all illustrated features may be omitted in a particular implementation within the scope of the present disclosure, and some illustrated features may not be required for implementation of all embodiments. In some examples, the method may be performed by the scheduled entity 1800, as described above and illustrated in FIG. 18, by a processor or processing system, or by any suitable means for carrying out the described functions.

At block 2102, the scheduled entity may receive first scheduling information for a downlink transmission of a transport block including a plurality of code block groups (CBGs). The first scheduling information can indicate a first modulation and coding scheme (MCS) for a first set of overlapping CBGs of the plurality of CBGs that overlaps in time with an uplink transmission from the scheduled entity during full-duplex mode operations (e.g., when the scheduled entity is operating in a full-duplex mode). The first scheduling information can further indicate a second MCS for non-overlapping CBGs of the plurality of CBGs non-overlapping in time with the uplink transmission. The first MCS may be lower than the second MCS. In some examples, the first scheduling information may further include a downlink resource allocation of a plurality of symbols of a slot and one or more downlink sub-bands or BWPs of a carrier frequency.

In some examples, the first scheduling information includes the first MCS and the second MCS associated with the transport block. In some examples, the first scheduling information includes at least one of the first MCS or the second MCS. In this example, the scheduled entity may calculate the first MCS based on the second MCS and overlapping time resources between the downlink resource allocation and the uplink resource allocation or the second MCS based on the first MCS and the overlapping time resources. In some examples, the scheduled entity may utilize a metric received via an RRC message in calculating the second MCS from the first MCS and the overlapping time resources or the first MCS from the second MCS and the overlapping time resources. In some examples, the first MCS and/or second MCS may be an intermediate MCS between a minimum MCS and a maximum MCS. In some deployments, the communication and processing circuitry 1842, together with the MCS identification circuitry 1844 and transceiver 1810, shown and described above in connection with FIG. 18 may provide a means to receive the first scheduling information.

At block 2104, the scheduled entity may further receive second scheduling information including an uplink resource allocation for the uplink transmission. In some deployments, the communication and processing circuitry 1842, together with the MCS identification circuitry 1844 and transceiver 1810, shown and described above in connection with FIG. 18 may provide a means to receive the second scheduling information.

At 2106, the scheduled entity may receive the first set of overlapping CBGs of the transport block overlapping in time with the uplink transmission. The first set of overlapping CBGs includes the first MCS. At 2108, the scheduled entity may further receive the second set of non-overlapping CBGs of the transport block non-overlapping in time with the uplink transmission. The second set of non-overlapping CBGs includes the second MCS. In some examples, the plurality of CBGs of the transport block are time-interleaved over a plurality of symbols of the downlink transmission. In some deployments, the communication and processing circuitry 1842, together with the transceiver 1810, shown and described above in connection with FIG. 18 may provide a means to receive the first set of overlapping CBGs and the second set of non-overlapping CBGs.

In one configuration, a scheduled entity (e.g., a UE) 1800 includes means for receiving first scheduling information for a downlink transmission of a transport block including a plurality of code block groups (CBGs). The first scheduling information can indicate at least a first MCS selected based on at least a first set of overlapping CBGs of the plurality of CBGs overlapping in time with an uplink transmission from the scheduled entity during full-duplex mode operations. The scheduled entity can further include means for receiving the downlink transmission including the plurality of CBGs of the transport block from the scheduling entity. The plurality of CBGs can include at least the first MCS.

In one aspect, the aforementioned means for receiving the first scheduling information for the downlink transmission and the means for receiving the downlink transmission may be the processor(s) 1804 shown in FIG. 18 configured to perform the functions recited by the aforementioned means. For example, the aforementioned means for receiving the first scheduling information for the downlink transmission may include the communication and processing circuitry 1842, the MCS identification circuitry 1844, and the transceiver 1810 shown in FIG. 18. As another example, the aforementioned means for receiving the downlink transmission may include the communication and processing circuitry 1842 and the transceiver 1810 shown in FIG. 18. In another aspect, the aforementioned means may be a circuit or any apparatus configured to perform the functions recited by the aforementioned means.

Figure 22:
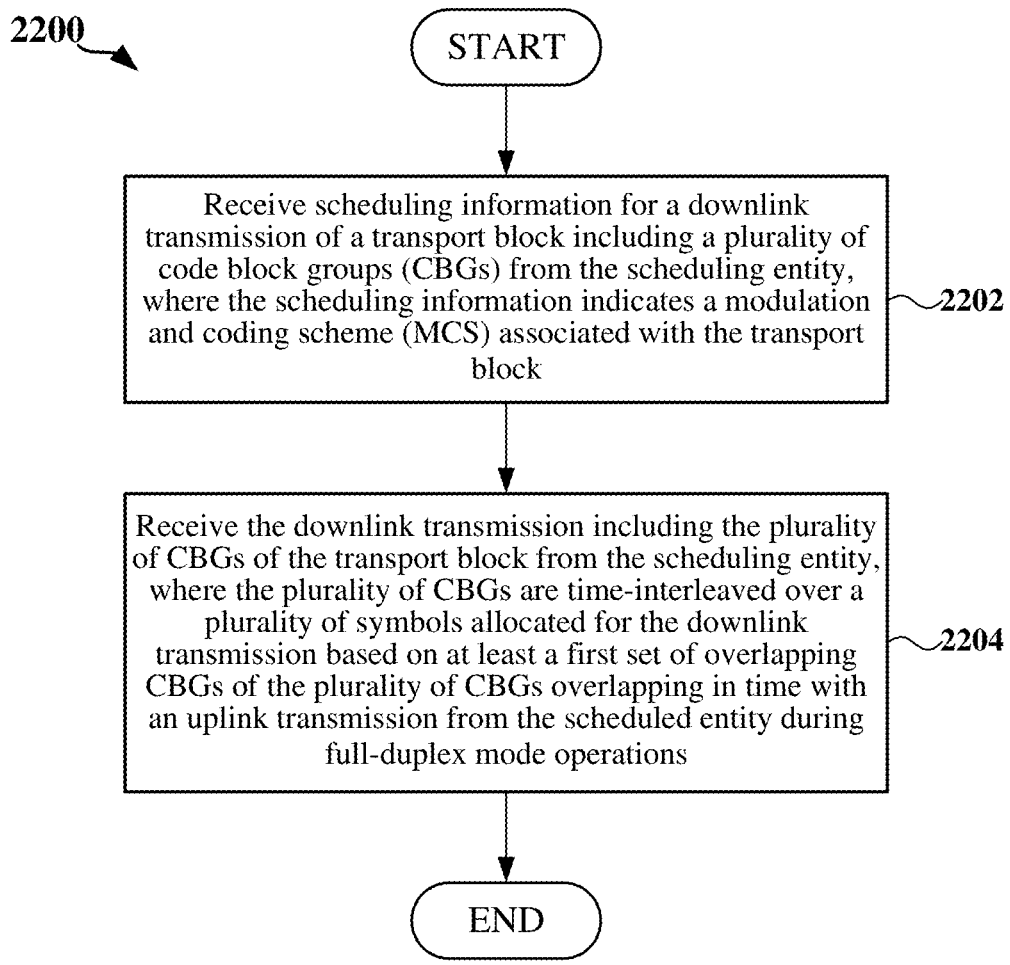
FIG. 22 is a flow chart of an exemplary method for time-interleaving code block groups for full-duplex communication at a scheduled entity according to some aspects.

FIG. 22 is a flow chart 2200 of an exemplary method for time-interleaving code block groups for full-duplex communication at a scheduled entity according to some aspects. As described below, some or all illustrated features may be omitted in a particular implementation within the scope of the present disclosure, and some illustrated features may not be required for implementation of all embodiments. In some examples, the method may be performed by the scheduled entity 1800, as described above and illustrated in FIG. 18, by a processor or processing system, or by any suitable means for carrying out the described functions.

At block 2202, the scheduled entity may receive scheduling information for a downlink transmission of a transport block including a plurality of code block groups (CBGs) from the scheduling entity. The scheduling information can indicate a modulation and coding scheme (MCS) associated with the transport block. In some examples, the MCS includes one of a minimum MCS for the transport block selected based on a first set of overlapping CBGs overlapping in time with an uplink transmission from the scheduled entity when the scheduled entity is operating in a full-duplex mode including all of the plurality of CBGs or a maximum MCS for the transport block selected based on the first set of overlapping CBGs including an empty set. In some examples, the MCS associated with the transport block includes one of the minimum MCS or the maximum MCS. In some scenarios, MCS rates may be based on an amount of overlapping time resources between transmissions (e.g., downlink transmission and uplink transmission). For example, the scheduled entity may identify the minimum MCS as the MCS for the transport block when the amount of overlapping time resources is greater than a threshold. Additionally, or alternatively, the scheduled entity may further identify the maximum MCS as the MCS for the transport block when the amount of overlapping time resources is less than or equal to the threshold. In some deployments, the communication and processing circuitry 1842, together with the transceiver 1810, shown and described above in connection with FIG. 18 may provide a means to receive the scheduling information.

At block 2204, the scheduled entity may receive the downlink transmission including the plurality of CBGs of the transport block from the scheduling entity. The plurality of CBGs are time-interleaved over a plurality of symbols allocated for the downlink transmission. Time-interleaving may occur to accommodate and/or mitigate interference. In some deployments, time-interleaving can be done based on at least a first set of overlapping CBGs of the plurality of CBGs overlapping in time with an uplink transmission from the scheduled entity during full-duplex mode operations (e.g., when the scheduled entity is operating in a full-duplex mode). In some examples, the scheduled entity may receive the first set of overlapping CBGs from the scheduling entity within one or more symbols of the plurality of symbols allocated for the downlink transmission. In this example, the scheduled entity may further transmit the uplink transmission to the scheduling entity within the one or more symbols over which the first set of overlapping CBGs is transmitted. In some deployments the communication and processing circuitry 1842, together with the transceiver 1810, shown and described above in connection with FIG. 18 may provide a means to receive the downlink transmission.

The method 2200 can further include additional transport block processing features. In some examples, the scheduled entity may time de-interleave the plurality of CBGs of the transport block. In some deployments, the time de-interleaving circuitry 1846 shown and described above in connection with FIG. 18 may provide a means to time de-interleave the plurality of CBGs of the transport block.

In one configuration, a scheduled entity (e.g., a UE) 1800 includes means for receiving scheduling information for a downlink transmission of a transport block including a plurality of code block groups (CBGs) from the scheduling entity. The scheduling information indicates a modulation and coding scheme (MCS) associated with the transport block. The scheduled entity can further include means for receiving the downlink transmission including the plurality of CBGs of the transport block from the scheduling entity. The plurality of CBGs are time-interleaved over a plurality of symbols allocated for the downlink transmission based on at least a first set of overlapping CBGs of the plurality of CBGs overlapping in time with an uplink transmission from the scheduled entity during full-duplex mode operations.

In one aspect, the aforementioned means for receiving the scheduling information for the downlink transmission and the means for receiving the downlink transmission may be the processor(s) 1804 shown in FIG. 18 configured to perform the functions recited by the aforementioned means. For example, the aforementioned means for receiving the scheduling information for the downlink transmission may include the communication and processing circuitry 1842, the MCS identification circuitry 1844, and the transceiver 1810 shown in FIG. 18. As another example, the aforementioned means for receiving the downlink transmission may include the communication and processing circuitry 1842 and the transceiver 1810 shown in FIG. 18. In another aspect, the aforementioned means may be a circuit or any apparatus configured to perform the functions recited by the aforementioned means.

Figure 23:
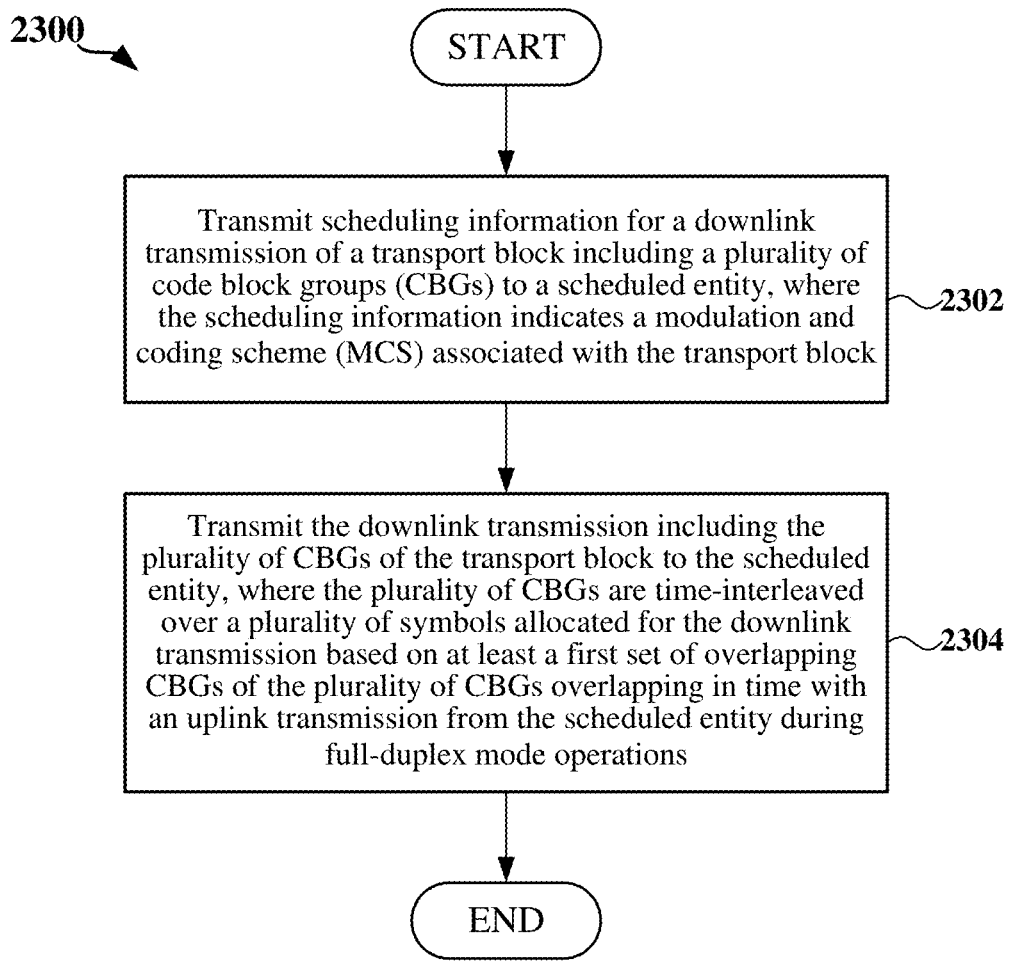
FIG. 23 is a flow chart of an exemplary method for time-interleaving code block groups for full-duplex communication at a scheduling entity according to some aspects.

FIG. 23 is a flow chart 2300 of a method for time-interleaving code block groups for full-duplex communication at a scheduling entity according to some aspects. As described below, some or all illustrated features may be omitted in a particular implementation within the scope of the present disclosure, and some illustrated features may not be required for implementation of all embodiments. In some examples, the method may be performed by the scheduling entity 1100, as described above and illustrated in FIG. 11, by a processor or processing system, or by any suitable means for carrying out the described functions.

At block 2302, the scheduling entity may transmit scheduling information for a downlink transmission of a transport block including a plurality of code block groups (CBGs) to a scheduled entity. The scheduling information can indicate a modulation and coding scheme (MCS) associated with the transport block. In some examples, the MCS includes one of a minimum MCS for the transport block selected based on a first set of overlapping CBGs overlapping in time with an uplink transmission from the scheduled entity when the scheduled entity is operating in a full-duplex mode including all of the plurality of CBGs or a maximum MCS for the transport block selected based on the first set of overlapping CBGs including an empty set. In some examples, the MCS associated with the transport block includes one of the minimum MCS or the maximum MCS. In some scenarios, MCS rates may be based on an amount of overlapping time resources between transmissions (e.g., downlink transmission and uplink transmission). For example, the scheduling entity may select the minimum MCS as the MCS for the transport block when the amount of overlapping time resources is greater than a threshold. Additionally, or alternatively, the scheduling entity may further select the maximum MCS as the MCS for the transport block when the amount of overlapping time resources is less than or equal to the threshold. In some deployments, the communication and processing circuitry 1144, together with the transceiver 1110, shown and described above in connection with FIG. 11 may provide a means to transmit the scheduling information.

At block 2304, the scheduled entity may transmit the downlink transmission including the plurality of CBGs of the transport block to the scheduled entity. The plurality of CBGs are time-interleaved over a plurality of symbols allocated for the downlink transmission. Time-interleaving may occur to accommodate and/or mitigate interference. In some deployments, time-interleaving can be done based on at least a first set of overlapping CBGs of the plurality of CBGs overlapping in time with an uplink transmission from the scheduled entity during full-duplex mode operations (e.g., when the scheduled entity is operating in a full-duplex mode). In some examples, the scheduling entity may transmit the first set of overlapping CBGs to the scheduled entity via one or more symbols of the plurality of symbols allocated for the downlink transmission. In this example, the scheduling entity may further receive the uplink transmission from the scheduled entity via the one or more symbols over which the first set of overlapping CBGs is transmitted. In some deployments the communication and processing circuitry 1144, together with the transceiver 1110, shown and described above in connection with FIG. 11 may provide a means to transmit the downlink transmission.

The processes shown in FIGS. 12-17 and 19-23 may include additional aspects, such as any single aspect or any combination of aspects described below and/or in connection with one or more other processes described elsewhere herein.

Aspect 1: A method of wireless communication between a scheduling entity and a scheduled entity in a wireless communication network, the method comprising: scheduling a downlink transmission to the scheduled entity of a transport block comprising a plurality of code block groups (CBGs); time-interleaving the plurality of CBGs of the transport block generated using a modulation and coding scheme (MCS) over a plurality of symbols allocated for the downlink transmission based on at least a first set of CBGs of the plurality of CBGs at least partially overlapping in time with an uplink transmission from the scheduled entity during full-duplex mode operations; and transmitting the downlink transmission comprising the plurality of CBGs of the transport block to the scheduled entity.

Aspect 2: The method of aspect 1, further comprising: transmitting the first set of CBGs to the scheduled entity via one or more symbols of the plurality of symbols allocated for the downlink transmission.

Aspect 3: The method of aspect 2, further comprising: receiving the uplink transmission from the scheduled entity via the one or more symbols over which the first set of CBGs is transmitted.

Aspect 4: The method of any of aspects 1 through 3, further comprising: selecting one of a minimum MCS or a maximum MCS as the MCS for the transport block, wherein the minimum MCS is based on the first set of CBGs comprising all of the plurality of CBGs and the maximum MCS is based on the first set of CBGs comprising an empty set.

Aspect 5: The method of aspect 4, wherein the selecting the one of the minimum MCS or the maximum MCS further comprises: selecting one of the minimum MCS or the maximum MCS as the MCS for the transport block based on an amount of overlapping time resources between the downlink transmission and the uplink transmission.

Aspect 6: The method of aspect 5, wherein the selecting the one of the minimum MCS or the maximum MCS as the MCS for the transport block further comprises: selecting the minimum MCS as the MCS for the transport block when the amount of overlapping time resources is greater than a threshold; and selecting the maximum MCS as the MCS for the transport block when the amount of overlapping time resources is less than or equal to the threshold.

Aspect 7: The method of any of aspects 1 through 6, further comprising: selecting the MCS for the transport block; and generating the plurality of CBGs of the transport block using the MCS.

Aspect 8: A method of wireless communication between a scheduled entity and a scheduling entity in a wireless communication network, the method comprising: receiving scheduling information for a downlink transmission of a transport block comprising a plurality of code block groups (CBGs) from the scheduling entity, wherein the scheduling information indicates a modulation and coding scheme (MCS) associated with the transport block; and receiving the downlink transmission comprising the plurality of CBGs of the transport block from the scheduling entity, wherein the plurality of CBGs are time-interleaved over a plurality of symbols allocated for the downlink transmission based on at least a first set of CBGs of the plurality of CBGs at least partially overlapping in time with an uplink transmission from the scheduled entity during full-duplex mode operations.

Aspect 9: The method of aspect 8, further comprising: time de-interleaving the plurality of CBGs of the transport block.

Aspect 10: The method of aspect 8 or 9, further comprising: receiving the first set of CBGs from the scheduling entity via one or more symbols of the plurality of symbols allocated for the downlink transmission.

Aspect 11: The method of aspect 10, further comprising: transmitting the uplink transmission to the scheduling entity via the one or more symbols over which the first set of CBGs is transmitted.

Aspect 12: The method of any of aspects 8 through 11, wherein the MCS comprises one of a minimum MCS for the transport block selected based on the first set of CBGs comprising all of the plurality of CBGs or a maximum MCS for the transport block selected based on the first set of CBGs comprising an empty set.

Aspect 13: The method of aspect 12, wherein the MCS associated with the transport block comprises one of the minimum MCS or the maximum MCS based on an amount of overlapping time resources between the downlink transmission and the uplink transmission.

Aspect 14: The method of aspect 13, further comprising: identifying the minimum MCS as the MCS for the transport block when the amount of overlapping time resources is greater than a threshold; and identifying the maximum MCS as the MCS for the transport block when the amount of overlapping time resources is less than or equal to the threshold.

Aspect 15: An entity in a wireless communication network comprising a transceiver, a memory, and a processor coupled to the transceiver and the memory, the entity configured to perform a method of any one of aspects 1 through 7 or aspects 8 through 14.

Aspect 16: An apparatus in a wireless communication network comprising means for performing a method of any one of aspects 1 through 7 or aspects 8 through 14.

Aspect 17: A non-transitory computer-readable medium having stored therein instructions executable by one or more processors of an apparatus to perform a method of any one of aspects 1 through 7 or aspects 8 through 14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 7, 10, 11, and/or 18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication between a scheduling entity and a scheduled entity in a wireless communication network, the method comprising:
    scheduling a downlink transmission of a transport block comprising a plurality of code block groups (CBGs) to the scheduled entity;
    time-interleaving the plurality of CBGs of the transport block generated using a modulation and coding scheme (MCS) over a plurality of symbols allocated for the downlink transmission based on at least a first set of CBGs of the plurality of CBGs at least partially overlapping in time with an uplink transmission from the scheduled entity during full-duplex mode operations, wherein the MCS comprises one of a minimum MCS for the transport block selected based on the first set of CBGs comprising all of the plurality of CBGs or a maximum MCS for the transport block selected based on the first set of CBGs comprising an empty set; and transmitting the downlink transmission comprising the plurality of CBGs of the transport block to the scheduled entity.

2. The method of claim 1, further comprising
transmitting the first set of CBGs to the scheduled entity via one or more symbols of the plurality of symbols allocated for the downlink transmission.

3. The method of claim 2, further comprising:
receiving the uplink transmission from the scheduled entity via the one or more symbols over which the first set of CBGs is transmitted.

4. The method of claim 1, further comprising:
selecting one of the minimum MCS or the maximum MCS as the MCS for the transport block.

5. The method of claim 4, wherein the selecting the one of the minimum MCS or the maximum MCS further comprises:
selecting one of the minimum MCS or the maximum MCS as the MCS for the transport block based on an amount of overlapping time resources between the downlink transmission and the uplink transmission.

6. The method of claim 5, wherein the selecting the one of the minimum MCS or the maximum MCS as the MCS for the transport block further comprises:
selecting the minimum MCS as the MCS for the transport block when the amount of overlapping time resources is greater than a threshold; and
selecting the maximum MCS as the MCS for the transport block when the amount of overlapping time resources is less than or equal to the threshold.

7. The method of claim 1, further comprising:
selecting the MCS for the transport block; and
generating the plurality of CBGs of the transport block using the MCS.

8. A method of wireless communication between a scheduled entity and a scheduling entity in a wireless communication network, the method comprising:
receiving scheduling information for a downlink transmission of a transport block comprising a plurality of code block groups (CBGs) from the scheduling entity, wherein the scheduling information indicates a modulation and coding scheme (MCS) associated with the transport block; and
receiving the downlink transmission comprising the plurality of CBGs of the transport block from the scheduling entity, wherein the plurality of CBGs are time-interleaved over a plurality of symbols allocated for the downlink transmission based on at least a first set of CBGs of the plurality of CBGs at least partially overlapping in time with an uplink transmission from the scheduled entity during full-duplex mode operations, wherein the MCS comprises one of a minimum MCS for the transport block selected based on the first set of CBGs comprising all of the plurality of CBGs or a maximum MCS for the transport block selected based on the first set of CBGs comprising an empty set.

9. The method of claim 8, further comprising:
time de-interleaving the plurality of CBGs of the transport block.

10. The method of claim 9, further comprising:
receiving the first set of CBGs from the scheduling entity via one or more symbols of the plurality of symbols allocated for the downlink transmission.

11. The method of claim 10, further comprising:
transmitting the uplink transmission to the scheduling entity via the one or more symbols over which the first set of CBGs is transmitted.

12. The method of claim 8, wherein the MCS associated with the transport block comprises one of the minimum MCS or the maximum MCS based on an amount of overlapping time resources between the downlink transmission and the uplink transmission.

13. The method of claim 12, further comprising:
identifying the minimum MCS as the MCS for the transport block when the amount of overlapping time resources is greater than a threshold; and
identifying the maximum MCS as the MCS for the transport block when the amount of overlapping time resources is less than or equal to the threshold.

14. A scheduling entity configured to communication in a wireless communication network, the scheduling entity, comprising:
a transceiver;
a memory; and
a processor coupled to the transceiver and the memory, wherein the scheduling entity is configured to:
schedule a downlink transmission to a scheduled entity of a transport block comprising a plurality of code block groups (CBGs);
time-interleave the plurality of CBGs of the transport block generated using a modulation and coding scheme (MCS) over a plurality of symbols allocated for the downlink transmission based on at least a first set of CBGs of the plurality of CBGs at least partially overlapping in time with an uplink transmission from the scheduled entity during full-duplex mode operations, wherein the MCS comprises one of a minimum MCS for the transport block selected based on the first set of CBGs comprising all of the plurality of CBGs or a maximum MCS for the transport block selected based on the first set of CBGs comprising an empty set; and
transmit the downlink transmission comprising the plurality of CBGs of the transport block to the scheduled entity via the transceiver.

15. The scheduling entity of claim 14, wherein the scheduling entity is further configured to:
transmit the first set of CBGs to the scheduled entity via one or more symbols of the plurality of symbols allocated for the downlink transmission.

16. The scheduling entity of claim 15, wherein the scheduling entity is further configured to:
receive the uplink transmission from the scheduled entity via the one or more symbols over which the first set of CBGs is transmitted.

17. The scheduling entity of claim 14, wherein the scheduling entity is further configured to:
select one of the minimum MCS or the maximum MCS as the MCS for the transport block.

18. The scheduling entity of claim 17, wherein the scheduling entity is further configured to:
select one of the minimum MCS or the maximum MCS as the MCS for the transport block based on an amount of overlapping time resources between the downlink transmission and the uplink transmission.

19. The scheduling entity of claim 18, wherein the scheduling entity is further configured to:
   select the minimum MCS as the MCS for the transport block when the amount of overlapping time resources is greater than a threshold; and
   select the maximum MCS as the MCS for the transport block when the amount of overlapping time resources is less than or equal to the threshold.

20. The scheduling entity of claim 14, wherein the scheduling entity is further configured to:
   select the MCS for the transport block; and
   generate the plurality of CBGs of the transport block using the MCS.

21. A scheduled entity configured for communication in a wireless communication network, the scheduled entity comprising:
   a transceiver;
   a memory; and
   a processor coupled to the transceiver and the memory, wherein the scheduled entity is configured to:
      receive scheduling information for a downlink transmission of a transport block comprising a plurality of code block groups (CBGs) from a scheduling entity via the transceiver, wherein the scheduling information indicates a modulation and coding scheme (MCS) associated with the transport block; and
      receive the downlink transmission comprising the plurality of CBGs of the transport block from the scheduling entity via the transceiver, wherein the plurality of CBGs are time-interleaved over a plurality of symbols allocated for the downlink transmission based on at least a first set of CBGs of the plurality of CBGs at least partially overlapping in time with an uplink transmission from the scheduled entity during full-duplex mode operations, wherein the MCS comprises one of a minimum MCS for the transport block selected based on the first set of CBGs comprising all of the plurality of CBGs or a maximum MCS for the transport block selected based on the first set of CBGs comprising an empty set.

22. The scheduled entity of claim 21, wherein the scheduled entity is further configured to:
   time de-interleave the plurality of CBGs of the transport block.

23. The scheduled entity of claim 21, wherein the scheduled entity is further configured to:
   receive the first set of CBGs from the scheduling entity via one or more symbols of the plurality of symbols allocated for the downlink transmission.

24. The scheduled entity of claim 23, wherein the scheduled entity is further configured to:
   transmit the uplink transmission to the scheduling entity via the one or more symbols over which the first set of CBGs is transmitted.

25. The scheduled entity of claim 21, wherein the MCS associated with the transport block comprises one of the minimum MCS or the maximum MCS based on an amount of overlapping time resources between the downlink transmission and the uplink transmission.

26. The scheduled entity of claim 25, wherein the scheduled entity is further configured to:
   identify the minimum MCS as the MCS for the transport block when the amount of overlapping time resources is greater than a threshold; and
   identify the maximum MCS as the MCS for the transport block when the amount of overlapping time resources is less than or equal to the threshold.

* * * * *